US012766896B2

(12) United States Patent
Rayner et al.

(10) Patent No.: US 12,766,896 B2
(45) Date of Patent: Oct. 20, 2026

(54) SYSTEMS AND METHODS FOR DOCKING VEHICLES FOR TOWING

(71) Applicant: The Boeing Company, Arlington, VA (US)

(72) Inventors: Emily Georgia Rayner, Newport (AU); Benjamin Stanislaw Zielinski, Port Melbourne (AU); Naram Abraham Faris, Port Melbourne (AU); Timothy Trewern, Port Melbourne (AU); Timothy Edward Mew, Brisbane City (AU); Alana Jade Overmeyer, Port Melbourne (AU); Jason Cochrane, Tecoma (AU); Michael Hamilton, Brisbane (AU)

(73) Assignee: The Boeing Company, Arlington, VA (US)

(*) Notice: Subject to any disclaimer, the term of this patent is extended or adjusted under 35 U.S.C. 154(b) by 580 days.

(21) Appl. No.: 18/171,816

(22) Filed: Feb. 21, 2023

(65) Prior Publication Data

US 2024/0278607 A1 Aug. 22, 2024

(51) Int. Cl.
*B60D 1/01* (2006.01)
*B60D 1/62* (2006.01)
*B60D 1/64* (2006.01)

(52) U.S. Cl.
CPC ................. *B60D 1/01* (2013.01); *B60D 1/62* (2013.01); *B60D 1/64* (2013.01)

(58) Field of Classification Search
CPC .... B60D 1/145; B60D 2001/548; B60D 1/62; B60D 1/64

(Continued)

(56) References Cited

U.S. PATENT DOCUMENTS 2,133,065 A 10/1938 Weber
2,847,233 A 8/1958 Minton
(Continued)

FOREIGN PATENT DOCUMENTS

CA 2752840 A1 * 3/2012 ............... B61G 1/00
CN 109131415 A 1/2019
(Continued)

OTHER PUBLICATIONS

United States Patent and Trademark Office, "Non-Final Office Action," issued in connection with U.S. Appl. No. 18/171,918, dated Apr. 20, 2026, 11 pages.
(Continued)

*Primary Examiner* — Kevin Hurley
(74) *Attorney, Agent, or Firm* — Hanley, Flight & Zimmerman, LLC

(57) ABSTRACT

Systems and methods for docking vehicles for towing are disclosed herein. An example docking system to mechanically couple a first vehicle and a second vehicle includes a first docking assembly and a second docking assembly. The first docking assembly includes a first mounting interface to be coupled to the first vehicle and a receiver rotatably coupled to the first mounting interface to enable the receiver to rotate about a pitch axis relative to the first vehicle. The receiver defines an opening. The second docking assembly includes a second mounting interface to be coupled to the second vehicle and a plug to be inserted into the opening of the receiver. The plug is rotatably coupled the second mounting interface to enable the plug to rotate about a yaw axis relative to the second vehicle and rotate about a roll axis relative to the second vehicle.

17 Claims, 50 Drawing Sheets

(58) Field of Classification Search
USPC .................................................. 280/514, 492
See application file for complete search history.

(56) References Cited

U.S. PATENT DOCUMENTS

| | | | | | |
|---|---|---|---|---|---|
| 2,976,061 | A | | 3/1961 | Clifford | |
| 3,981,517 | A | | 9/1976 | Crochet, Sr. | |
| 4,119,166 | A | * | 10/1978 | Ayotte | B60D 1/00 280/455.1 |
| 5,468,007 | A | * | 11/1995 | Kanerva | B62D 13/00 280/492 |
| 5,522,208 | A | * | 6/1996 | Wattron | A01B 71/066 280/492 |
| 5,632,350 | A | | 5/1997 | Gauvin | |
| 6,145,855 | A | * | 11/2000 | Bellis, Jr. | B62D 49/065 280/492 |
| 6,234,495 | B1 | * | 5/2001 | Velke | B60D 1/145 280/492 |
| 6,497,422 | B1 | * | 12/2002 | Bellis, Jr. | B62D 63/065 280/492 |
| 6,637,760 | B1 | * | 10/2003 | Carman | B60D 1/01 280/493 |
| 6,764,092 | B1 | | 7/2004 | Greaves, Jr. | |
| 7,828,249 | B2 | | 11/2010 | Ritter | |
| 8,118,323 | B2 | * | 2/2012 | Hudson | B60D 1/28 280/504 |
| 8,439,388 | B1 | * | 5/2013 | Westervelt | B60D 1/242 280/492 |
| 11,608,127 | B1 | | 3/2023 | Vega | |
| 11,654,733 | B1 | * | 5/2023 | McCurter | B60D 1/04 280/514 |
| 2009/0014982 | A1 | | 1/2009 | Wulff | |
| 2011/0175324 | A1 | | 7/2011 | Russell | |
| 2012/0007337 | A1 | * | 1/2012 | McGinnes | B60D 1/52 280/456.1 |
| 2012/0068437 | A1 | * | 3/2012 | Kobert | B61G 5/10 280/421 |
| 2016/0243908 | A1 | | 8/2016 | Lannen | |
| 2018/0370306 | A1 | | 12/2018 | Algüera | |
| 2020/0317008 | A1 | | 10/2020 | Delgado | |
| 2021/0053407 | A1 | | 2/2021 | Smith | |
| 2021/0061376 | A1 | | 3/2021 | Moore | |
| 2021/0380182 | A1 | | 12/2021 | Delizo | |
| 2022/0088980 | A1 | | 3/2022 | Richter | |
| 2022/0258799 | A1 | | 8/2022 | Martel | |
| 2023/0391152 | A1 | | 12/2023 | Salter | |
| 2025/0368119 | A1 | * | 12/2025 | West | B60P 3/073 |

FOREIGN PATENT DOCUMENTS

| | | | | | |
|---|---|---|---|---|---|
| DE | 10258065 | A1 | | 6/2004 | |
| DE | 202004002252 | U1 | | 1/2005 | |
| EP | 747244 | A1 | * | 12/1996 | |
| FR | 2901233 | A1 | * | 11/2007 | B62D 53/00 |
| WO | WO-0160645 | A1 | * | 8/2001 | B60D 1/64 |
| WO | 2021007673 | A1 | | 1/2021 | |
| WO | 2021089879 | A1 | | 5/2021 | |

OTHER PUBLICATIONS

United States Patent and Trademark Office, “Final Office Action,” issued in connection with U.S. Appl. No. 18/171,9185, dated Aug. 7, 2026, 8 pages.

* cited by examiner

SYSTEMS AND METHODS FOR DOCKING VEHICLES FOR TOWING

FIELD OF THE DISCLOSURE

This disclosure relates generally to docking systems and, more particularly, to systems and methods for docking vehicles for towing.

BACKGROUND

Tow hitch systems are commonly used to connect two vehicles to enable one of the vehicles to tow the other vehicle. For example, a truck and a trailer may include tow hitch components that enable the trailer to be mechanically connected to the truck so the truck can tow the trailer. Common types of tow hitch systems include a bumper tow ball hitch or a fifth wheel hitch.

SUMMARY

An example docking system to mechanically couple a first vehicle and a second vehicle is disclosed herein. The docking system includes a first docking assembly including a first mounting interface to be coupled to the first vehicle and a receiver rotatably coupled to the first mounting interface to enable the receiver to rotate about a pitch axis relative to the first vehicle. The receiver defines an opening. The docking system also includes a second docking assembly including a second mounting interface to be coupled to the second vehicle and a plug to be inserted into the opening of the receiver. The plug is rotatably coupled to the second mounting interface to enable the plug to rotate about a yaw axis relative to the second vehicle and rotate about a roll axis relative to the second vehicle.

An example method disclosed herein includes activating a motor to drive a first vehicle toward a second vehicle. The first vehicle is carrying a first docking assembly. The second vehicle is carrying a second docking assembly. The first docking assembly includes a receiver that is rotatable about a pitch axis relative to the first vehicle. The second docking assembly includes a plug that is rotatable about a yaw axis and a roll axis relative to the second vehicle. The method also includes determining the plug is inserted into the receiver and activating a lock to lock the plug in the receiver.

An example system disclosure herein includes a first vehicle and a first docking assembly coupled to the first vehicle. The first docking assembly includes a first interface component that is rotatable about a first degree of freedom relative to the first vehicle. The system also includes a second vehicle and a second docking assembly coupled to the second vehicle. The second docking assembly includes a second interface component to mate with the first interface component. The second interface component is rotatable about a second degree of freedom relative to the second vehicle and a third degree of freedom relative to the second vehicle.

An docking assembly for a vehicle disclosed herein includes a mounting interface to be coupled to the vehicle, an interface component rotatably coupled to the mounting interface at a joint defining an axis, the interface component to be coupled to a corresponding interface component on another vehicle, and a compliance mechanism. The compliance mechanism is operable between: a first mode in which the interface component is locked from rotating about the axis; a second mode in which the interface component is rotatable about the axis and biased to a central position; and a third mode in which the interface component is freely rotatable about the axis.

An example docking assembly for a vehicle disclosed herein includes a mounting interface to be coupled to the vehicle and an interface component rotatably coupled to the mounting interface at a joint defining an axis. The interface component is to mate with a second interface component on a second vehicle. The docking assembly includes a lockjaw rotatably coupled to the mounting interface. The lockjaw is to engage a lock pin on the second interface component to lock the interface components together. The docking assembly also includes a utility connector slidably coupled to the interface component. The utility connector to provide at least one of an electrical connection or a fluid connection with a second utility connector on the second vehicle. The docking assembly further includes an actuator to move the lockjaw and the utility connector simultaneously.

An example docking assembly for a vehicle disclosed herein includes a mounting interface to be coupled to the vehicle and a receiver rotatably coupled to the mounting interface. The receiver is rotatable about a pitch axis relative to the mounting interface. The receiver is pyramid-shaped. The receiver is to receive a plug on a second vehicle to mechanically couple the vehicles.

BRIEF DESCRIPTION OF THE DRAWINGS

FIGS. 2A-2C show an example sequence or process of connecting the example first docking assembly and the example second docking assembly.

FIG. 9A shows the example lock in an open position and FIG. 9B shows the example lock in a closed position.

FIG. 26A shows the example pitch compliance mechanism in a first mode, FIGS. 26B and 26C show the example pitch compliance mechanism in a second mode, and FIG. 26D shows the example pitch compliance mechanism in a third mode.

In general, the same reference numbers will be used throughout the drawing(s) and accompanying written description to refer to the same or like parts. The figures are not to scale.

DETAILED DESCRIPTION

Figure 1:
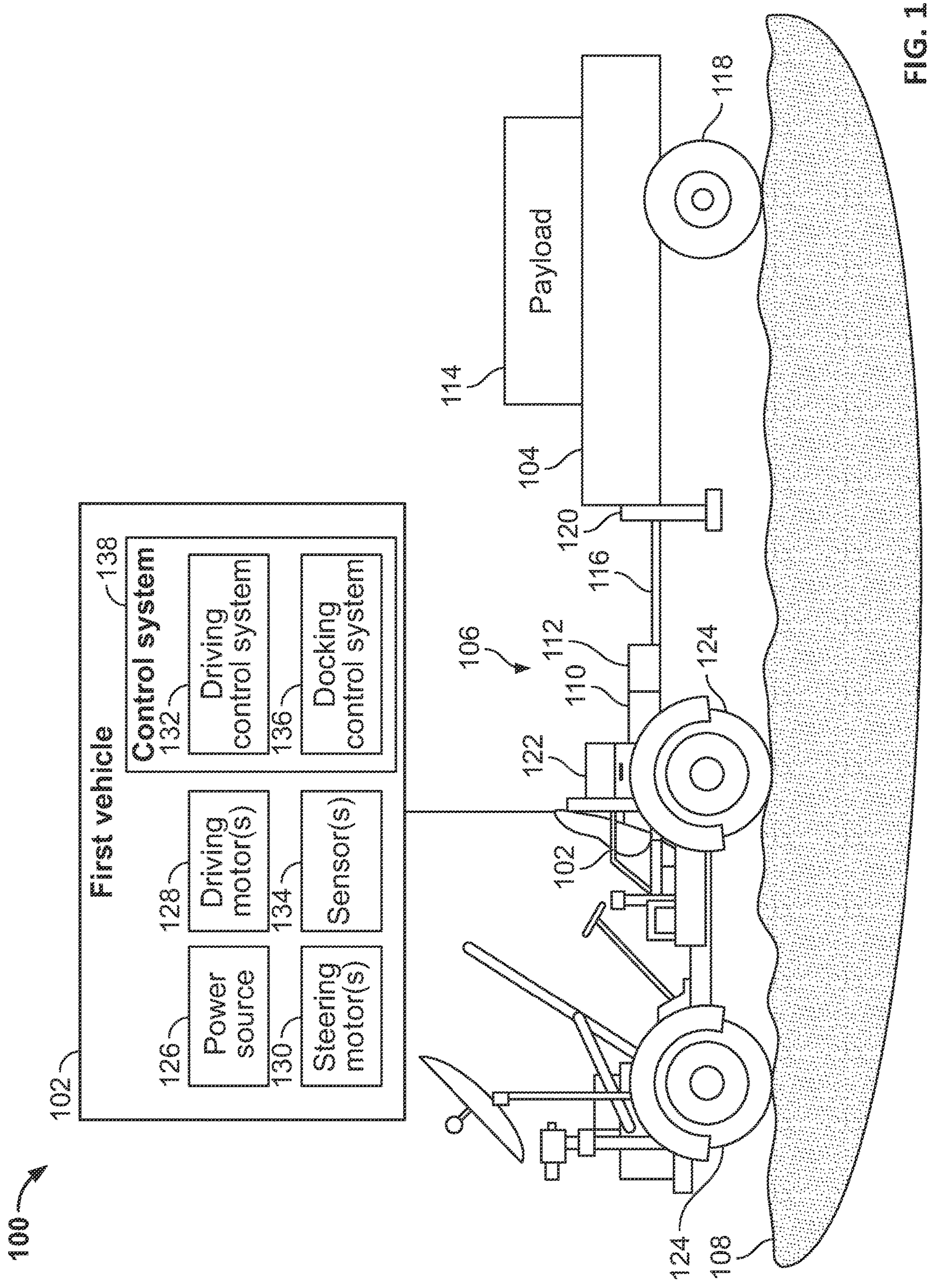
FIG. 1 illustrates an example vehicle, an example trailer (another example vehicle), and an example docking system that can be used to connect the example vehicle and the example trailer to enable the example vehicle to tow the example trailer.

Known tow systems, sometimes referred to as hitch systems, typically require precise alignment of the mating parts and also require some manual interaction. For instance, with a tow ball hitch system, a driver must reverse the vehicle toward the trailer (or other target) such that the hitch ball is vertically aligned below the trailer coupler. Then the driver lowers the trailer (e.g., by operating a stabilizer jack) so that the trailer coupler is lowered onto the ball. Then the driver operates a latch or lock to connect the ball and trailer coupler. These known systems generally require the mating components to be precisely aligned. Further, these known systems have limited degrees of freedom. Also, these known systems are difficult to use where there is uneven terrain that can cause misalignments between the mating components. As such, these known systems are generally not suitable for or capable of use with autonomous systems, such as self-driving vehicles. Further, to form an electrical connection between the vehicle and the trailer, traditional tow ball hitch systems require a person to manually connect two wiring harnesses between the vehicles. Also, these known systems are not adaptable to harsher environments (e.g., extreme temperatures, environments with abrasive dust), such as environments encountered on the moon or other celestial bodies (e.g., planets). As such, these known systems are generally not suitable for use with autonomous systems and/or use in harsher environments with uneven terrain.

Disclosed herein are example docking systems and methods that can be used to mechanically couple a host vehicle and a target vehicle, such as to enable the host vehicle to tow the target vehicle. The example docking systems may also be referred to as tow or hitch systems. The example docking systems and methods can be used between an active or drivable vehicle, such as a car or truck, and a passive vehicle, such as a trailer. The example docking systems provide strong mechanical coupling to enable one of the vehicles to tow the other vehicle. The example docking systems can also provide electrical and/or fluid connections between the two vehicles.

The example docking systems disclosed herein include components that are moveable about one or more degrees of freedom relative to the vehicles. As such, if the mating components are misaligned during the docking process, the mating components can move (e.g., rotate, translate) into an aligned configuration to enable components to properly connect. This is advantageous when performing a docking process on uneven or rough terrain. The examples disclosed herein can be used on Earth or another celestial body. For example, the example docking systems disclosed herein may be advantageous for use between a lunar rover and a trailer that are used on the moon. The example docking systems are also robust and can withstand harsh environments, such as the harsh lunar surface environment with extreme temperatures, abrasive dust, etc.

The example docking systems and methods disclosed herein can be used with autonomous systems. For example, the driven vehicle may be an autonomous vehicle that performs the docking process based on feedback from one or more sensors. The example docking systems are advantageous because they allow a relatively large degree of misalignment between the docking components. This reduces the precision sensing and driving requirements for the autonomous vehicle.

An example docking system disclosed herein includes a first docking assembly coupled to a first vehicle, such as a truck, and a second docking assembly coupled to a second vehicle, such as a trailer. The first and second docking assemblies include components that mechanically connect during a docking process to enable the first vehicle to the tow the second vehicle. In some examples, the first docking assembly includes a first interface component and the second docking assembly includes a second interface component. The first and second interface components are used to help guide or steer the mechanical coupling components into proper alignment with each other. In some examples, the first interface component is a receiver (e.g., a socket or jack) and the second interface component is a plug that is sized and shaped to be inserted into the receiver. As the first vehicle is driven toward the second vehicle, the plug is inserted into the receiver. In some examples, the plug and the receiver cavity are pyramid-shaped. This enables the receiver to guide the plug into the receiver in the proper direction and alignment for mating. Once the plug is fully inserted into the receiver, the receiver and the plug can be locked together, thereby mechanically coupling the first vehicle and the second vehicle (e.g., a trailer). This provides a strong mechanical connection that enables load transfer for towing, steering, braking, and support loads.

In some examples, the interface components have one or more degrees of freedom (DOFs). For example, in some examples, the receiver is rotatable about a pitch axis relative to the first vehicle, and the plug is rotatable about yaw and roll axis relative to the second vehicle (e.g., a trailer). Therefore, as the plug is being inserted into the receiver, if there is any misalignment in the pitch, yaw, and roll directions, the receiver and/or the plug can rotate into proper alignment with each other. As such, the example interface components are considered self-locating or self-aligning. This is beneficial when docking on uneven terrain because there is often misalignments in the pitch, yaw, and roll directions. Further, this is beneficial for use with autonomous systems because the precision requirements for autonomous driving can be reduced. Also, the example docking system enables passive location of the two docking sides without the need for any feedback motion-control.

In some examples, the DOFs are intentionally split between the docking assemblies on the first vehicle side (e.g., a driven vehicle) and the second vehicle side (e.g., a trailer). For example, as mentioned above, the docking assembly on the first vehicle side may have a pitch joint, and the docking assembly on the second vehicle side may have yaw and roll joints. In some examples, this reduces (e.g., minimizes) equipment on the first vehicle side (e.g., a driven vehicle). However, in other examples, the joints can be split in other configurations. Additionally or alternatively, in some examples, the receiver and/or the plug are moveable in one or more lateral directions (e.g., side-to-side and/or vertical). This further helps account for any positional misalignment between the docking assemblies. The example docking systems can handle relatively large misalignments compared to known tow systems.

In some examples, the docking systems and methods also provide electrical and/or fluid connection(s) between the first vehicle and the second vehicle. For example, the first docking assembly may include a first utility connector on the receiver and the second docking assembly may include a second utility connector on the plug. When the receiver and the plug are mated, the first and second utility connectors are substantially aligned and can be moved into engagement with each other (e.g., via an actuator). In some examples, the first and second utility connectors provide electrical connection(s) between the first vehicle and the second vehicle (e.g., between the driven vehicle and the trailer). This enables power and/or data (e.g., sensor data, actuator commands, etc.) to be transferred between the first vehicle and the second vehicle. Additionally or alternatively, the utility connectors can provide fluid connection(s) between the first vehicle and the second vehicle, such as to provide oxygen, water, hydraulic fluid, and/or any other types of fluids. Therefore, the example systems and methods can be beneficial for use with autonomous systems because they do not require manual interaction to provide the electrical and/or fluid connections between the first vehicle and the second vehicle.

In some examples, the first docking assembly includes a centering mechanism to bias the receiver to a neutral or central pitch position. This helps to maintain the receiver in at a neutral position for docking and prevents the receiver from drooping downward (due to gravity). In some examples, the second docking assembly similarly includes one or more centering mechanisms to bias the plug to a neutral or central yaw position and/or roll position. In some examples, the centering mechanisms are passive. In other examples, the centering mechanisms can be active.

In some examples, the first docking assembly includes an active or mode-switching compliance mechanism. The mode-switching compliance mechanism can switch between different modes for the different operational states of the system. For example, when the first vehicle is driving without the second vehicle (e.g., a trailer), the mode-switching compliance mechanism can operate in a first mode in which the receiver is locked from rotating about the pitch axis. This prevents the receiver from bouncing up and down while the first vehicle is driving, which would otherwise cause undue stress and wear on the compliance mechanism components. During a docking process, the mode-switching compliance mechanism can switch to a second mode in which the receiver is rotatable about the pitch axis and biased (e.g., via one or more springs) toward the neutral or central pitch position. This helps to ensure the receiver remains centered (e.g., in a horizontal alignment) during the docking process, but still enables the receiver to rotate about the pitch axis to account for misalignments with the plug. Then, once the receiver and the plug are connected, the mode-switching compliance mechanism can switch to a third mode in which the receiver is freely rotatable about the pitch axis. This provides the largest (e.g., maximum) range of motion during towing and reduces wear on the compliance mechanism components.

While the example docking systems and methods disclosed herein are sometimes described in connection with two vehicles, such as a driven vehicle and a trailer, it is understood the example docking systems and methods can be used with any host and target where mechanical, electrical, and/or fluid connection(s) therebetween is/are desired. For example, the example systems and methods disclosed herein can be used in connection with trains, boats, objects, aircraft, robots, etc. The example systems and methods are beneficial for use on the Earth as well as other celestial bodies (e.g., the moon). The example systems and methods can be used in connection with manually controlled systems or autonomously controlled systems.

FIG. 1 illustrates an example system or environment 100 in which a first vehicle 102 is coupled to (e.g., docked to) and towing a second vehicle 104. The first and second vehicles 102, 104 are coupled by an example docking system 106, which may also be referred to as a tow system or hitch system. Disclosed herein are various example docking systems that can be implemented as the docking system 106. In FIG. 1 the first and second vehicles 102, 104 are shown as driving on an uneven surface 108, which may be any surface such as the ground (e.g., a rocky terrain) or a manmade structure (e.g., a road, a ramp, etc.). The surface 108 may be on Earth or another celestial body (e.g., the moon). The example docking systems disclosed herein advantageously enable the vehicles 102, 104 to dock while on uneven terrain and while misalignment may occur between components of the docking system 106 during the docking process. In FIG. 1, the first vehicle 102 is represented twice, once as a physical vehicle and once as a block diagram. Certain components are described or labeled in connection with the physical vehicle or the block diagram.

In the illustrated example, the docking system 106 includes a first docking assembly 110 coupled to the first vehicle 102 and a second docking assembly 112 coupled to the second vehicle 104. The first and second docking assemblies 110, 112 couple or dock together to mechanically couple the first and second vehicles 102, 104. This enables the first vehicle 102 to tow and/or push the second vehicle 104, and vice versa. Example components for mechanically coupling the first and second docking assemblies 110, 112 are disclosed in further detail herein. In some examples, the first and second docking assemblies 110, 112 also provide electrical and/or fluid connections between the first and second vehicles 102, 104.

In the illustrated example, the first vehicle 102 is a powered (e.g., motorized) vehicle, hereinafter referred to as the driven vehicle or tow vehicle 102, and the second vehicle 104 is an unpowered or passive vehicle. In particular, in this example, the second vehicle 104 is a trailer, referred to hereinafter as the trailer 104. The trailer 104 does not include any powered means for independently powering or driving the trailer 104. Instead, the trailer 104 is meant to be towed by a powered vehicle, such as the tow vehicle 102. In some examples, once the first and second docking assemblies 110, 112 are connected, the tow vehicle 102 can provide electrical power for operating one or more components on the trailer 104. In the illustrated example, the tow vehicle 102 is implemented as an off-road or rough terrain vehicle. For example, the tow vehicle 102 may be a Lunar Terrain Vehicle (LTV) intended for driving on the moon or another celestial body. The tow vehicle 102 and the trailer 104 can be used for completing various missions on the moon, including transporting people and/or equipment on the lunar surface. In the illustrated example, the trailer 104 is carrying a payload 114. The payload 114 may be any type of payload, such as testing equipment, materials, batteries, people, etc. The example docking system 106 enables the tow vehicle 102 to connect to the trailer 104 on the uneven terrain.

In the illustrated example, the trailer 104 includes two wheels 118 (one of which is shown in FIG. 1). However, in other examples, the trailer 104 can include more or fewer wheels. In this example, the second docking assembly 112 is coupled to a tow bar 116 of the trailer 104. However, in other examples, the second docking assembly 112 can be coupled to another part or area of the trailer 104. In some examples, the trailer 104 includes a stabilizer leg 120 to support the trailer 104 (in the vertical direction) when the trailer 104 is not connected to the tow vehicle 102. Further, the stabilizer leg 120 holds the trailer at the approximate height for docking with the tow vehicle 102. In this example, the first docking assembly 110 is coupled (e.g., mounted) to a rear side 122 of the tow vehicle 102. However, in other examples, the first docking assembly 110 can be coupled to another side or part of the tow vehicle 102.

In the illustrated example, the tow vehicle 102 includes four wheels 124 (two of which are shown in FIG. 1). The tow vehicle 102 includes a power source 126 and one or more driving motor(s) 128 for powering one or more of the wheels 124. In some examples, the power source 126 is a battery and the driving motor(s) 128 is/are electrical motor(s). In another example, the power source 126 is a combustible fluid and the driving motor(s) 128 is/are combustion engines. In other examples, the tow vehicle 102 can include other types of propulsion systems.

In some examples, the tow vehicle 102 is an autonomous vehicle, sometimes referred to as a self-driving vehicle. Therefore, the tow vehicle 102 can autonomously drive on the lunar surface without manual control. This enables the tow vehicle 102 and the trailer 104 to be operated on the moon without the presence of humans. The tow vehicle 102 can be programmed (e.g., via commands from mission control on Earth) to perform various missions without a crew. In the illustrated example, the tow vehicle 102 includes one or more steering motor(s) 130 for steering the tow vehicle 102. The tow vehicle 102 also includes a driving control system 132. The driving control system 132 can be implemented by processor circuitry. The driving control system 132 controls the driving motor(s) 128 and the steering motor(s) 130 to autonomously control the tow vehicle 102. The example docking systems disclosed herein improve the ability for the tow vehicle 102 to autonomously dock and undock with the trailer 104 on uneven terrain.

In some examples, the driving control system 132 can control the tow vehicle 102 to perform a docking process with the trailer 104. In such a process, the tow vehicle 102 is driven to a position in front of the trailer 104 and then reverses toward the trailer 104 to mate the first and second docking assemblies 110, 112. In some examples, the tow vehicle 102 includes one or more sensor(s) 134 that are used to detect components or objects around the tow vehicle 102. For example, the sensor(s) 134 can include one or more cameras, RADAR sensors, infrared (IR) sensors, and/or LIDAR sensors. The driving control system 132 uses input from the sensor(s) 134 to steer the tow vehicle 102 toward the trailer 104 during the docking process. Once the first and second docking assemblies 110, 112 are mated, the first and second docking assemblies 110, 112 can be mechanically coupled via one or more locks, as disclosed in further detail herein. In the illustrated example, the tow vehicle 102 includes a docking control system 136. The docking control system 136 can be implemented by processor circuitry. The docking control system 136 can operate one or more actuators that are part of the docking system 106 to lock or connect the first and second docking assemblies 110, 112, as disclosed in further detail herein. The docking control system 136 can also operate the one or more actuators to unlock or disconnect the first and second docking assemblies 110, 112 during an undocking process.

In some examples, the driving control system 132 and the docking control system 136 are implemented by a common control system 138 of the tow vehicle 102. The control system 138 may be an electronic control unit (ECU) or computer onboard the tow vehicle 102. The control system 138 of FIG. 1 may be instantiated (e.g., creating an instance of, bring into being for any length of time, materialize, implement, etc.) by processor circuitry such as a central processing unit executing instructions. Additionally or alternatively, the control system 138 of FIG. 1 may be instantiated (e.g., creating an instance of, bring into being for any length of time, materialize, implement, etc.) by an application specific integrated circuit (ASIC) or a Field Programmable Gate Array (FPGA) structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

In some examples, the tow vehicle 102 can be manually controlled. For example, a person (e.g., an astronaut) can sit in and manually control (e.g., drive, steer) the tow vehicle 102. In some examples, the tow vehicle 102 can be manually controlled when people are present and autonomously controlled when people are not present. For example, when astronauts are present on the moon, the astronauts can drive the tow vehicle 102, and when the astronauts are not present on the moon, the tow vehicle 102 can be autonomously controlled or programmed to complete various missions.

While the tow vehicle 102 is depicted as a type of off-road vehicle (e.g., an LTV), the tow vehicle 102 can be implemented by any type of vehicle, such as a sedan, a pick-up truck, a motorcycle, an all terrain vehicle (ATV), a utility task vehicle (UTV), a side-by-side vehicle, etc. Further, while in this example the second vehicle 104 (the trailer 104) is an unpowered vehicle, in other examples the second vehicle 104 can be a powered vehicle. For example, the second vehicle 104 can be the same type of powered vehicle as the tow vehicle 102 or another type of powered vehicle. The first and second vehicles 102, 104 can have any number of wheels, such as one wheel, two wheels, three wheels, etc. The example docking systems and methods disclosed herein can be used with any type of vehicles or components to be docked or coupled.

Figure 2A:
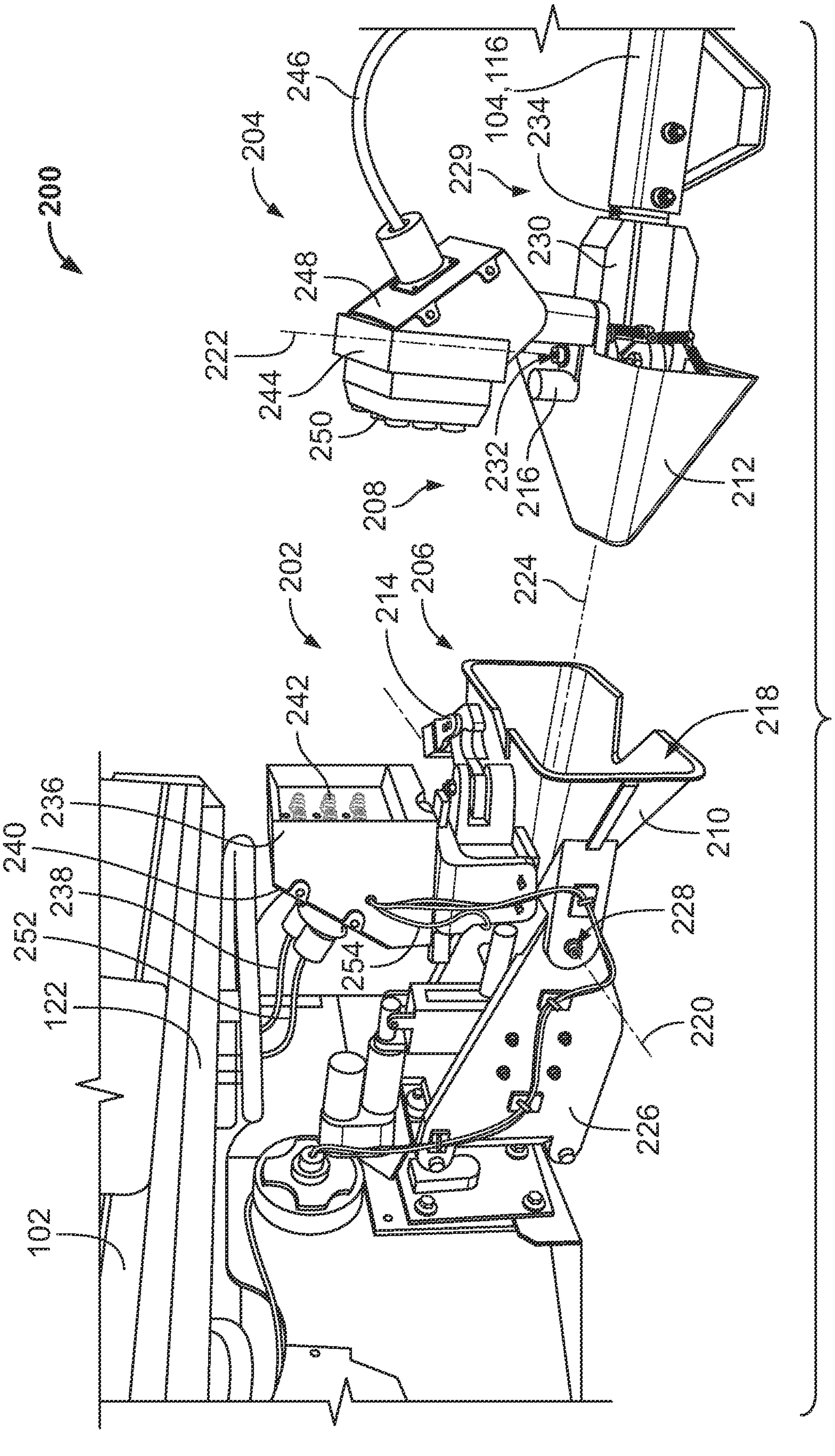
FIGS. 2A-2C illustrate an example docking system including an example first docking assembly and an example second docking assembly that can be implemented as the example docking system of FIG. 1.
Figure 2B:
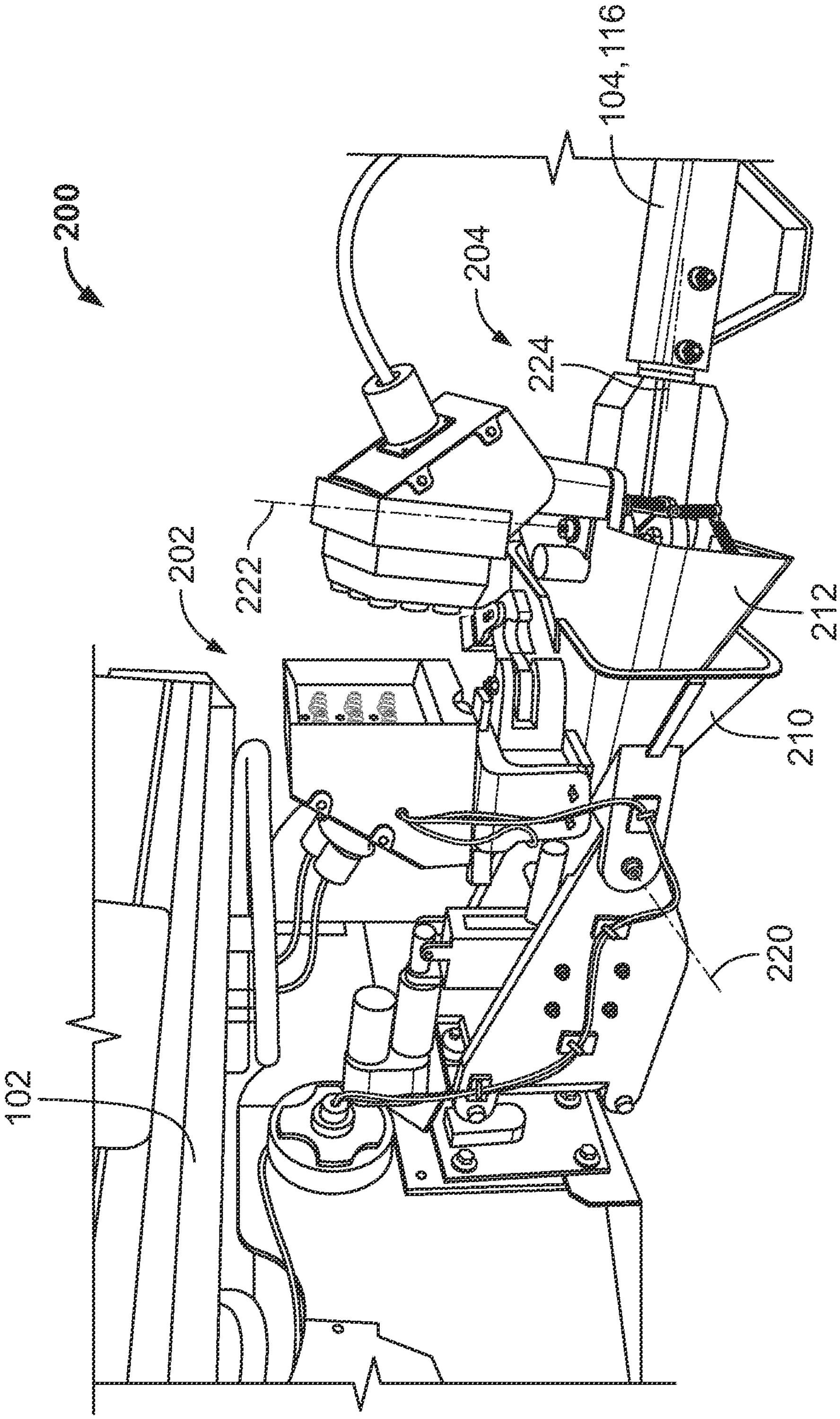
Figure 2C:
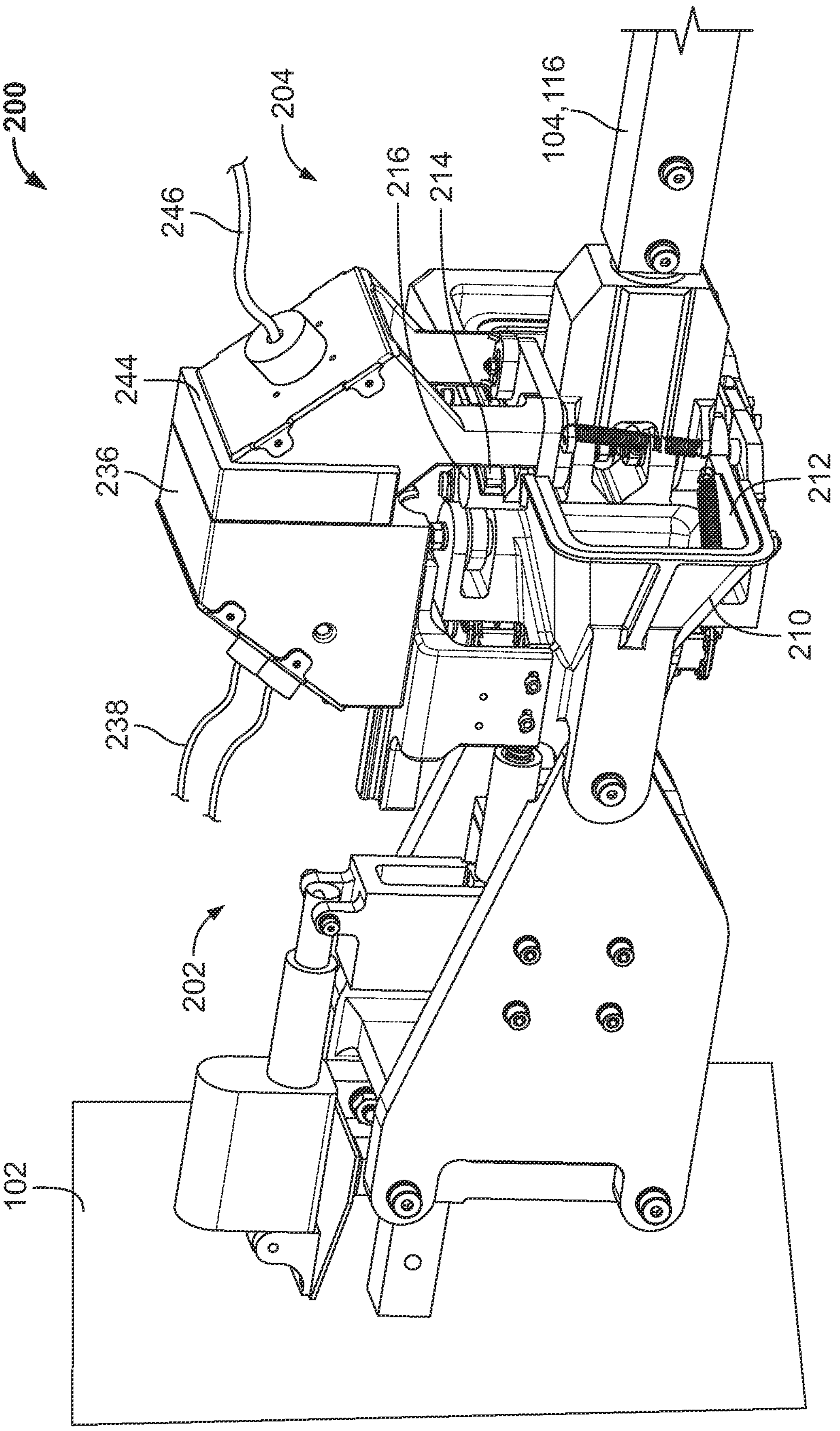

FIGS. 2A-2C illustrate an example docking system 200 that can be implemented as the docking system 106 of FIG. 1. The docking system 200 includes a first docking assembly 202 carried by the tow vehicle 102 and a second docking assembly 204 carried by the trailer 104. In this example, the first docking assembly 202 is coupled to the rear side 122 of the tow vehicle 102 and the second docking assembly 204 is coupled to the tow bar 116 of the trailer 104. In other examples, the first docking assembly 202 and the second docking assembly 204 can be coupled to other sides or components of the tow vehicle 102 and/or the trailer 104. FIG. 2A-2C show an example sequence of docking or connecting the first and second docking assemblies 202, 204 during an example docking process. In particular, FIG. 2A shows the first and second docking assemblies 202, 204 in a separated state, FIG. 2B shows the first and second docking assemblies 202, 204 in a partially connected state, and FIG. 2C shows the first and second docking assemblies 202, 204 in a fully connected state.

Referring to FIG. 2A, the first docking assembly 202 includes a first mechanical connector 206 and the second docking assembly 204 includes a second mechanical connector 208. During a docking process, the first and second mechanical connectors 206, 208 are mated or connected, which mechanically couples the tow vehicle 102 and the trailer 104. In the illustrated example, the first mechanical connector 206 includes a first interface component 210 and the second mechanical connector 208 includes a second interface component 212. Further, the first mechanical connector 206 includes a lock 214, and the second mechanical connector 208 includes a lock pin 216, which can be engaged by the lock 214 to mechanically lock together the first and second docking assemblies 202, 204. The first and second interface components 210, 212 are used to guide or align the lock 214 and the lock pin 216, as disclosed in further detail herein. In this example, the first and second interface components 210, 212 are implemented as a plug and socket type components. In particular, in this example, the first interface component 210 is implemented as a receiver (a socket), referred to herein as the receiver 210, and the second interface component 212 is implemented as a plug, referred to herein as the plug 212. The receiver 210 defines a cavity or opening 218 and is shaped to receive the plug 212. During a docking process, the plug 212 is inserted into the opening 218 of the receiver 210 and locked in the receiver 210, as shown in further detail herein.

In the illustrated example, the receiver 210 and the plug 212 have corresponding or matching shapes. In particular, in this example, the plug 212 is pyramid-shaped and, thus, has tapered or angled sides. Similarly, the opening 218 of the receiver 210 has a corresponding pyramid shape that matches the shape of the plug 212. This shape facilitates the plug 212 moving smoothly into the receiver 210 during the docking process. Further, during an undocking process, this shape reduces the possibility of the two components catching, jamming, or getting snagged while trying to separate the components.

The receiver 210 and the plug 212 are moveable (rotatable) about one or more degrees of freedom (DOF) to enable the receiver 210 and the plug 212 to mate even if they are initially misaligned. In some examples, these DOFs are split between the receiver 210 and the plug 212. For example, the receiver 210 may be moveable about a first DOF (e.g., a horizontal axis) relative to the tow vehicle 102, and the plug 212 may be movable about a second DOF (e.g., a vertical axis) relative to the trailer 104 (FIG. 1).

In the illustrated example of FIG. 2A, the receiver 210 has one DOF, and the plug 212 has two DOFs. The receiver 210 is rotatable about a first DOF relative to the tow vehicle 102, and the plug 212 is rotatable about a second DOF and a third DOF relative to the trailer 104. In particular, in this example, the receiver 210 is rotatable about a pitch axis 220 (relative to the tow vehicle 102), and the plug 212 is rotatable about a yaw axis 222 and rotatable about a roll axis 224 (relative to the trailer 104). Therefore, the receiver 210 and the plug 212 can move about these three DOFs (relative to the tow vehicle 102 and/or the trailer 104). This enables the receiver 210 and the plug 212 to self-align or locate with each other during a docking or undocking process.

In the illustrated example of FIG. 2A, the first docking assembly 202 includes a first mounting interface 226 (e.g., a mounting bracket) that is coupled to the rear side 122 of the tow vehicle 102. In some examples, the first mounting interface 226 is coupled to the tow vehicle 102 via one or more threaded fasteners (e.g., bolts). The first mounting interface 226 is fixed relative to the tow vehicle 102 and does not rotate or translate relative to the tow vehicle 102. The first mounting interface 226 can include one or more brackets, plates, or other structures, disclosed in further detail herein. In the illustrated example, the receiver 210 is rotatably coupled to the first mounting interface 226 at a joint 228. The joint 228 defines the pitch axis 220. This enables the enables the receiver 210 to rotate or pivot up and down about the pitch axis 220 relative to the first mounting interface 226 and, thus, relative to the tow vehicle 102.

In the illustrated example, the second docking assembly 204 includes a second mounting interface 229 (e.g., a second mounting bracket) that is coupled to the tow bar 116 of the trailer 104. The plug 212 is rotatably coupled to the second mounting interface 229 to enable the plug 212 to rotate about the yaw axis 222 relative to the second mounting interface 229 and rotate about the roll axis 224 relative to the second mounting interface 229 and, thus, relative to the trailer 104. In the illustrated example, the second mounting interface 229 includes a coupler 230. The plug 212 is rotatably coupled to the coupler 230 at a joint 232. The joint 232 defines the yaw axis 222, which enables the plug 212 to rotate clockwise or counter-clockwise (e.g., left or right from a top view) about the yaw axis 222. In this example, the coupler 230 is rotatably coupled to the tow bar 116 of the trailer 104 at a joint 234. The joint 234 defines the roll axis 224. This enables the coupler 230 and the plug 212 to rotate about the roll axis 224. Therefore, the receiver 210 is rotatable about the pitch axis 220 relative to the tow vehicle 102, and the plug 212 is rotatable about the yaw axis 222 and rotatable about the roll axis 224 relative to the trailer 104. As such, when the plug 212 is mated with the receiver 210, the receiver 210 and the plug 212 are movable together about the pitch axis 220 (relative to the tow vehicle 102) and the yaw and roll axes 222, 224 (relative to the trailer 104). Therefore, in this example, the receiver 210 has only one DOF relative to the first mounting interface 226 (and the tow vehicle 102), and the plug 212 has only two DOFs relative to the second mounting interface 229 (and the trailer 104). However, in other examples, the receiver 210 and the plug 212 can be configured to have more or fewer DOFS and/or the DOFs may be split differently between the vehicle side and the trailer side.

During a docking process, the tow vehicle 102 is driven to a location in front of the trailer 104, and then the tow vehicle 102 is reversed toward the trailer 104 so the plug 212 is inserted into the receiver 210, as shown in FIG. 2B. Due to uneven terrain, the receiver 210 and the plug 212 may be misaligned along the pitch, yaw, and roll axes. However, as the plug 212 is inserted into the opening 218 of the receiver 210 and slides against the inner surfaces of the receiver 210, this misalignment forces the receiver 210 and the plug 212 to rotate about their respective DOFs and into an aligned position. For example, the receiver 210 rotates (pitches) up or down about the pitch axis 220 to align with the pitch angle of the plug 212. Similarly, the plug 212 rotates (yaws) left or right about the yaw axis 222 to align with the yaw angle of the receiver 210, and the plug 212 rotates about the roll axis 224 to align with the roll angle of the receiver 210. Therefore, even if the receiver 210 and the plug 212 are initially misaligned along the pitch, yaw, and roll axes, the receiver 210 and the plug 212 can move to positions where they are aligned along the pitch, yaw, and roll axes. In addition to rotational misalignments in the pitch, yaw, and rolls axes, there are also some inherent misalignments in the translation or lateral directions (side-to-side and vertical) that are accounted for. These may be handled by fourth and fifth DOFs, which are disclosed in further detail herein.

During the docking process, the tow vehicle 102 can continue to be reversed until the plug 212 is fully inserted into the receiver 210, as shown in FIG. 2C. In some examples, the plug 212 is fully inserted into the receiver 210 when one or more of the walls of the plug 212 engage the corresponding walls of the receiver 210, and/or the plug 212 cannot be moved any further into the receiver 210. Once the plug 212 is fully inserted into the receiver 210, the tow vehicle 102 can be stopped (e.g., manually by the driver or by the driving control system 132). Further, once the plug 212 is fully inserted into the receiver 210, the lock 214 can be activated (e.g., by the docking control system 136) to engage the lock pin 216. This locks the receiver 210 and the plug 212 together, and thereby prevents the receiver 210 and the plug 212 from separating. As such, the tow vehicle 102 and the trailer 104 are mechanically coupled. The tow vehicle 102 can then drive away with the trailer 104 being towed behind the tow vehicle 102. This design allows for vertical and lateral loads to be transferred through the interface of the receiver 210 and the plug 212. Further, the example docking system 200 can remain locked, even in an unpowered state, thereby conserving power. To undock or disconnect the tow vehicle 102 and the trailer 104, the lock 214 can be moved to an unlocked position, which releases the lock pin 216. Therefore, the first and second docking assemblies 202, 204 are no longer mechanically locked, and the tow vehicle 102 can drive away from the trailer 104.

The pitch, yaw, and roll joints 228, 232, 234 enable the receiver 210 and plug 212 to rotate in a relatively large envelope and account for misalignments between the receiver 210 and the plug 212. For example, in some examples, the receiver 210 has a range of motion about the pitch axis 220 of ±55° (or 110° total), the plug 212 has a range of motion about the yaw axis 222 of ±30° (or 60° total), and the plug 212 has a range of motion about the roll axis 224 of ±15° (or 30° total). However, in other examples, the range of motion about each of the pitch, yaw, and/or roll axes can be larger or smaller depending on the design configuration. In some examples, the docking system 200 can have different ranges of motions when docking compared to when driving (with the trailer 104). For example, during a docking process, the docking system 200 may allow the ranges disclosed above. Then, while driving, the docking system 200 may be configured to allow different (e.g., large) ranges of motion. For example, while driving, the plug 212 may yaw up to ±80° (or 160° total). This enables the plug 212 to allow more yaw movement while driving, such as while performing a sharp corner, but would not otherwise be attempted during docking if the first vehicle 102 and the trailer 104 were out of alignment by such a large degree. In other examples, the ranges of motion during driving and docking can be larger or smaller.

In some examples, the docking system 200 can be used to provide electrical and/or fluid connections between the tow vehicle 102 and the trailer 104. For example, referring back to FIG. 2A, the first docking assembly 202 includes a first utility connector 236. In this example, the first utility connector 236 is an electrical connector (and may be referred to as a first electrical connector). In the illustrated example, the first utility connector 236 is coupled to the receiver 210 and moves (rotates) with the receiver 210 about the pitch axis 220 relative to the tow vehicle 102. A first cable or cord 238 from the tow vehicle 102 is electrically coupled to a front side 240 of the first utility connector 236. A rear side 242 of the first utility connector 236 has one or more electrical pins, sockets, and/or other type of connectors. Similarly, the second docking assembly 204 includes a second utility connector 244. In this example, the second utility connector 244 is an electrical connector (and may be referred to as a second electrical connector). In the illustrated example, the second utility connector 244 is coupled to the plug 212 and, thus, moves with the plug 212 relative to the trailer 104. A second cable or cord 246 from the trailer 104 is electrically coupled to a rear side 248 of the second utility connector 244. A front side 250 of the second utility connector 244 has one or more electrical pins, sockets, and/or other types of connectors that mate with the connectors on the rear side 242 of the first utility connector 236. When first and second docking assemblies 202, 204 are connected, as shown in FIG. 2C, the first and second utility connectors 236, 244 are connected or mated. In particular, the pins or sockets on the first and second utility connectors 236, 244 make electrical contact, which electrically couples the first cable 238 on the tow vehicle 102 and the second cable 246 on the trailer 104. This enables power and/or data (e.g., sensor data, commands, etc.) to be transferred between the tow vehicle 102 and the trailer 104. For example, when the utility connectors 236, 244 are connected, the tow vehicle 102 can provide power and/or command signals to one or more actuators or equipment on the trailer 104. In some examples, the first and second utility connectors 236, 244 are mated when the plug 212 is fully inserted into the receiver 210. In other examples disclosed herein, an actuator is used to independently move the first and/or second utility connectors 236, 244 into engagement with each other.

In some examples, the first and second utility connectors 236, 244 can also provide fluid transfer between the tow vehicle 102 and the trailer 104. For example, a first hose from the tow vehicle 102 can be connected to the first utility connector 236, and a second hose from the trailer 104 can be connected to the second utility connector 244. When the first and second utility connectors 236, 244 are connected, the connectors 236, 244 provide fluid transfer between the tow vehicle 102 and the trailer 104. This can be used to transfer any fluid, such as oxygen, oil, water, hydraulic fluid, pneumatic pressure, etc. Therefore, the first and second utility connectors 236, 244 can be used to provide at least one of an electrical connection or a fluid connection.

In the illustrated example of FIG. 2A, a third cable or cord 252 is electrically coupled to the front side 240 of the first utility connector 236. The first utility connector 236 connects the third cable 252 to one or more cables 254 that lead to one or more actuators and/or sensors on the first docking assembly 204. The third cable 252 and the additional cables 254 provide power, commands, and/or other information between the first docking assembly 202 and the tow vehicle 102, as disclosed in further detail herein. Therefore, the first and third cables 238, 252 can be connected to the front side 240 of the first utility connector 236, and the first utility connector 236 connects the first and third cables 238, 252 to the second utility connector 244 and the additional cables 254, respectively.

While in this example the first docking assembly 202 with the receiver 210 is carried by the tow vehicle 102 and the second docking assembly 204 is carried by the trailer 104, in other examples, the first and second docking assemblies can be reversed. For example, the receiver 210 can be carried by the trailer 104 and the plug 212 can be carried by the tow vehicle 102. Further, in other examples, the rotational axes of the receiver 210 and the plug 212 can be split differently. For example, the receiver 210 may instead be rotatable about a yaw axis, and the plug 212 may be rotatable about a pitch axis and a roll axis.

Figure 3:
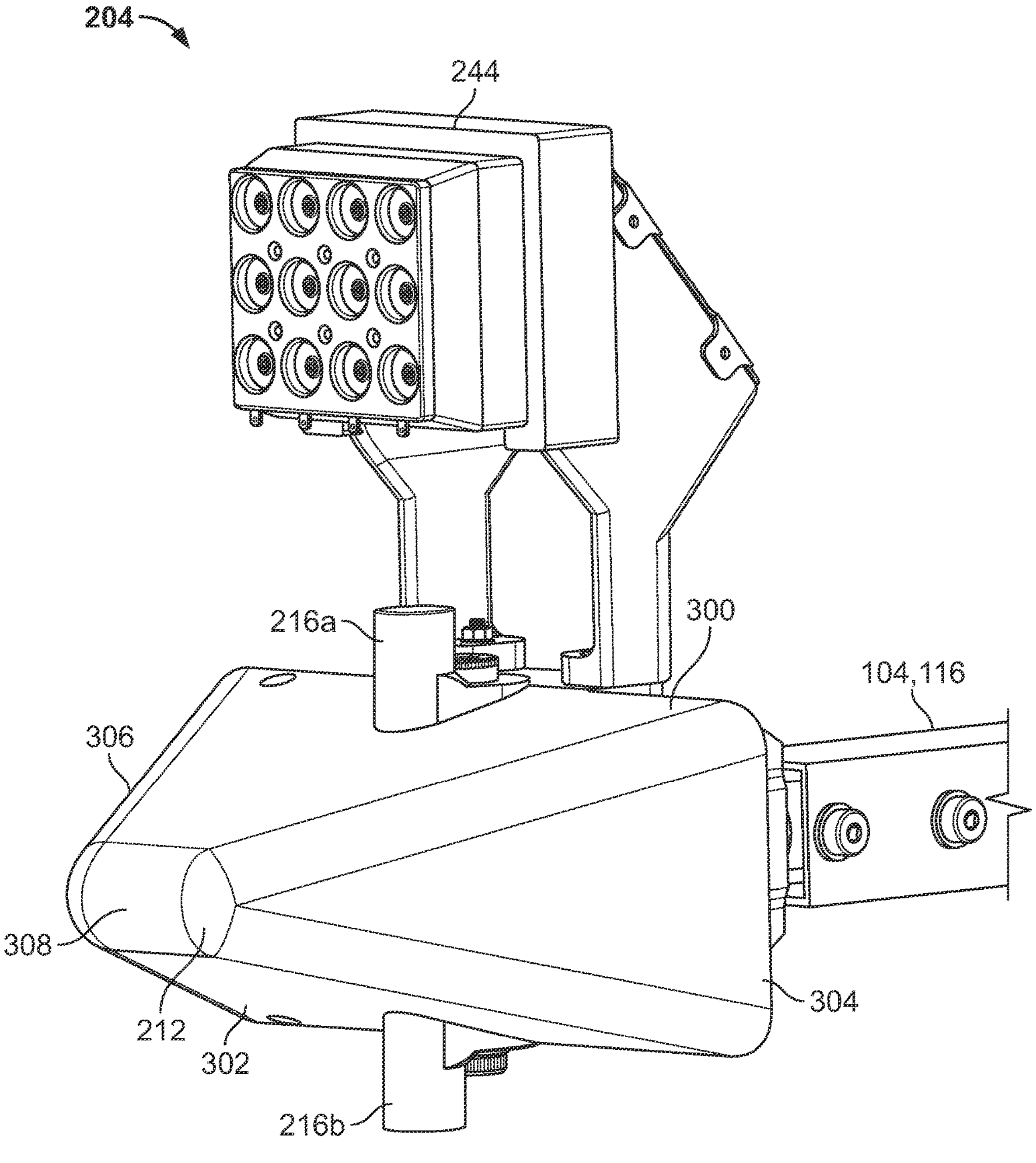
FIG. 3 is a perspective view of the example second docking assembly of the example docking system of FIGS. 2A-2C.
Figure 4:
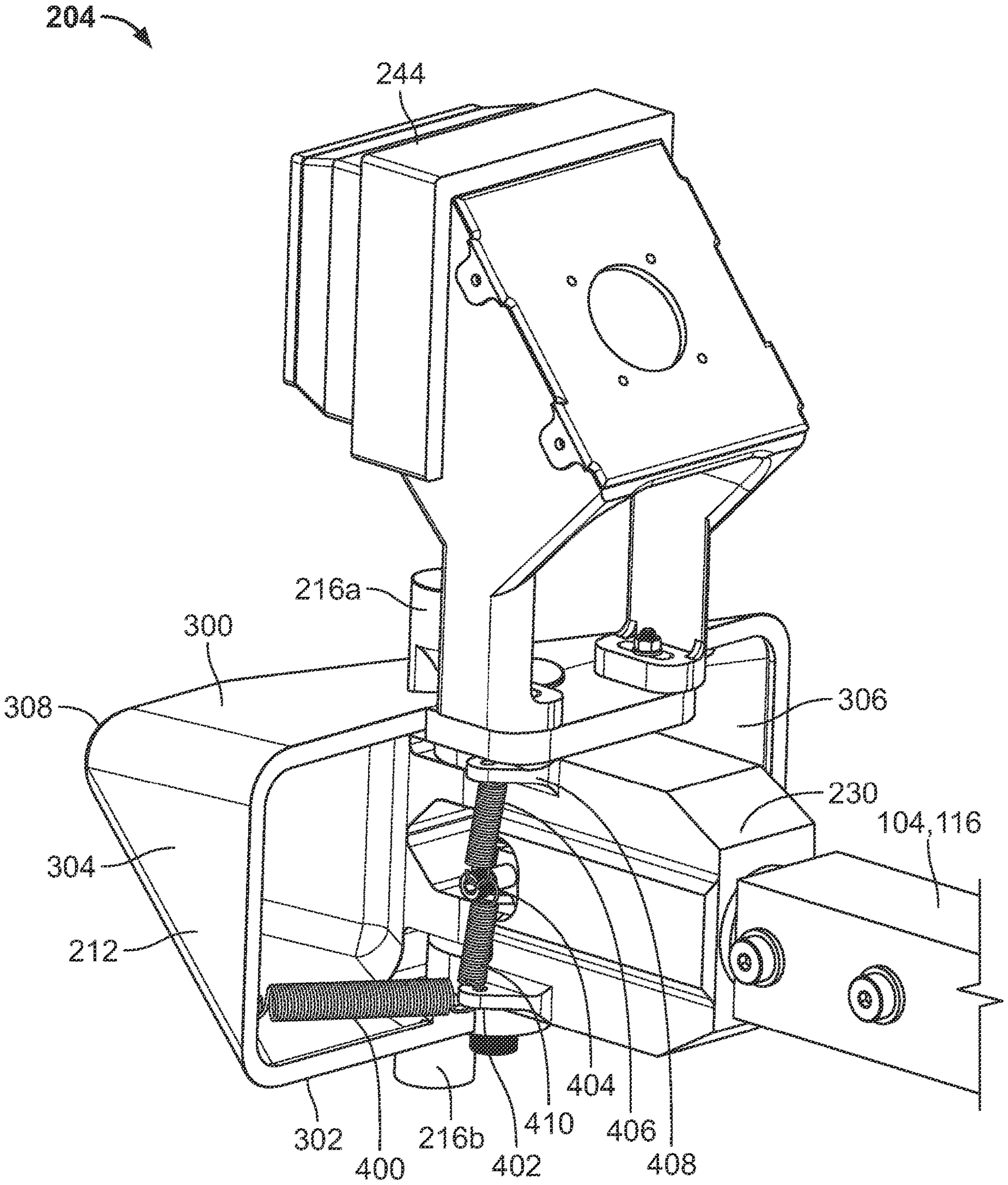
FIG. 4 is a perspective view of the example second docking assembly of the example docking system of FIGS. 2A-2C.
Figure 5:
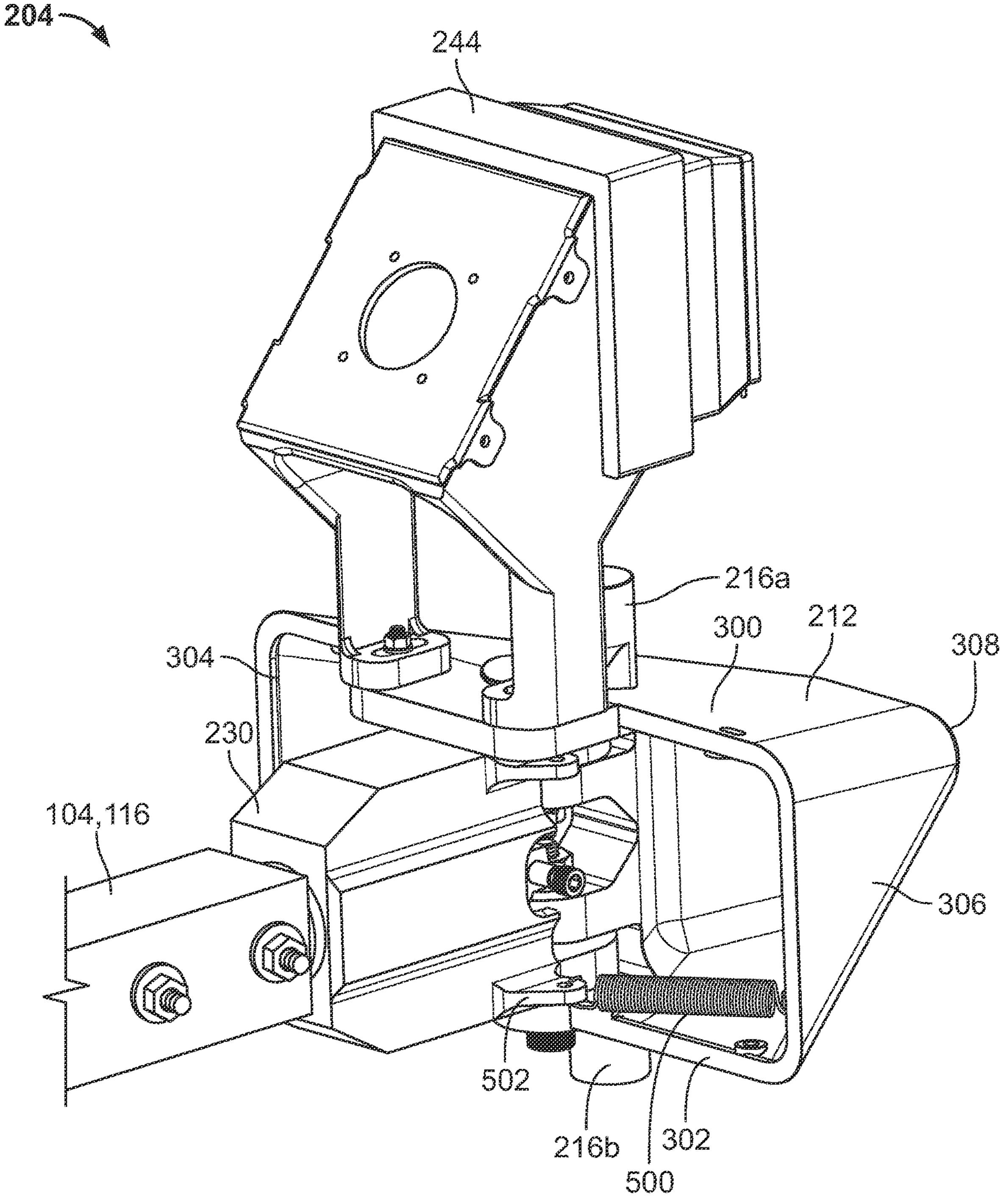
FIG. 5 is a perspective view of the example second docking assembly of the example docking system of FIGS. 2A-2C.
Figure 6:
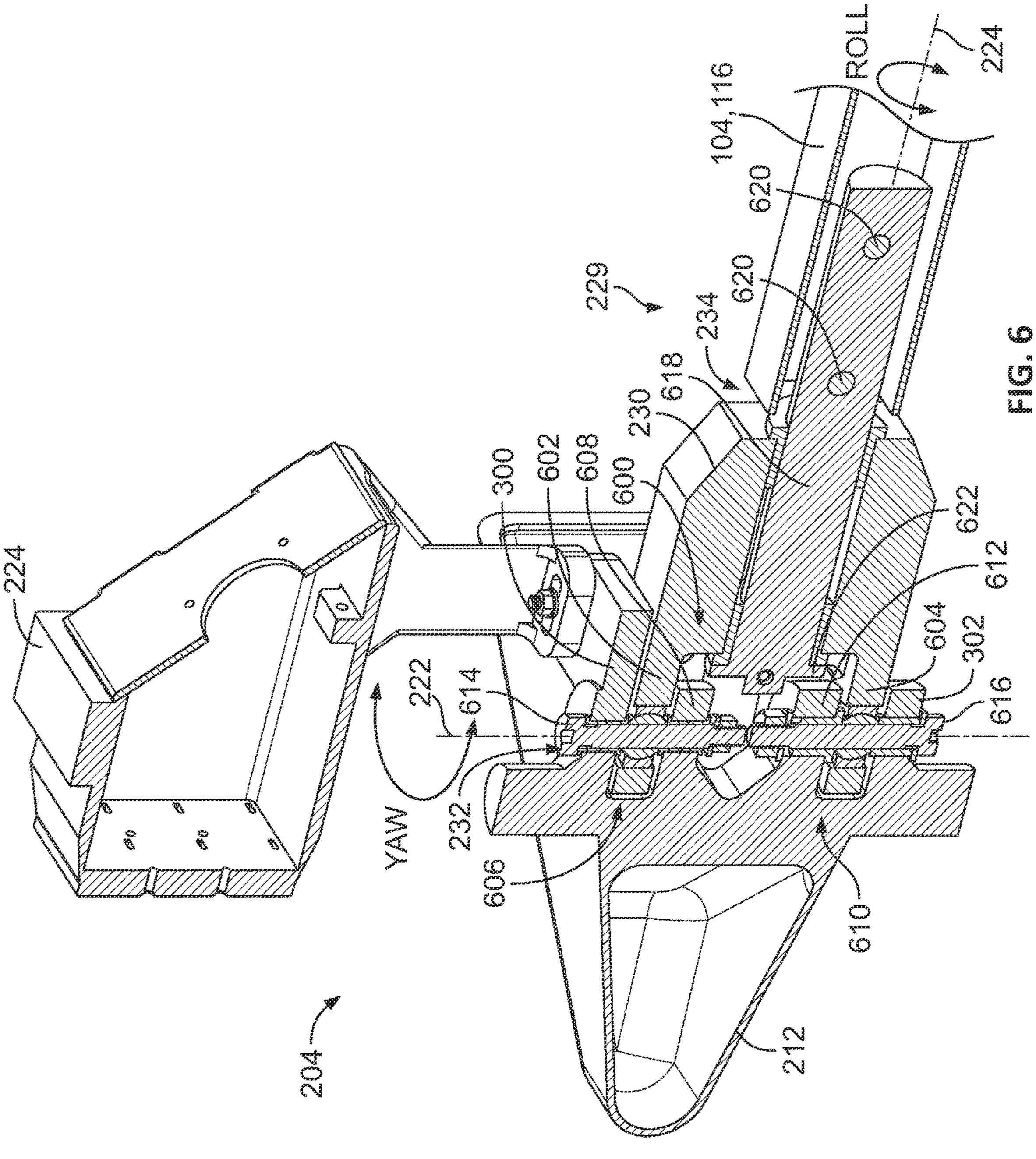
FIG. 6 is a cross-sectional view of the example second docking assembly of the example docking system of FIGS. 2A-2C.

FIGS. 3-5 are perspective views of the second docking assembly 204 as shown coupled to the tow bar 116 of the trailer 104, and FIG. 6 is a perspective view of the second docking assembly 204 on the tow bar 116 of the trailer 104. As shown in FIGS. 3-5, the plug 212 has a first wall 300 (e.g., a top wall), a second wall 302 (e.g., a bottom wall) opposite the first wall 300, a third wall 304 between the first and second walls 300, 302, and a fourth wall 306 between the first and second walls 300, 302 opposite the third wall 304. In the illustrated example, the walls 300, 302, 304, 306 angle, taper, and/or otherwise converge inward to form a tip 308 at a forward end of the plug 212. As such, the plug 212 is pyramid-shaped. In this example the tip 308 is rounded. In other examples the tip 308 can have a different shape. The plug 212 can be constructed (e.g., molded) as a single unitary part or component (e.g., a monolithic structure) or can be constructed as multiple parts or components that are coupled (e.g., bolted, welded) together.

As disclosed above, the second docking assembly 204 includes the lock pin 216. In the illustrated example shown in FIGS. 3-5, the second docking assembly 204 includes two lock pins, referred to as a first lock pin 216*a* and a second lock pin 216*b*. The first and second lock pins 216*a*, 216*b* are used for locking together the plug 212 and the receiver 210 (FIG. 2A) as disclosed in further detail herein. In this example, the first lock pin 216*a* is coupled to and extends upward from the first wall 300 and the second lock pin 216*b* is coupled to an extends downward from the second wall 302. In some examples, the first and second lock pins 216*a*, 216*b* are integrally formed with the plug 212. While in this example the second docking assembly 204 includes two lock pins, in other examples, the second docking assembly 204 may include only one lock pin (e.g., only the first lock pin 216*a*).

As shown in FIG. 6, the coupler 230 has a first yoke 600 including a first yoke wall 602 and a second yoke wall 604.

The plug 212 has a second yoke 606 formed by the first wall 300 and a third yoke wall 608, and the plug 212 has a third yoke 610 formed by the second wall 302 and a forth yoke wall 612. As shown in FIG. 6, the first yoke wall 602 of the coupler 230 is rotatably coupled to the second yoke 606 of the plug 212 via a first bolt 614 (e.g., an Allen bolt). Similarly, the second yoke wall 604 of the coupler 230 is rotatably coupled to the third yoke 610 of the plug 212 via a second bolt 616. The first and second bolts 614, 616 form the joint 232 that enables the plug 212 to rotate clockwise or counter-clockwise (e.g., left or right from a top view) about the yaw axis 222 (relative to the coupler 230 and the trailer 104).

As shown in FIG. 6, the second mounting interface 229 of the second docking assembly 204 includes a shaft 618. The shaft 618 is coupled to the tow bar 116 via bolts 620. As such, the shaft 618 does not move relative to the tow bar 116. The shaft 618 extends through the coupler 230. The shaft 618 has a flanged end 622 to prevent the coupler 230 from sliding off of the shaft 618. The coupler 230 is rotatable clockwise or counter-clockwise about the shaft 618. The shaft 618 defines the joint 234 that enables the plug 212 to rotate about the roll axis 224.

In some examples, the second docking assembly 204 includes one or more features or mechanisms to center or bias the plug 212 to a neutral or central yaw position. For example, as shown in FIG. 4, the second docking assembly 204 includes a first spring 400 coupled between the plug 212 and the coupler 230. In this example, the first spring 400 is coupled between the third wall 304 of the plug 212 and a first lower tab 402 on the coupler 230. Similarly, as shown in FIG. 5, the second docking assembly 204 includes a second spring 500 coupled between the plug 212 (on the fourth wall 306) and the coupler 230 on the opposite side as the first spring 400. In this example, the second spring 500 is coupled between the fourth wall 306 of the plug 212 and a second lower tab 502 on the coupler 230. If the plug 212 is forced to rotate clockwise or counter-clockwise about the yaw axis 222 (FIG. 6), one of the springs 400, 500 is pulled into tension. When the force is removed, the spring 400, 500 in tension biases the plug 212 back to a neutral or central yaw position, such that the plug 212 is aligned with the tow bar 116 and a central axis of the trailer 104. This prevents the plug 212 from resting in a turned position that would make it difficult to dock. In this example, the springs 400, 500 are implemented as tension springs. In other examples, other types of springs and/or other return mechanisms can be used.

Similarly, in some examples, the second docking assembly 204 can include one or more features or mechanisms to center or bias the plug 212 to a neutral or central roll position. For example, as shown in FIG. 4, the second docking assembly 204 includes a pin 404 coupled to and extending from the flanged end 622 (FIG. 6) of the shaft 618 (FIG. 6). In the illustrated example, the second docking assembly 204 includes a first spring 406 coupled between the pin 404 and a first upper tab 408 on the coupler 230 and a second spring 410 coupled between the pin 404 on the shaft 618 and the first lower tab 402 on the coupler 230. If the plug 212 and the coupler 230 are forced to rotate clockwise or counter-clockwise about the roll axis 224 (FIG. 6), one of the springs 406, 410 is pulled into tension. When the force is removed, the spring 406, 410 in tension biases the plug 212 and the coupler 230 back to a neutral or central roll position. This prevents the plug 212 from resting in a rolled position that would make it difficult to dock. In this example, the springs 406, 410 are implemented as tension springs. In other examples, other types of springs and/or other return mechanism can be used. In some examples, the other side of the coupler 230 (shown in FIG. 5) can include two more springs similarly arranged to help bias the plug 212 to a neutral or central roll position.

As shown in FIGS. 3-6, the second docking assembly 204 includes the second utility connector 244. The second utility connector 244 is coupled (e.g., bolted) to the plug 212. Therefore, the second utility connector 244 moves with the plug 212 as the plug 212 rotates about the yaw and roll axes 222, 224. In this example, the second utility connector 244 is coupled to the first wall 300 (e.g., the top side) of the plug 212 and is disposed over or above the plug 212. However, in other examples, the second utility connector 244 can be coupled to another side of the plug 212.

Figure 7:
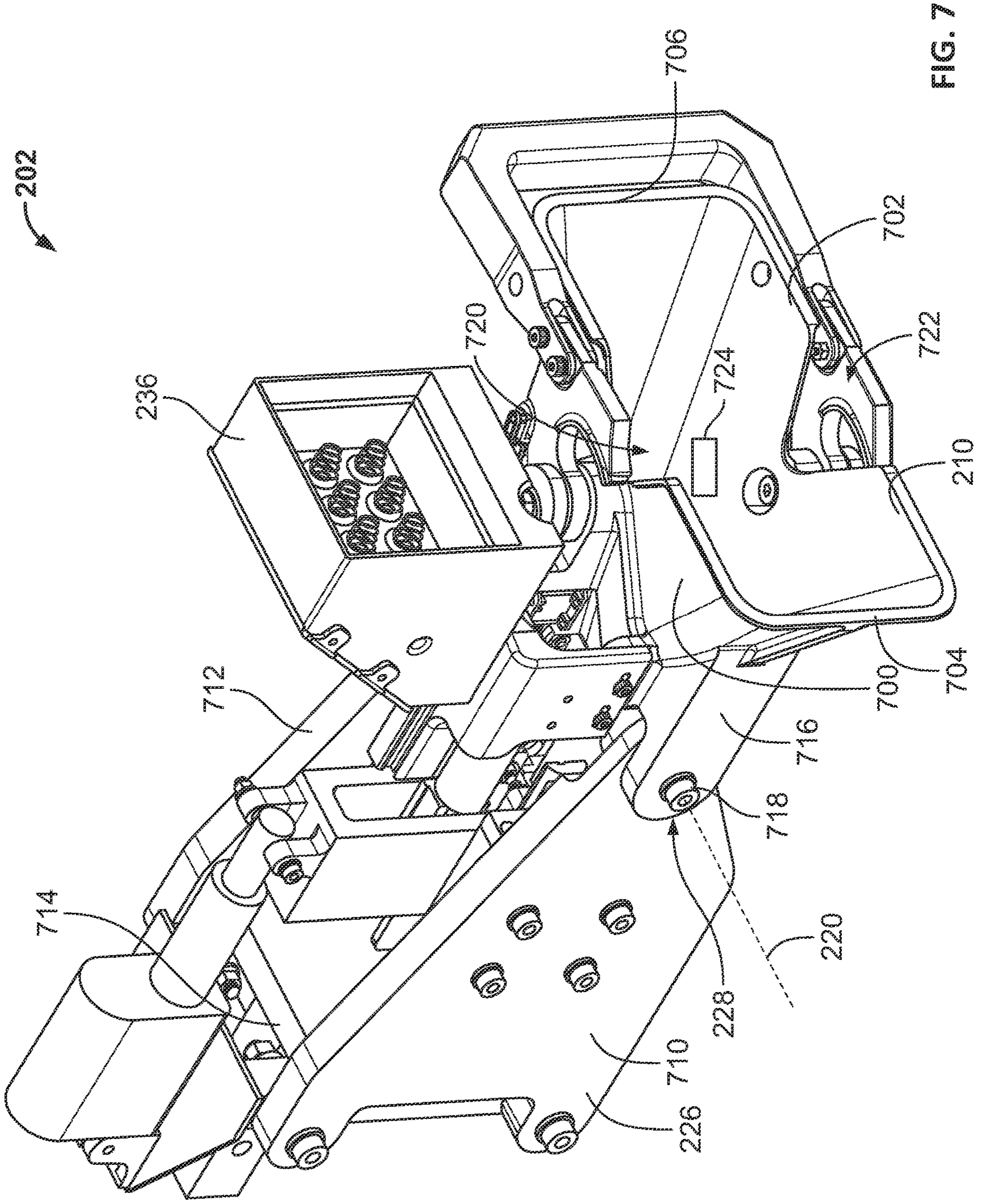
FIG. 7 is a perspective view of the example first docking assembly of the example docking system of FIGS. 2A-2C.
Figure 8:
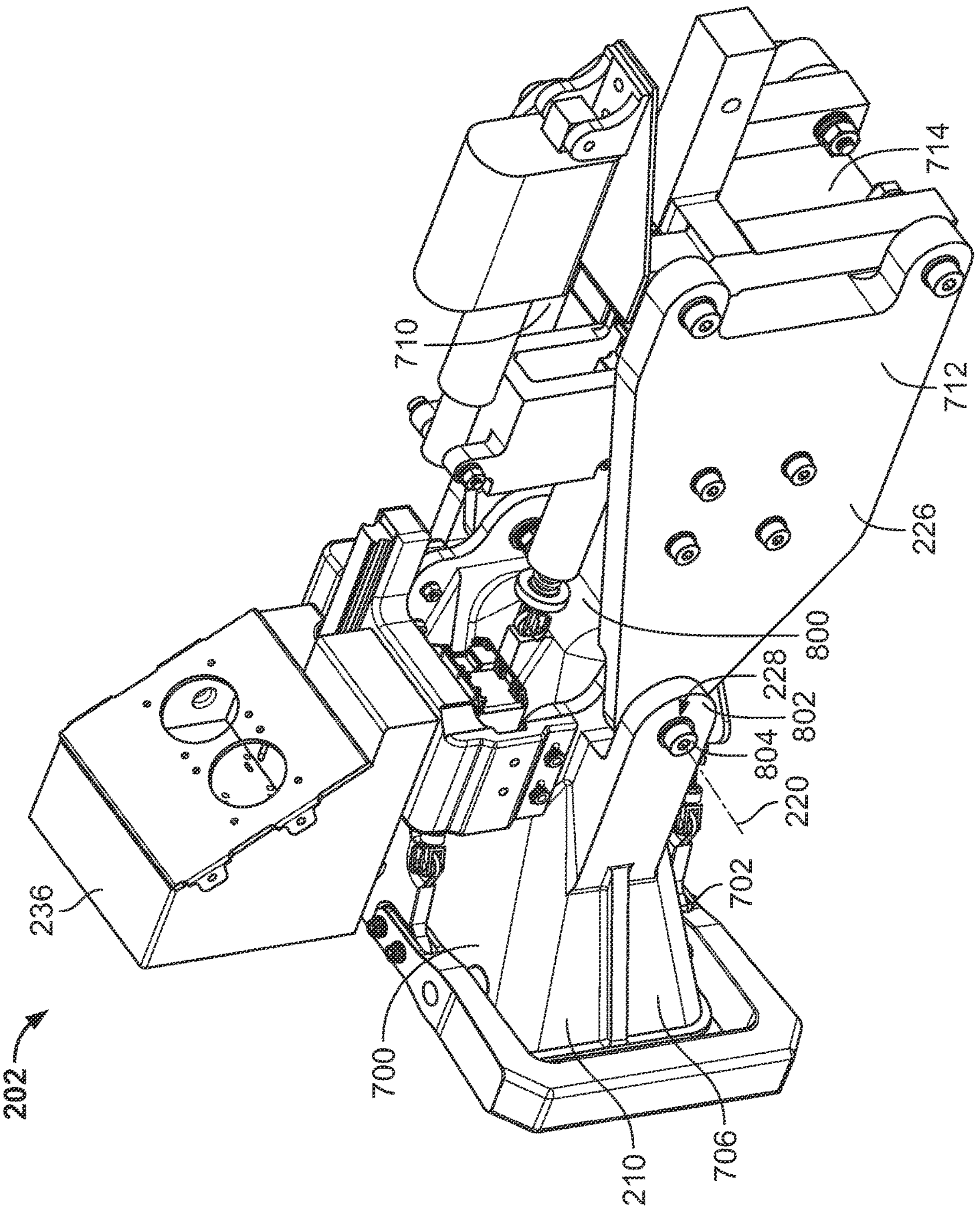
FIG. 8 is a perspective view of the example first docking assembly of the example docking system of FIGS. 2A-2C.

FIGS. 7 and 8 are perspective views of the first docking assembly 202. As shown in FIGS. 7 and 8, the receiver 210 has a first wall 700 (e.g., a top wall), a second wall 702 (e.g., a bottom wall) opposite the first wall 700, a third wall 704 between the first and second walls 700, 702, and a fourth wall 706 between the first and second walls 700, 702 opposite the third wall 704. The walls 700, 702, 704, 706 angle, taper, and/or otherwise converge inward to form a tip 800 (FIG. 8). In this example the tip 800 is rounded. In other examples the tip 800 can be shaped differently. The receiver 210 can be constructed (e.g., molded) as a single unitary part or component (e.g., a monolithic structure) or can be constructed of multiple parts or components that are coupled (e.g., bolted, welded) together. In the illustrated example, the receiver 210 has the same shape as the plug 212 (FIG. 3). In particular, the receiver 210 is pyramid-shaped. However, the receiver 210 is slightly larger than the plug 212. As such, the plug 212 can be inserted into the receiver 210 during a docking process. In some examples, the receiver 210 and the plug 212 are sized so that when the plug 212 is fully inserted into the receiver 210, the walls 300-306 (FIG. 3) of the plug 212 engage or contact the corresponding walls 700-706 of the receiver 210 and/or the tip 308 engages the tip 800. In some examples, the plug 212 is considered fully inserted into the receiver 210 when the plug 212 cannot be moved any further into the receiver 210. In some examples, the interface between the receiver 210 and the plug 212 forms a clearance fit or transition fit, which enables the plug 212 to be smooth and easily inserted into and removed from the receiver 210.

As shown in FIGS. 7 and 8, the first docking assembly 202 includes the first mounting interface 226, which is to be coupled (e.g., bolted) to the rear side 122 (FIG. 1) of the tow vehicle 102 (FIG. 1). In this example, the first mounting interface 226 is a bracket that includes a first plate 710, a second plate 712 parallel to the first plate 710, and a third plate 714 coupled between the first and second plates 710, 712. The first mounting interface 226 can be constructed (e.g., molded) as a single unitary part or component (e.g., a monolithic structure) or can be constructed of multiple parts or components that are coupled (e.g., bolted, welded) together.

As disclosed above, the receiver 210 is rotatably coupled to the first mounting interface 226. As shown of FIGS. 7 and 8, the receiver 210 includes a first attachment portion 716 (e.g., a first yoke) extending from the third wall 704 and a second attachment portion 802 (e.g., a second yoke) extending from the fourth wall 706. The first and second attachment portions 716, 802 may be integrally formed with the walls 704, 706. The first attachment portion 716 is rotatably coupled to the first plate 710 of the first mounting interface 226 by a first bolt 718 and the second attachment portion 802 is rotatably coupled to the second plate 712 of the first mounting interface 226 by a second bolt 804. The bolts 718, 804 form the joint 228 that enables the receiver 210 to rotate up or down about the pitch axis 220.

As shown in FIGS. 7 and 8, the first docking assembly 202 includes the first utility connector 236. The first utility connector 236 is coupled (e.g., bolted) to the receiver 210. Therefore, the first utility connector 236 moves with the receiver 210 as the receiver 210 rotates about the pitch axis 220. In this example, the first utility connector 236 is coupled to the first wall 700 (e.g., the top side) of the receiver 210 and is disposed over or above the receiver 210. As such, the first utility connector 236 is positioned to be aligned with the second utility connector 244 (FIG. 3) when the plug 212 (FIG. 3) and the receiver 210 are mated. In other examples, the first utility connector 236 can be coupled to another side of the receiver 210.

As shown in FIG. 7, the first wall 700 of the receiver 210 has a first slot 720 (e.g., a notch) and the second wall 702 of the receiver 210 has a second slot 722. When the plug 212 (FIG. 3) is fully inserted into the receiver 210, the first and second lock pins 216*a*, 216*b* (FIG. 3) move into the slots 720, 722. Once the lock pins 216*a*, 216*b* are in the slots 720, 722, the lock 214 (FIG. 2A) can engage the lock pins 216*a*, 216*b* to lock the plug 212 and the receiver 210 together, as disclosed in further detail herein.

In some examples, the docking system 200 includes one or more sensors to detect when the plug 212 (FIG. 3) is fully inserted into the receiver 210 to trigger the tow vehicle 102 to stop reversing and/or trigger one or more other operations (e.g., locking) of the docking system 200. For example, as shown in FIG. 7, the first dock assembly 202 may include a sensor 724 (e.g., a pressure sensor, a contact sensor) disposed on the inside of the receiver 210. When the plug 212 is fully inserted into the receiver 210, the plug 212 contacts the sensor 724. The sensor 724 can be electrically coupled (e.g., via the cables 252, 254) to the driving control system 132 (FIG. 1) of the tow vehicle 102. When the sensor 724 detects contact or a certain pressure, the driving control system 132 stops the tow vehicle 102 (if autonomously controlled) and/or triggers an alert for the driver (e.g., a flashing light on the dashboard). Thereafter, the docking control system 136 can activate one or more actuators to lock the plug 212 and the receiver 210, as disclosed in further detail herein. In another example, the sensor 724 can be implemented as a proximity sensor located at the tip 800 of the receiver 210 to detect the presence of the plug 212 when the plug 212 is fully inserted to end-of-travel. The sensor 724 ensures the locking and utility connectors are only engaged once the plug 212 is positioned fully at its end-of-travel. In other examples, the sensor 724 can be disposed in another location. Further, in addition to or as an alternative to the sensor 724, the docking system 200 can use other types of sensors to detect when the plug 212 is properly inserted into the receiver 210, such as an infrared (IR) sensor, a LIDAR sensor, a camera, etc.

Figure 9A:
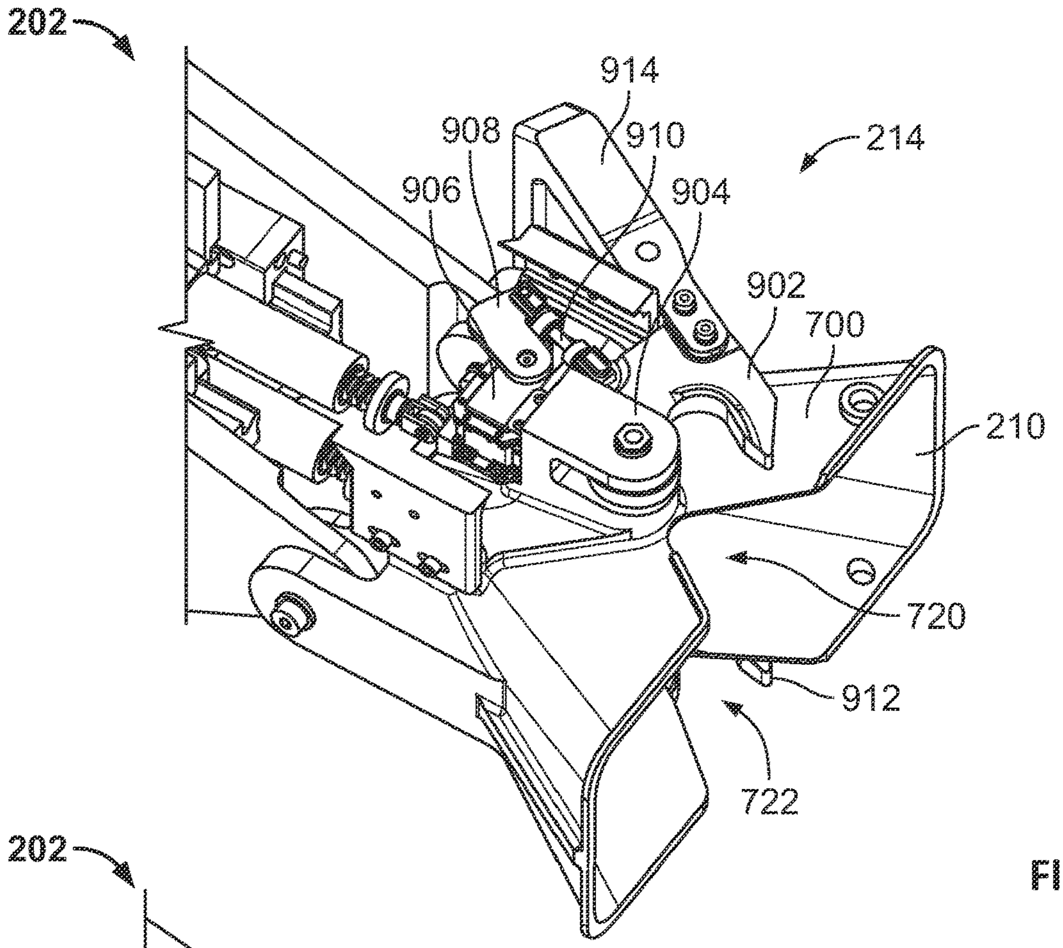
FIGS. 9A and 9B illustrate an example lock of the example first docking assembly of the example docking system of FIGS. 2A-2C.
Figure 9B:
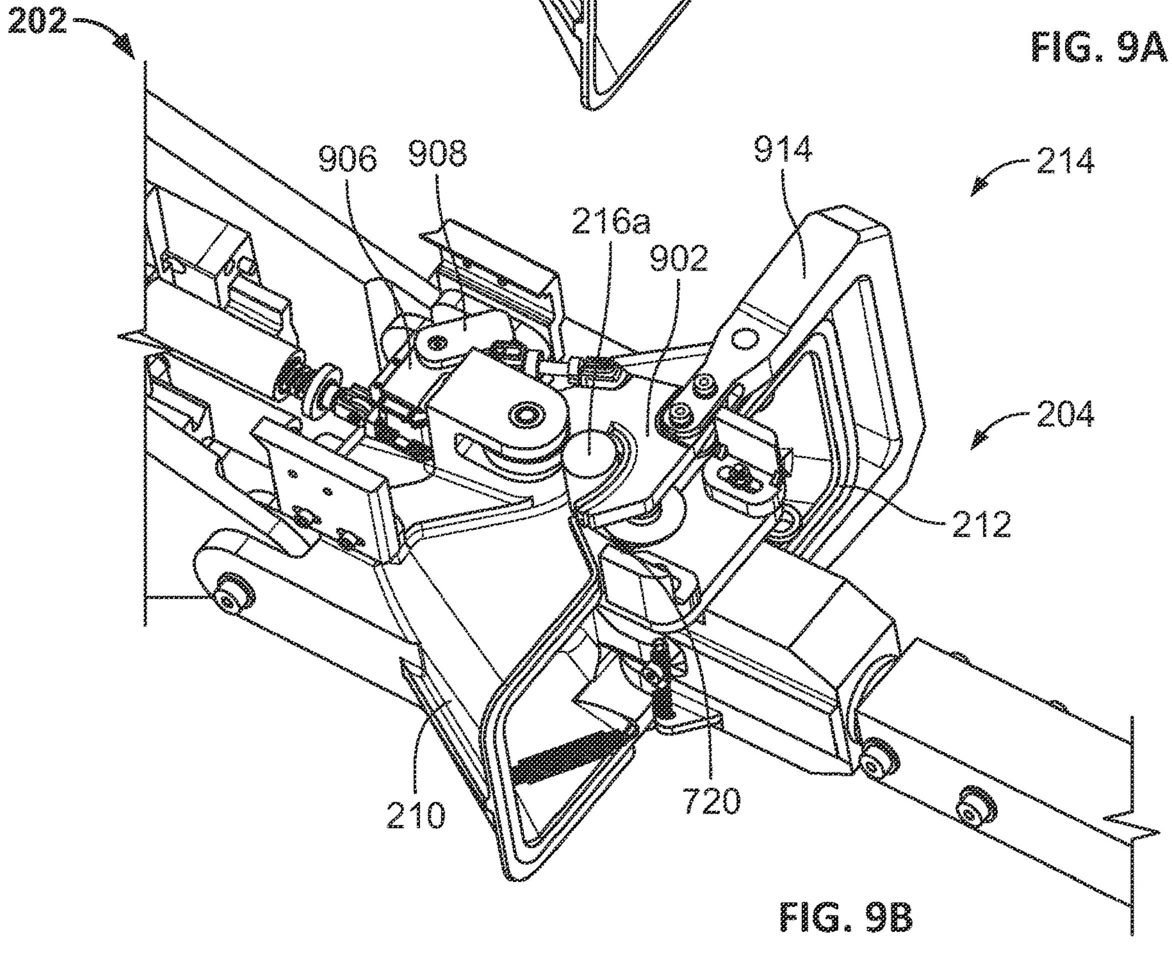

FIGS. 9A and 9B show the example lock 214 that may be included as part of the first docking assembly 202. FIG. 9A shows the lock 214 in an unlocked or open position, and FIG. 9B shows the lock 214 in a locked or closed position. As shown in FIG. 9A, the lock 214 includes a first lock jaw 902 (e.g., a latch) that is rotatably coupled to an attachment portion 904 (e.g., a yoke) extending from the first wall 700 of the receiver 210. The lock 214 includes an actuator 906 coupled to the receiver 210. The actuator 906 is controlled by the docking control system 136 (FIG. 1). The actuator 906 has a drive arm 908. The lock 214 includes a link 910 between the drive arm 908 and the first lockjaw 902. The first lockjaw 902 is disposed adjacent the first slot 720 in the first wall 700 of the receiver 210. In FIG. 9A the first lock jaw 902 is shown in an unlocked position in which the first lock jaw 902 is clear of the first slot 720. This allows the first lock pin 216*a* (FIG. 3) to be inserted into the first slot 720.

During a docking process, the plug 212 is inserted into the receiver 210 such that the first lock pin 216*a* is disposed in the first slot 720, as shown in FIG. 9B. Then, as shown in FIG. 9B, the actuator 906 can be activated to move the first lockjaw 902 to a locked position. When the actuator 906 is activated in a first direction, the drive arm 908 rotates the first lock jaw 902 to the locked position. As shown in FIG. 9B, the first lock jaw 902 is wrapped at least partially around and engages the first lock pin 216*a*. This prevents the plug 212 and the receiver 210 from separating. As such, the plug 212 and the receiver 210 are temporarily locked. This mechanically couples the first and second docking assemblies 202, 204, which enables the tow vehicle 102 (FIG. 1) to tow the trailer 104 (FIG. 1). The interface between the receiver 210 and the plug 212 forms a strong connection to enable load transfer during towing. To unlock the plug 212 and the receiver 210, the actuator 906 can be activated in the opposite direction to rotate the first lock jaw 902 back to the unlocked position shown in FIG. 9A.

As shown in FIG. 9A, the lock 214 includes a second lockjaw 912 on the bottom side of the receiver 210. The lock 214 can include a second actuator, drive arm, and link for rotating the second lock jaw 912. The second lockjaw 912 can be similarly moved to a locked position that wraps at least partially around the second lock pin 216*b* (FIG. 3). In the illustrated example, the lock 214 includes a handle 914 coupled between the first and second lock jaws 902, 912. The handle 914 rigidly connects the first and second lock jaws 902, 912. The handle 914 can be used for manually controlling the lock 214 (e.g., for manual override). Also, the handle 914 ensures the first and second lock jaws 902, 912 move in unison between the locked and unlocked positions. In some examples, the lock 214 over-centers the link 910 to prevent the need for the actuator 906 to overcome the loads during driving. In some examples, the lock 214 may only include one actuator, which drives both lock jaws 902, 912 simultaneously. In some examples, a bolt can be inserted through the handle 914 and into the receiver 210 to lock the handle 914 in place. This may provide an additional layer of safety to lock the system together.

Figure 10A:
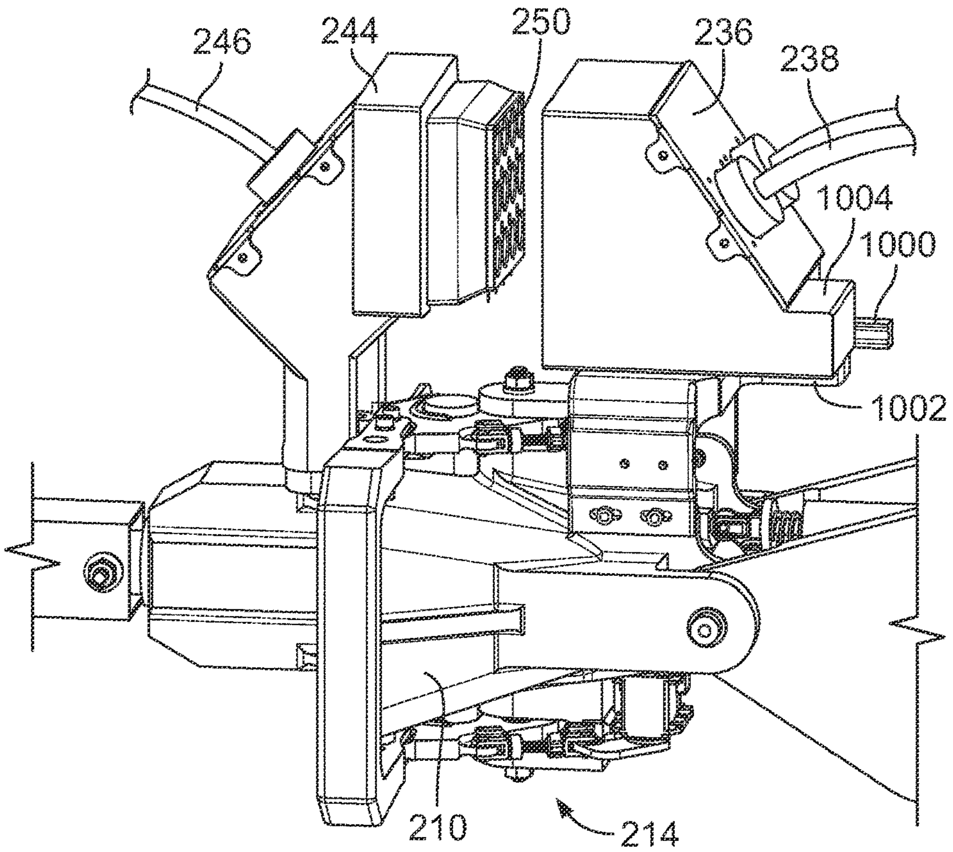
FIGS. 10A and 10B illustrate an example sequence of moving a first utility connector of the first docking assembly of FIGS. 2A-2C into engagement with a second utility connector of the second docking assembly of FIGS. 2A-2C.
Figure 10B:
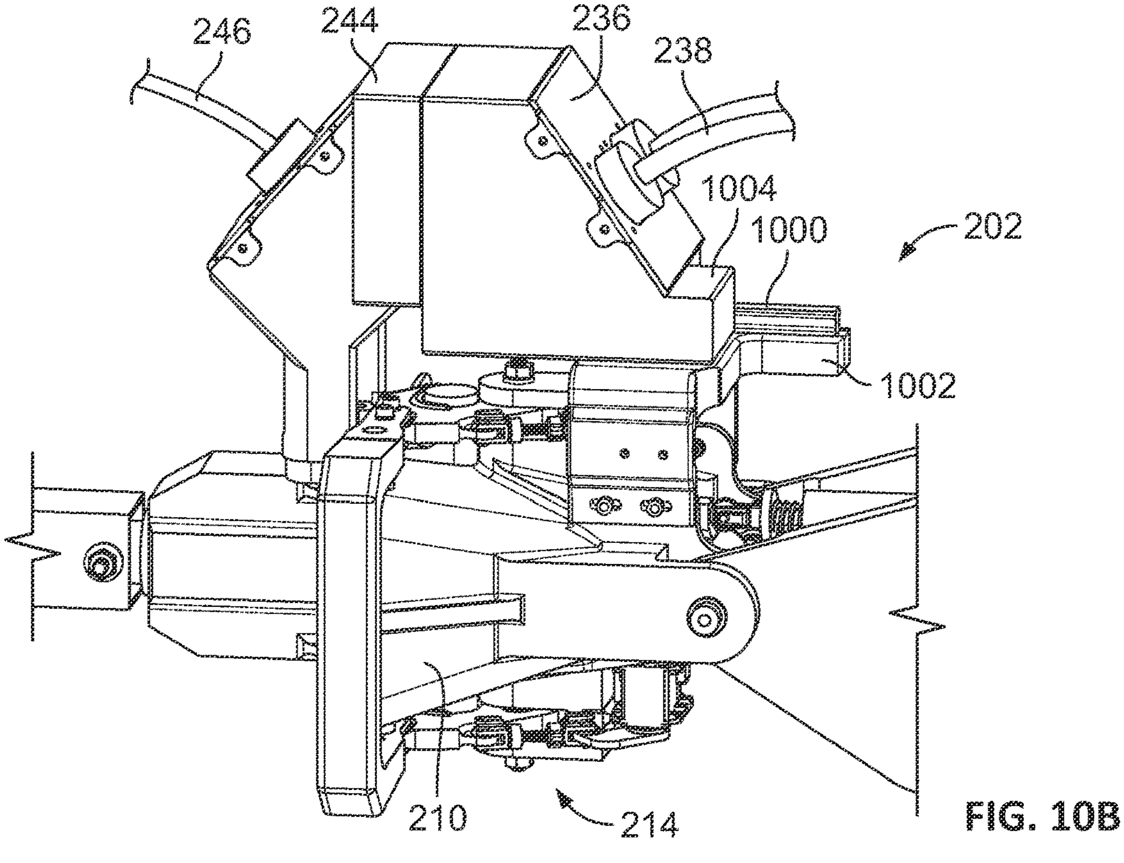

In some examples, after the plug 212 is fully inserted into the receiver 210, one of the first or second utility connectors 236, 244 can be moved toward the other one of the utility connectors 236, 244 to mate or connect the utility connectors 236, 244. The receiver 210 and the plug 212 ensure the utility connectors 236, 244 are in sufficient alignment to enable this utility connection operation. For example, as shown in FIGS. 10A and 10B, the first docking assembly 202 includes a track 1000 that is coupled by a bracket 1002 to the receiver 210. The first utility connector 236 is slidable along the track 1000. The first docking assembly 202 includes an actuator 1004 to move the first utility connector 236 linearly along the track 1000. The actuator 1004 is controlled by the docking control system 136 (FIG. 1). The first utility connector 236 is moveable (e.g., slidable) between a first position shown in FIG. 10A and a second position shown in FIG. 10B. After the plug 212 and the receiver 210 are locked, the actuator 1004 can be activated to move the first utility connector 236 from the first position (FIG. 10A) to the second position (FIG. 10B), such that the first utility connector 236 engages and/or otherwise mates with the second utility connector 244. This electrically couples the first and second cables 238, 246, which enables power and/or data (e.g., sensor data, commands, etc.) to be transferred between the tow vehicle 102 and the trailer 104. Additionally or alternatively, the first and second utility connectors 236, 244 can include connectors to provide fluid transfer between the tow vehicle 102 and the trailer 104. In some examples, the front side 250 of the second utility connector 244 has angled or chamfered edges, which function as a lead-in feature. This allows for the final positions and/or angular misalignments between the utility connectors 236, 244. In some examples, if the utility connectors 236, 244 include multiple individual electrical and/or fluid connectors, the connectors can include their own lead-in features.

In some examples, each of the utility connectors 236, 244 includes one or more connectors (e.g., electrical connectors, fluid connectors, etc.) for mating with corresponding connectors on the other utility connector 236, 244. Additionally or alternatively, the first and second docking assemblies 202, 204 can have multiple utility connectors, each with one or more connectors for providing electrical and/or fluid connections. For example, the first and second docking assemblies 202, 204 can each include five separate utility connectors.

In some examples, during a docking process, the lock 214 is activated first to lock the plug 212 and the receiver 210 together, and then the actuator 1004 is activated to connect the first and second utility connectors 236, 244. In other examples, the actuator 1004 can be activated simultaneously as the actuator 906 of the lock 214. As such, both the locking and utility (e.g., electrical, fluid) connection operations can occur simultaneously. In some examples, one actuator can be used to drive both the lock and utility connection operations, an example of which is disclosed in further detail in connection with FIGS. 24A and 24B.

Figure 10C:
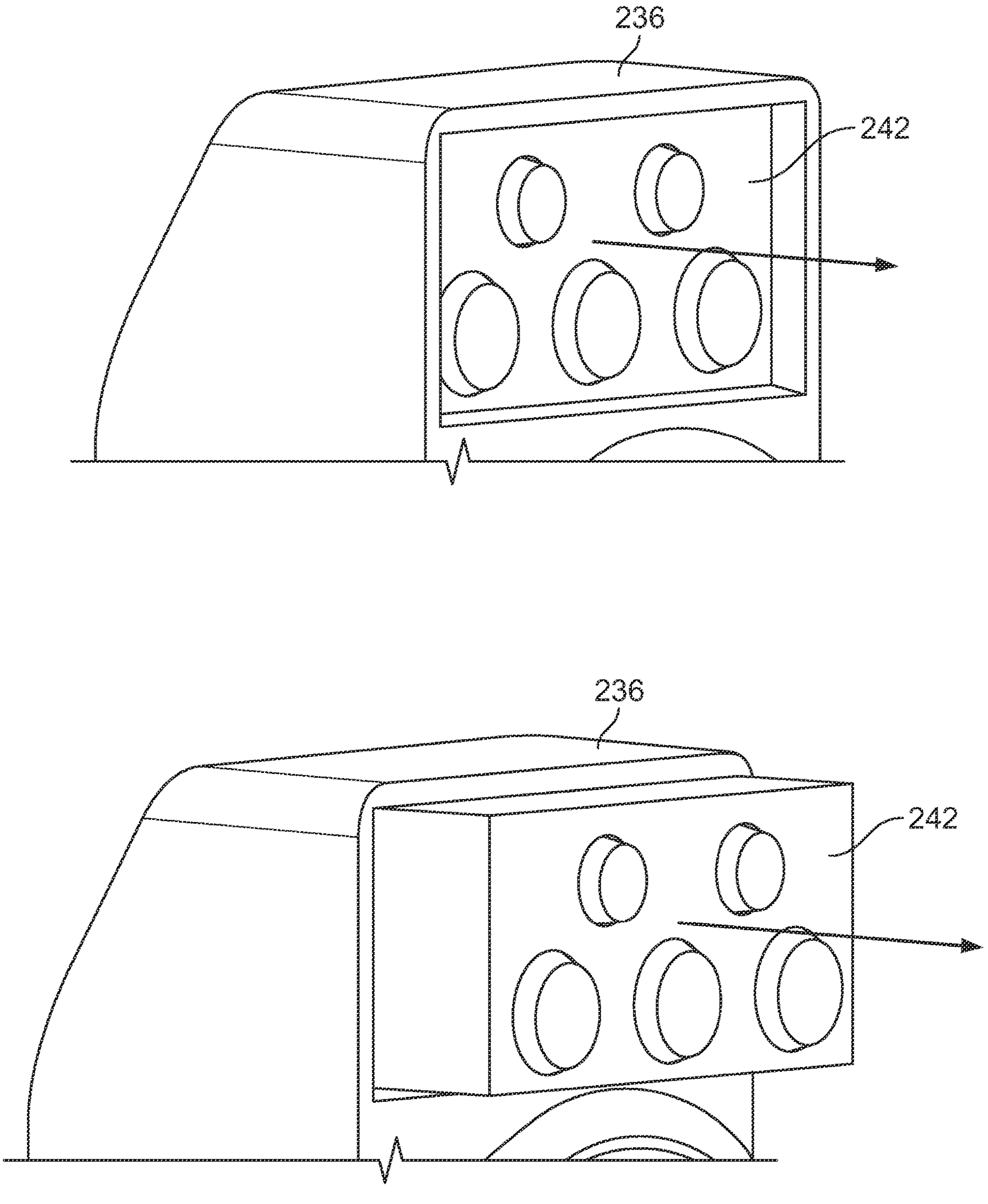
FIG. 10C illustrates an example movable side of the example first utility connector of FIGS. 10A and 10B.

In some examples, as shown in FIG. 10C, only the rear side 242 of the first utility connector 236 is moveable. The rear side 242 carries the pins, sockets, and/or other connectors for making contact with the front side 250 of the second utility connector 244. The rear side 242 may be activated by an actuator, such as the actuator 1004.

Figure 11:
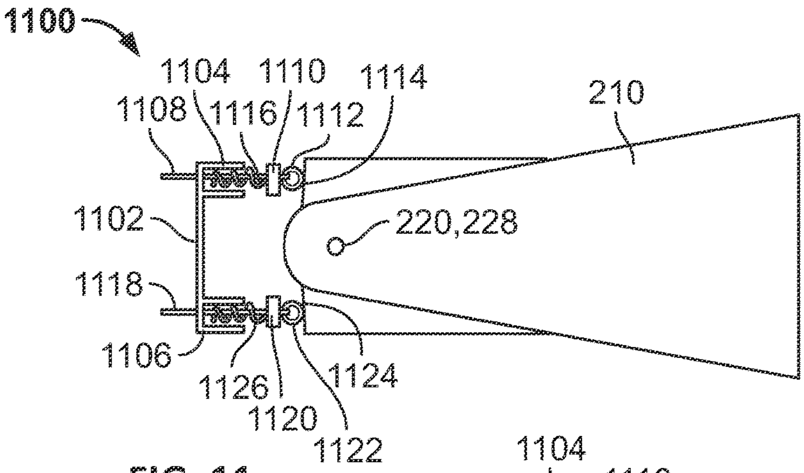
FIG. 11 is a schematic of an example pitch compliance mechanism implemented in connection with an example receiver of the example first docking assembly of FIGS. 2A-2C.

In some examples, the first docking assembly 202 includes one or more features or mechanisms to center or bias the receiver 210 to a neutral or central pitch position. This limits or prevents the receiver 210 from tilting downward due to gravity, which can make the docking process more difficult. FIG. 11 is a schematic of an example pitch compliance mechanism 1100 that can be included in the first docking assembly 202. The compliance mechanism 1100 includes a frame 1102, a first guide 1104 coupled to the frame 1102, and a second guide 1106 coupled to the frame 1102. The frame 1102 may be moveably coupled to the first mounting interface 226 (FIGS. 6 and 7). The compliance mechanism 1100 also includes a first rod 1108 extending through the first guide 1104 and is slidable relative to the frame 1102. The first rod 1108 has a first end stop 1110 and a first end roller 1112 at an end of the first rod 1108. As shown in FIG. 11, the first end roller 1112 is engaged with a first cam surface 1114 on the receiver 210. The compliance mechanism 1100 includes a first spring 1116 between the frame 1102 and first end stop 1110 to bias the first end roller 1112 toward the first cam surface 1114 on the receiver 210. The compliance mechanism 1100 also includes a second rod 1118 extending through the second guide 1106 and is slidable relative to the frame 1102. The second rod 1118 has a second end stop 1120 and a second end roller 1122 at an end of the second rod 1118. As shown in FIG. 11, the second end roller 1122 is engaged with a second cam surface 1124 on the receiver 210. The compliance mechanism 1100 includes a second spring 1126 between the frame 1102 and second end stop 1120 to bias the second end roller 1122 toward the second cam surface 1124 on the receiver 210.

The receiver 210 is rotatable about the joint 228, which defines the pitch axis 220. As shown in FIG. 11, the first rod 1108 and the second rod 1118 are on opposite sides of a plane (a horizontal plane) in which the pitch axis 220 lies. As such, the first rod 1108 biases the receiver 210 downward (clockwise in FIG. 11), while the second rod 1118 biases the receiver 210 upward (counter-clockwise in FIG. 11). These forces help to maintain the receiver 210 in a neutral or central position shown in FIG. 11, but still enables the receiver 210 or rotate about the pitch axis 220. This prevents the receiver 210 from drooping or tilting downward due to gravity, but still enables the receiver 210 to rotate to account for misalignments with the plug 212 (FIG. 3).

In some examples, the compliance mechanism 1100 can be switched or operated between different modes based on the state of the tow vehicle 102. The compliance mechanism 1100 may be referred to as an active or mode-switching compliance mechanism. For example, in a first mode, the receiver 210 can be locked from rotating about the pitch axis 220. This may be beneficial while the tow vehicle 102 (FIG. 1) is driving around without the trailer 104 (FIG. 1) to prevent the receiver 210 from bouncing up and down, which reduces stress and wear on the compliance mechanism 1100. In a second mode, the receiver 210 may be rotatable about the pitch axis 220, but biased to the neutral or central position (as shown in FIG. 11). This may be beneficial during a docking process to ensure the receiver 210 remains in a neutral or central position, but still allows the receiver 210 to rotate up or down to account for misalignment of the pitch angle between the plug 212 and the receiver 210. In a third mode, the receiver 210 may be freely rotatable about the pitch axis 220, without being biased in either direction. This may be beneficial while the tow vehicle 102 is towing the trailer 104 to enable the receiver 210 and the plug 212 to freely rotate up and down while driving over uneven terrain. This allows a wider range of pitch motion and also reduces undue stress and wear on the compliance mechanism 1100. In some examples, the mode is controlled by the docking control system 136. The compliance mechanism 1100 may be switched between the first, second, and third modes by moving the frame 1102, as disclosed in further detail below.

Figure 12A:
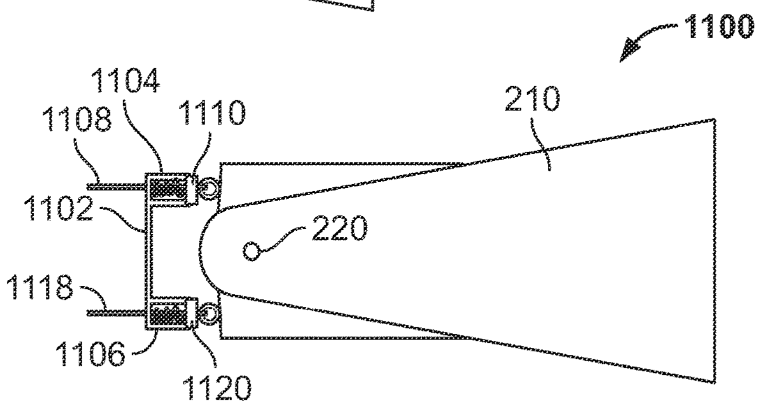
FIGS. 12A-12C show the example pitch compliance mechanism of FIG. 11 in a first mode, a second mode, and a third mode, respectively.

FIG. 12A shows the compliance mechanism 1100 in the first mode. As shown in FIG. 12A, the frame 1102 is in a first position, which corresponds to the first mode. When the frame 1102 is in the first position, the first guide 1104 is engaged with the first end stop 1110 to prevent the first rod 1108 from moving relative to the frame 1102. Similarly, the second guide 1106 is engaged with the second end stop 1120 to prevent the second rod 1118 from moving relative to the frame 1102. Therefore, the receiver 210 is prevented from rotating in either direction. As such, the receiver 210 is locked in the neutral or central pitch position and cannot rotate about the pitch axis 220.

Figure 12B:
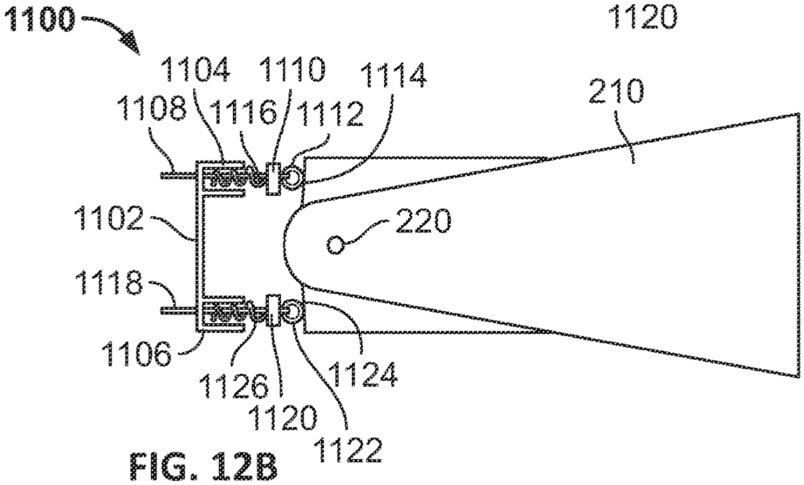

FIG. 12B shows the compliance mechanism 1100 in the second mode. As shown in FIG. 12B, the frame 1102 has been moved (to the left in FIG. 12B) to a second position, which corresponds to the second mode. When the frame 1102 is in the second position, the first guide 1104 is spaced from the first end stop 1110 and the first end roller 1112 is engaged with the first cam surface 1114 of the receiver 210. The first rod 1108 can slide back and forth, which enables the receiver 210 to rotate about the pitch axis 220. Similarly, the second guide 1106 is spaced from the second end stop 1120 and the second roller 1122 is engaged with the second cam surface 1124 of the receiver 210. The second rod 1118 can slide back and forth, which enables the receiver 210 to rotate. Additionally, in this second position, the first and second springs 1116, 1126 bias the end rollers 1112, 1122 into the receiver 210, which biases the receiver 210 to the neutral or central pitch position.

Figure 12C:
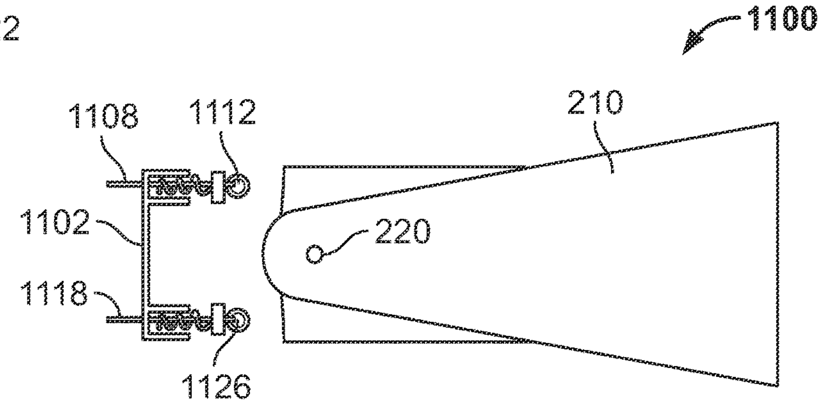

FIG. 12C shows the compliance mechanism 1100 in the third mode. As shown in FIG. 12C, the frame 1102 has been moved (to the left in FIG. 12C) to a third position, which corresponds to the third mode. When the frame 1102 is in the third position, the first and second end rollers 1112, 1122 are spaced from the receiver 210. As such, neither of the rods 1108, 1118 is engaged with the receiver 210. As a result, the receiver 210 is able to rotate freely about the pitch axis 220.

In some examples, the compliance mechanism 1100 allows a first range of motion of the receiver 210 in the second mode and a second range of motion of the receiver 210 in the third mode. For example, in the second mode, the receiver 210 may be rotated to a position where one of the end stops 1110, 1120 is pushed into the guides 1104, 1106, which provides a limit or stop. However, in the third mode, the end rollers 1112, 1122 are moved away from the receiver 210 and, thus, there is a greater (e.g., maximum) range of motion. Therefore, the compliance mechanism 1100 can switch between the first mode during driving without the trailer 104 so the receiver 210 is locked, the second mode during docking to center the receiver 210, and the third mode during towing to allow the full range of motion and reduce wear on the compliance mechanism 1100.

Figure 13:
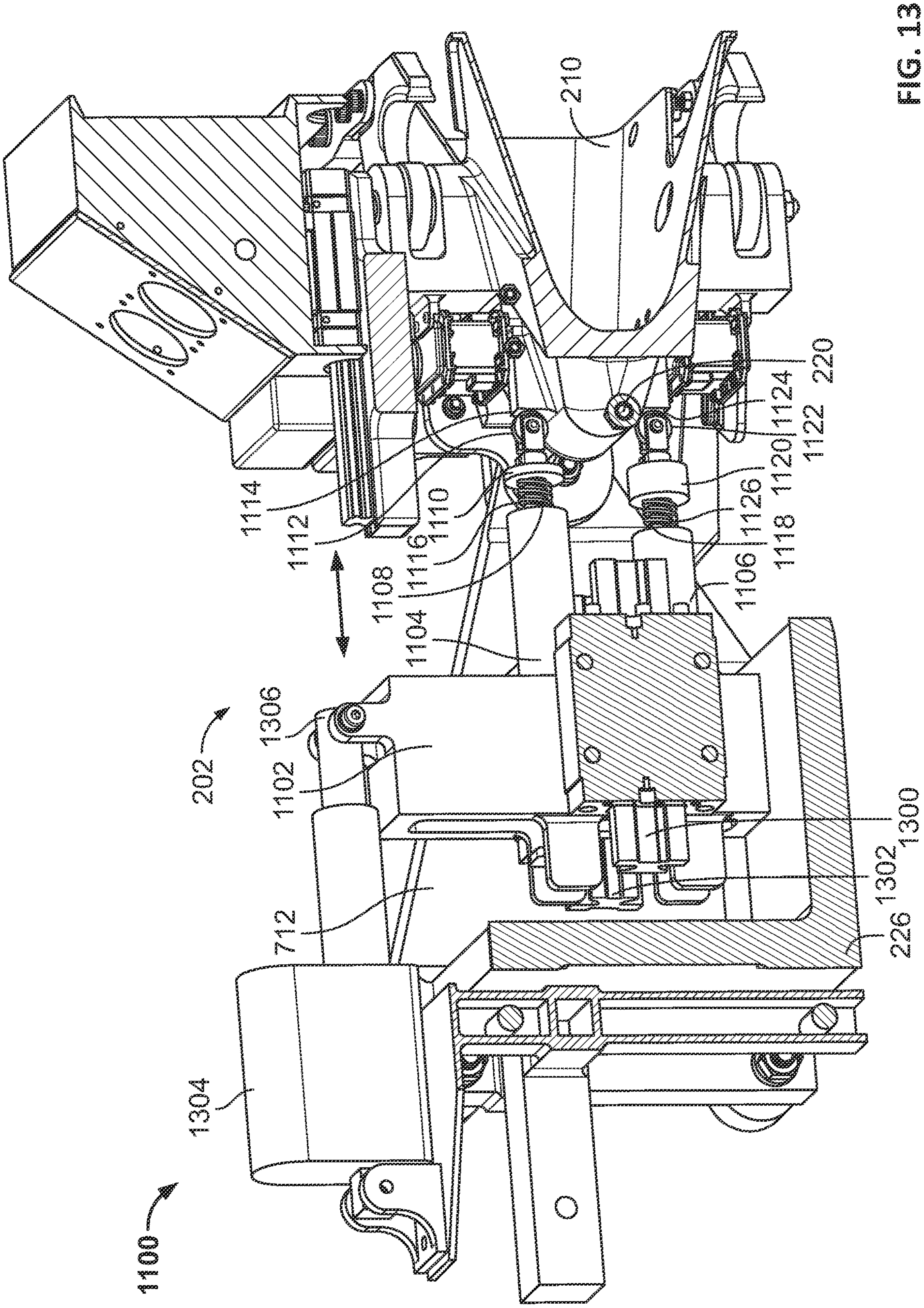
FIG. 13 illustrates an example physical implementation of the example pitch compliance mechanism of FIG. 11.

FIG. 13 is an example of a physical implementation of the compliance mechanism 1100 shown in connection with the first docking assembly 202. In FIG. 13, the first docking assembly 202 is partially cross-sectioned. In the illustrated example, the first docking assembly 202 includes first and second tracks 1300, 1302, which are coupled to the frame 1102. The tracks 1300, 1302 are slidably coupled to the first and second plates 710, 712 respectively of the first mounting interface 226. As such, the frame 1102 is moveably coupled to the first mounting interface 226. As shown in FIG. 13, the guides 1104, 1106 are coupled to and extend outward from the frame 1102 toward the receiver 210. The first rod 1108 extends through the first guide 1104. The first rod 1108 includes the first end stop 1110 and the first end roller 1112, which is engaged with the first cam surface 1114 of the receiver 210 in the position in FIG. 13. The first spring 1116 is disposed around the first rod 1108. The second rod 1118 includes the second end stop 1120 and the second end roller 1122, which is similarly engaged with the second cam surface 1124 of the receiver 210 in the position of FIG. 13. The second spring 1126 is disposed around the second rod 1118.

In FIG. 13, the frame 1102 is in the second position, which corresponds to the second mode. Therefore, the receiver 210 is rotatable about the pitch axis 220, and the first and second rods 1108, 1118 bias the receiver 210 toward the neutral or central pitch position. To switch to the compliance mechanism 1100 to the first mode, the frame 1102 can be moved to the right in FIG. 13 to the first position. In such a position, the guides 1104, 1106 engage the first and second end stops 1110, 1120, which prevents the rods 1108, 1118 from moving, thereby locking the receiver 210 in the neutral or central pitch position. To switch the compliance mechanism 1100 to the third mode, the frame 1102 can be moved to the left in FIG. 13 to the third position. This also moves the rods 1108, 1118 to the left such that the end rollers 1112, 1122 are spaced apart from the receiver 210. As a result, the receiver 210 is not biased by the compliance mechanism 1100 and can rotate freely about the pitch axis 220.

In the illustrated example, the compliance mechanism 1100 includes an actuator 1304 to move the frame 1102. The actuator 1304 is controlled by the docking control system 136 (FIG. 1). The actuator 1304 is coupled to the first mounting interface 226. The actuator 1304 has a moveable stem 1306 that is coupled to the frame 1102. In this example, the actuator 1304 is a linear actuator. However, in other examples, the actuator 1304 can be implemented by another type of actuator (e.g., a rotary actuator). The actuator 1304 can be activated to move the stem 1306 inward or outward, which moves the frame 1102 left or right between the first, second, and third positions, corresponding to the first, second, and third modes, respectively.

Figure 14:
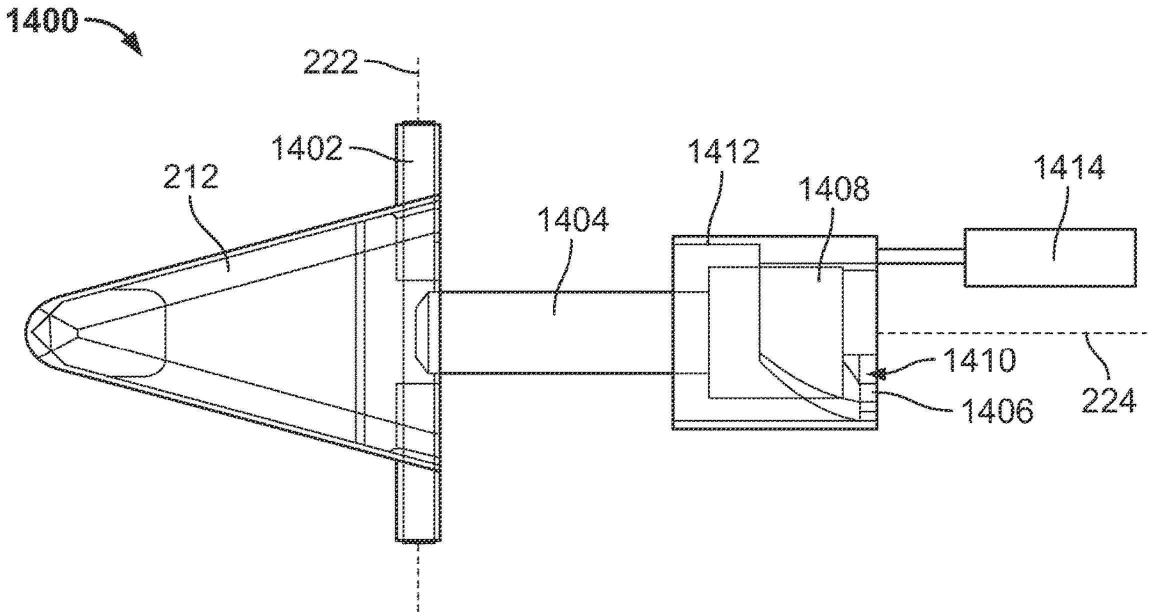
FIG. 14 is a side view of an example roll compliance mechanism and an example plug that can be implemented in connection with the example second docking assembly of FIGS. 2A-2C.
Figure 15:
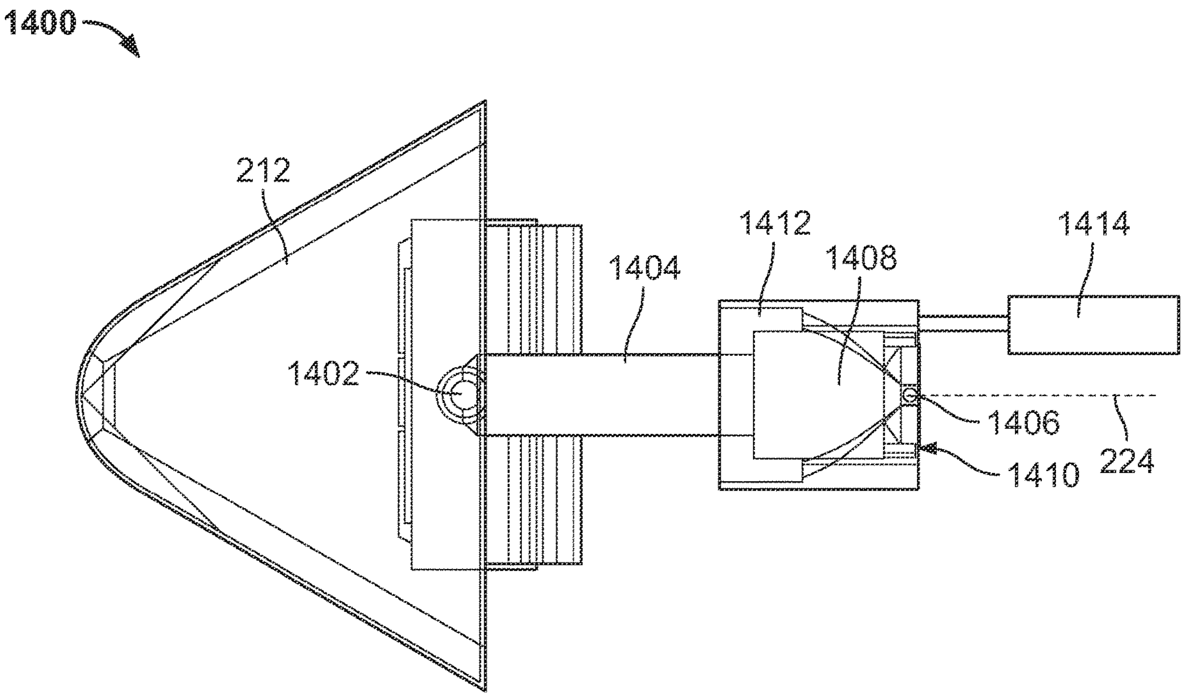
FIG. 15 is another side view of the example roll compliance mechanism and the example plug of FIG. 14.

In some examples, the second docking assembly 204 can include one or more compliance mechanisms for affecting the yaw and/or roll movements of the plug 212. For example, FIGS. 14 and 15 illustrate an example roll compliance mechanism 1400 that can be implemented in connection with the plug 212. FIG. 14 is a side view of the plug 212 with the example roll compliance mechanism 1400, and FIG. 15 is a top view of the plug 212 with the example roll compliance mechanism 1400. In this example, the plug 212 is rotatably coupled to a transverse shaft 1402. The plug 212 is rotatable about the transverse shaft 1402, which defines the yaw axis 222. Further, a central shaft 1404 is coupled to and extends from the transverse shaft 1402. The central shaft 1404 is rotatable about the roll axis 224, which enables the plug 212 to rotate about the roll axis 224. The shaft 1404 can be rotatably coupled to the trailer 104 directly or via one or more intermediary structures. In the illustrated example, an end of the central shaft 1404 has a post 1406 (e.g., a pin, a peg) extending radially outward. The compliance mechanism 1400 includes a limit sleeve 1408 around the central shaft 1404. The limit sleeve 1408 remains in a fixed position. The central shaft 1404 is rotatable in the limit sleeve 1408, which enables the plug 212 to rotate about the roll axis 224. The post 1406 is positioned within a slot 1410 in the limit sleeve 1408. This defines the rotational limit or range of the central shaft 1404 and, thus, of the plug 212. As shown in FIGS. 14 and 15, the roll compliance mechanism 1400 includes a locking sleeve 1412 around the limit sleeve 1408 and the central shaft 1404. The locking sleeve 1412 is slidable in a linear direction (left or right in FIGS. 14 and 15) along the central shaft 1404. The roll compliance mechanism 1400 includes an actuator 1414 that can be activated to move the locking sleeve 1412. The actuator 1414 is controlled by the docking control system 136 (FIG. 1).

Figure 16:
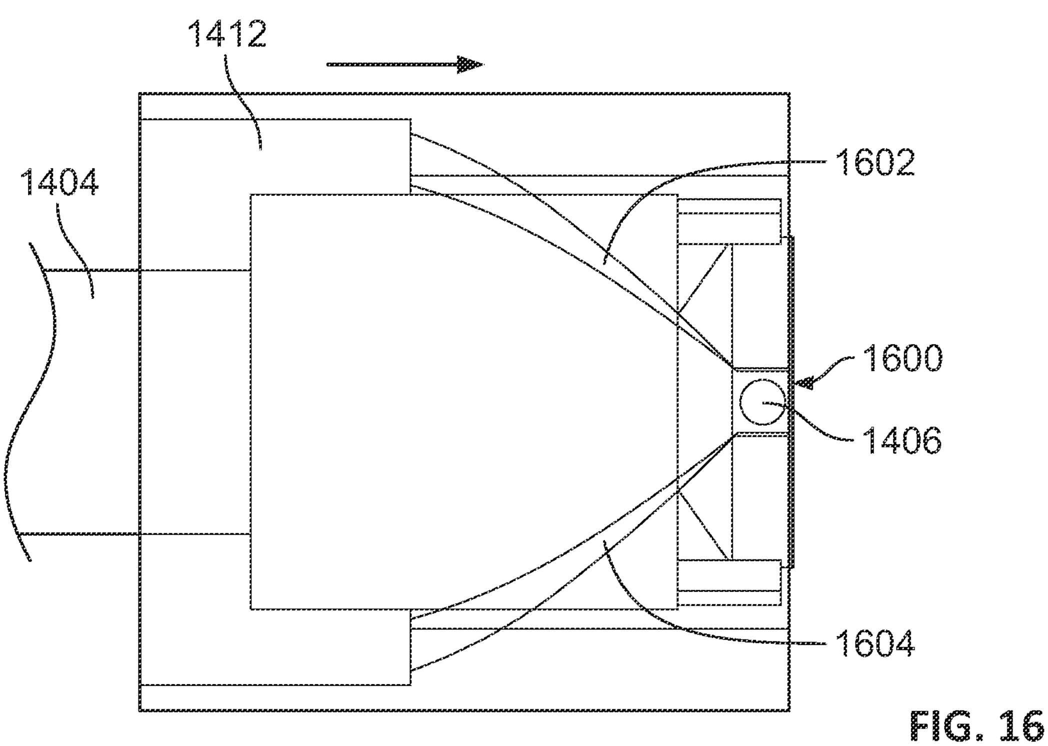
FIG. 16 is an enlarged view of the example roll compliance mechanism of FIG. 15.
Figure 17:
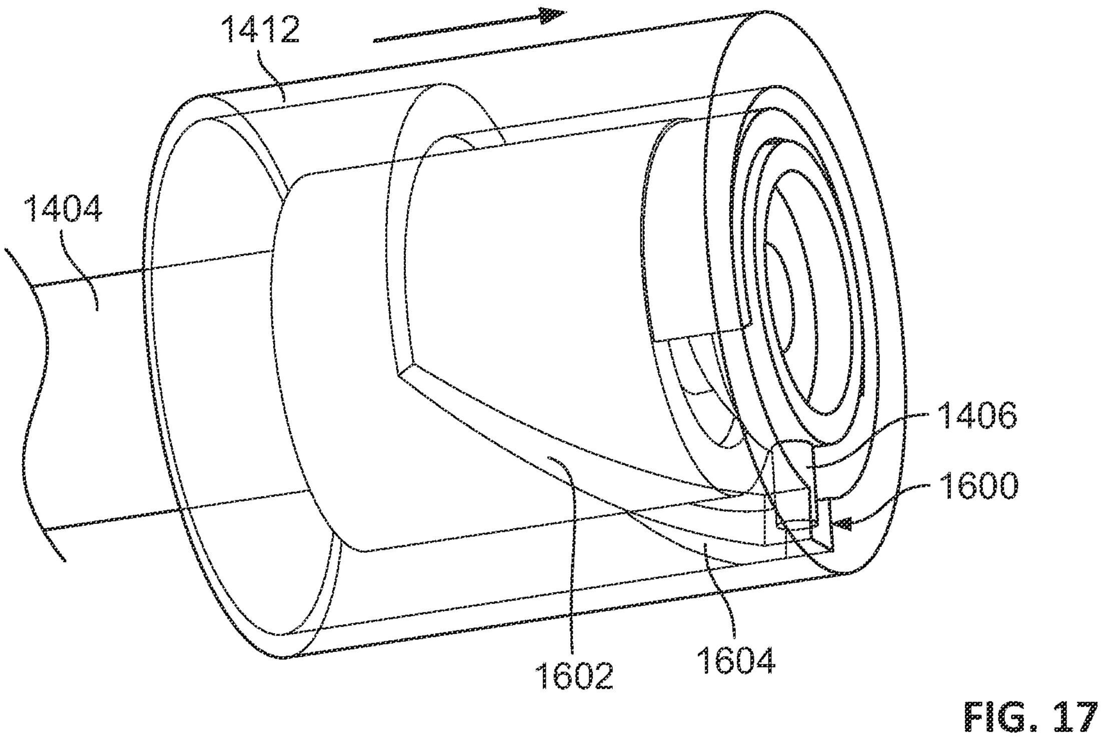
FIG. 17 is a perspective view of the example roll compliance mechanism of FIGS. 14 and 15.

FIG. 16 is an enlarged view of the central shaft 1404 and the locking sleeve 1412 from FIG. 15, and FIG. 17 is a perspective view of the central shaft 1404 and the locking sleeve 1412. As shown in FIGS. 16 and 17, an inner surface of the locking sleeve 1412 includes a notch 1600 and two helical surfaces 1602, 1604 that are angled outward from the notch 1600. In the position shown in FIGS. 16, and 17, the post 1406 is disposed in the notch 1600. This prevents the central shaft 1404 from rotating and, thus, prevents the plug 212 from rotating about the roll axis 224 (FIGS. 14 and 15). This position or mode may be referred to as a locked mode, because the plug 212 (FIGS. 14 and 15) is locked from rotating about the roll axis. The actuator 1414 (FIGS. 14 and 15) can be activated to move the locking sleeve 1412 to the right in FIGS. 16 and 17 (in the direction of the arrow) to a second position. When the locking sleeve 1412 is moved to the right, the post 1406 is disposed in the space or gap between the helical surfaces 1602, 1604. This enables the central shaft 1404 to rotate in either direction until the post 1406 engages one of the helical surfaces 1602, 1604. This position or mode may be referred to as an unlocked mode, since the plug 212 can rotate about the roll axis 224. The actuator 1414 can be activated to move the locking sleeve 1412 back in the left direction to the first position. During this movement, one of the helical surfaces 1602, 1604 may engage the post 1406 and direct the post 1406 to the notch 1600, thereby centering the plug 212 about the roll axis 224. Thus, the locking sleeve 1412 can be slid back and forth to lock or unlock the roll joint. In some examples, the locking sleeve 1412 is actuated using the same actuator as the stabilizer leg 120 (FIG. 1), thereby eliminating the need for an additional actuator on the trailer 104.

Figure 18:
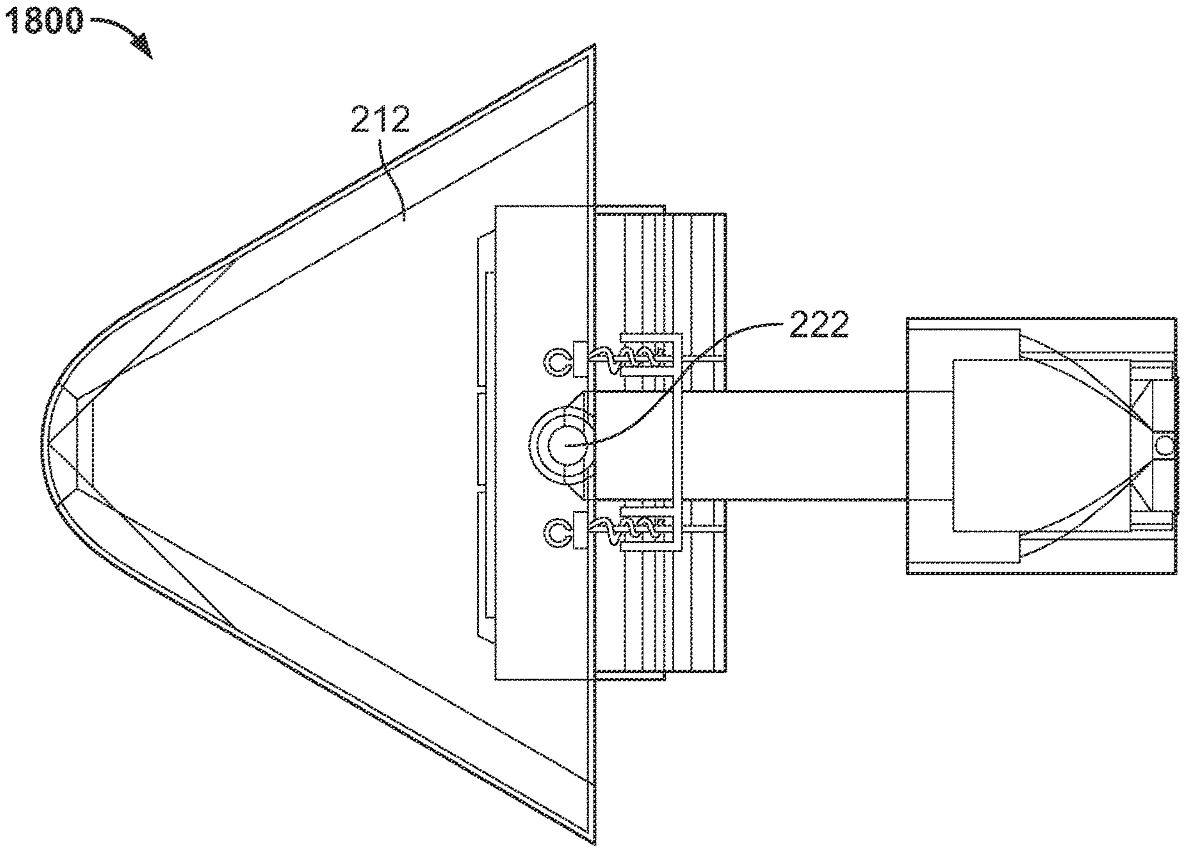
FIG. 18 illustrates an example yaw compliance mechanism that can be implemented in connection with the example plug of FIG. 14.

In some examples, the second docking assembly 204 can similarly include a yaw compliance mechanism for affecting the state of the yaw rotation. For example, FIG. 18 shows an example yaw compliance mechanism 1800 that can be implemented in connection with the plug 212. The yaw compliance mechanism 1800 is substantially the same as the pitch compliance mechanism 1100 disclosed in connection with FIGS. 11-13 for the receiver 210. The yaw compliance mechanism 1800 can operate in substantially the same manner as the compliance mechanism 1100. For example, the yaw compliance mechanism 1800 can operate between a first mode in which the plug 212 is locked from rotating about the yaw axis 222, a second mode in which plug 212 is rotatable about the yaw axis 222 and biased to a neutral or central yaw position, and a third mode in which the plug 212 is freely rotatable about the yaw axis 222. To avoid redundancy, a description of the components of the yaw compliance mechanism 1800 is not repeated. Instead, it is understood that the example yaw compliance mechanism 1800 can include the same or similar components as the pitch compliance mechanism 1100 and operate in a substantially similar manner. In some examples, the sleeve 1412 of the compliance mechanism 1400 and the frame of the compliance mechanism 1800 are operably connected, such that the roll and yaw compliance can be actuated simultaneously.

In some examples, the roll compliance mechanism 1400 and the yaw compliance mechanism 1800 are only powered when the docking assemblies 202, 204 are docked and electrically connected. This enables the trailer 104 to remain passive and unpowered when disconnected from the tow vehicle 102. When the docking assemblies 202, 204 are not connected, i.e., the trailer 104 is not connected to the tow vehicle 102, the roll compliance mechanism 1400 and the yaw compliance mechanism 1800 may default to a certain mode or state. For example, the roll compliance mechanism 1400 may default to the unlocked mode where the plug 212 can rotate about the roll axis 224. As such, when the trailer 104 is not connected to the tow vehicle 102, the plug 212 is rotatable about the roll axis 224, which improves alignment during the docking process. Similarly, the yaw compliance mechanism 1800 may default to the second mode where the plug 212 is rotatable about the yaw axis 222. However, once the first and second docking assemblies 202, 204 are fully docked and electrically connected, power is provided to the trailer 104, and the roll compliance mechanism 1400 and the yaw compliance mechanism 1800 can be switched between the different modes. For example, the docking control system 136 may activate the actuator 1414 to switch the roll compliance mechanism 1400 into the locked mode to lock the roll joint. Similarly, the docking control system 136 may switch the yaw compliance mechanism 1800 to the first mode to lock the yaw joint.

Figure 19:
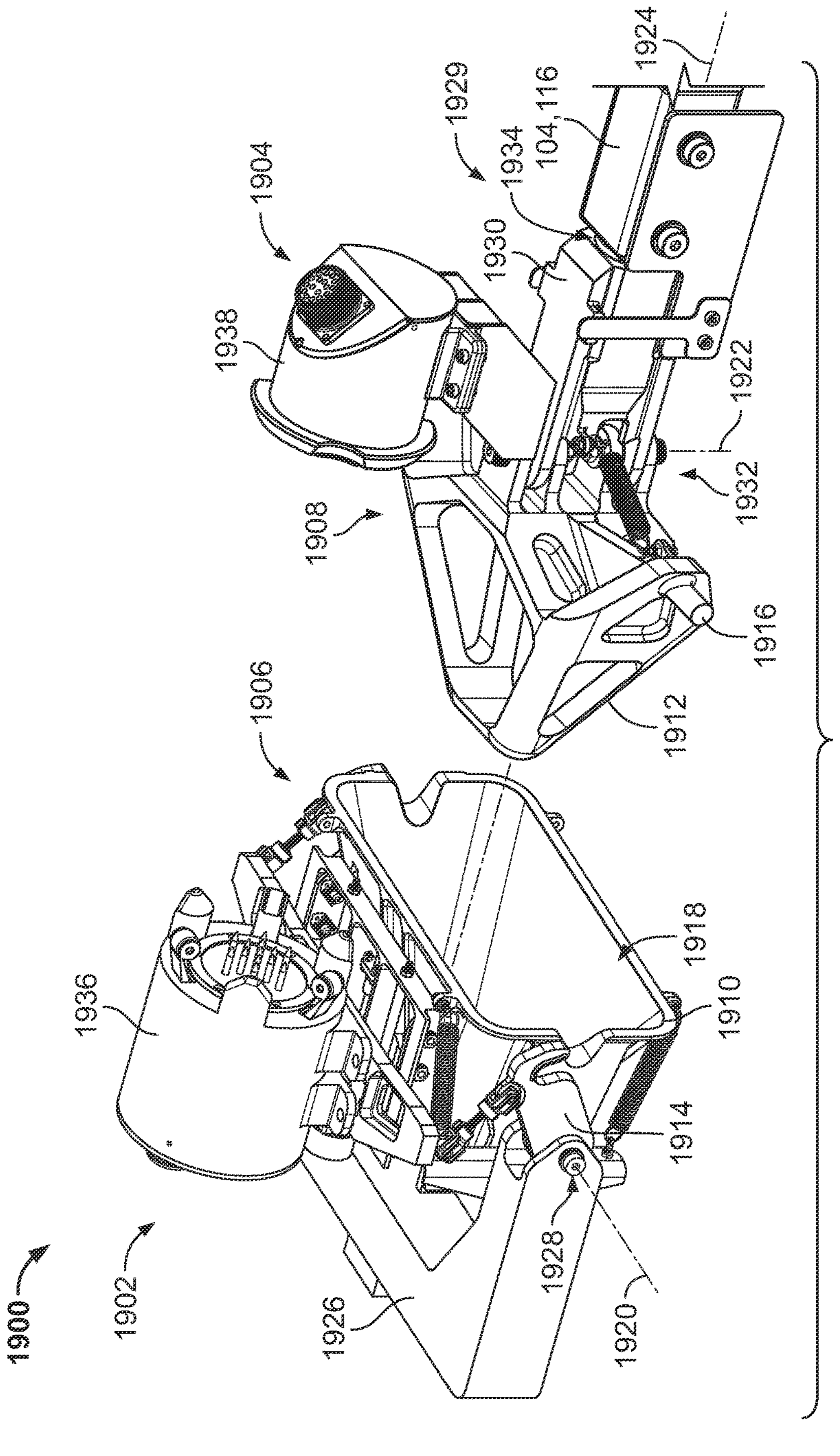
FIG. 19 illustrates another example docking system including an example first docking assembly and an example second docking assembly that can be implemented as the example docking system of FIG. 1.

FIG. 19 illustrates another example docking system 1900 that can be implemented as the docking system 106 of FIG. 1. The docking system 1900 includes a first docking assembly 1902 to be coupled to the tow vehicle 102 (FIG. 1) and a second docking assembly 1904 to be coupled to the tow bar 116 (FIG. 1) of the trailer 104 (FIG. 1). The docking assemblies 1902, 1904 can be mechanically and electrically coupled to thereby enable the tow vehicle 102 to tow the trailer 104 and provide power and communication between the tow vehicle 102 and the trailer 104. FIG. 19 shows the first and second docking assemblies 1902, 1904 in a separated state. Certain components of the example docking system 1900 are the same or substantially the same as corresponding components of the docking system 200 disclosed herein. Therefore, many of the components of the example docking system 1900 are not repeated herein. Instead, it is understood that any of the example aspects disclosed in connection with the docking system 200 can likewise apply to the docking system 1900. Similarly, any of the example aspects disclosed in connection with the docking system 1900 can likewise apply to the docking system 200.

In the illustrated example, the first docking assembly 1902 includes a first mechanical connector 1906 and the second docking assembly 1904 include a second mechanical connector 1908. In the illustrated example, the first mechanical connector 1906 includes a first interface component 1910 and the second mechanical connector 1908 includes a second interface component 1912. Further, the first mechanical connector 1906 includes a lock 1914, and the second mechanical connector 1908 includes a lock pin 1916, which can be engaged by the lock 1914 to mechanically lock the first and second docking assemblies 1902, 1904. In the illustrated example, the first interface component 1910 is implemented as a receiver (a socket), referred to herein as the receiver 1910, and the second interface component 1912 is implemented as a plug, referred to herein as the plug 1912. The receiver 1910 has an opening 1918 and is shaped to receive the plug 1912. During a docking process, the plug 1912 is inserted into the opening 1918 of the receiver 1910 and locked in the receiver 210. In the illustrated example, the receiver 1910 and the plug 1912 have the same pyramid shape as the receiver 210 and the plug 212 disclosed above.

Similar to the docking system 200 disclosed above, the receiver 1910 is rotatable about a pitch axis 1920 (relative to the tow vehicle 102), and the plug 1912 is rotatable about a yaw axis 1922 and rotatable about a roll axis 1924 (relative to the trailer 104). Therefore, in some examples, the receiver 1910 has one DOF, and the plug 1912 has two DOFs.

In the illustrated example of FIG. 19, the first docking assembly 1902 includes a first mounting interface 1926 that is to be coupled (e.g., via one or more bolts) to the rear side 122 of vehicle 102 (FIG. 1). In the illustrated example, the receiver 1910 is rotatably coupled to the first mounting interface 1926 at a joint 1928. The joint 1928 defines the pitch axis 1920, which enables the receiver 1910 to rotate or pivot up and down about the joint 1928. In the illustrated example, the second docking assembly 1904 includes a second mounting interface 1929 to be coupled to the tow bar 116 of the trailer 104. The plug 1912 is rotatably coupled to the second mounting interface 1929 to rotate about the yaw axis 1922 and the roll axis 1924. In the illustrated example, the second mounting interface 1929 includes a coupler 1930 that is coupled to the tow bar 116 of the trailer 104 (FIG. 1).

The plug 1912 is rotatably coupled to the coupler 1930 at a joint 1932, which defines the yaw axis 1922 and enables the plug 1912 to rotate clockwise or counterclockwise (e.g., left or right from a top view). The coupler 1930 is rotatably coupled to the tow bar 116 at a joint 1934, which defines the roll axis 1924 and enables the coupler 1930 and the plug 1912 to rotate about the roll axis 1924. Therefore, in this example, the receiver 1910 has only one DOF relative to the first mounting interface 1926 (and the tow vehicle 102), and the plug 1912 has only two DOFs relative to the second mounting interface 1929 (and the trailer 104). However, in other examples, the receiver 210 and the plug 212 can be configured to have more or fewer DOFS and/or the DOFs may be split differently between the vehicle side and the trailer side.

In the illustrated example of FIG. 19, the first docking assembly 1902 includes a first utility connector 1936 and the second docking assembly 1904 includes a second utility connector 1938. Similar to the docking system 200 shown in FIGS. 2A-2C, the cables 238, 252 can be connected to the first utility connector 1936, and the cable 246 can be connected to the second utility connector 1938. When the first and second utility connectors 1936, 1938 are connected, they provide electrical connection between the tow vehicle 102 and the trailer 104, which enables power and/or data (e.g., sensor data, commands) to be transferred between the tow vehicle 102 and the trailer 104. The cables are not shown in FIG. 19. However it is understood that one or more cables can be coupled to the utility connectors 1936, 1938 and routed to the various actuators, sensors, and other components on the vehicle side and the trailer side. Additionally or alternatively, the utility connectors 1936, 1938 can be used to form a fluid connection between the tow vehicle 102 and the trailer 104.

Figure 20:
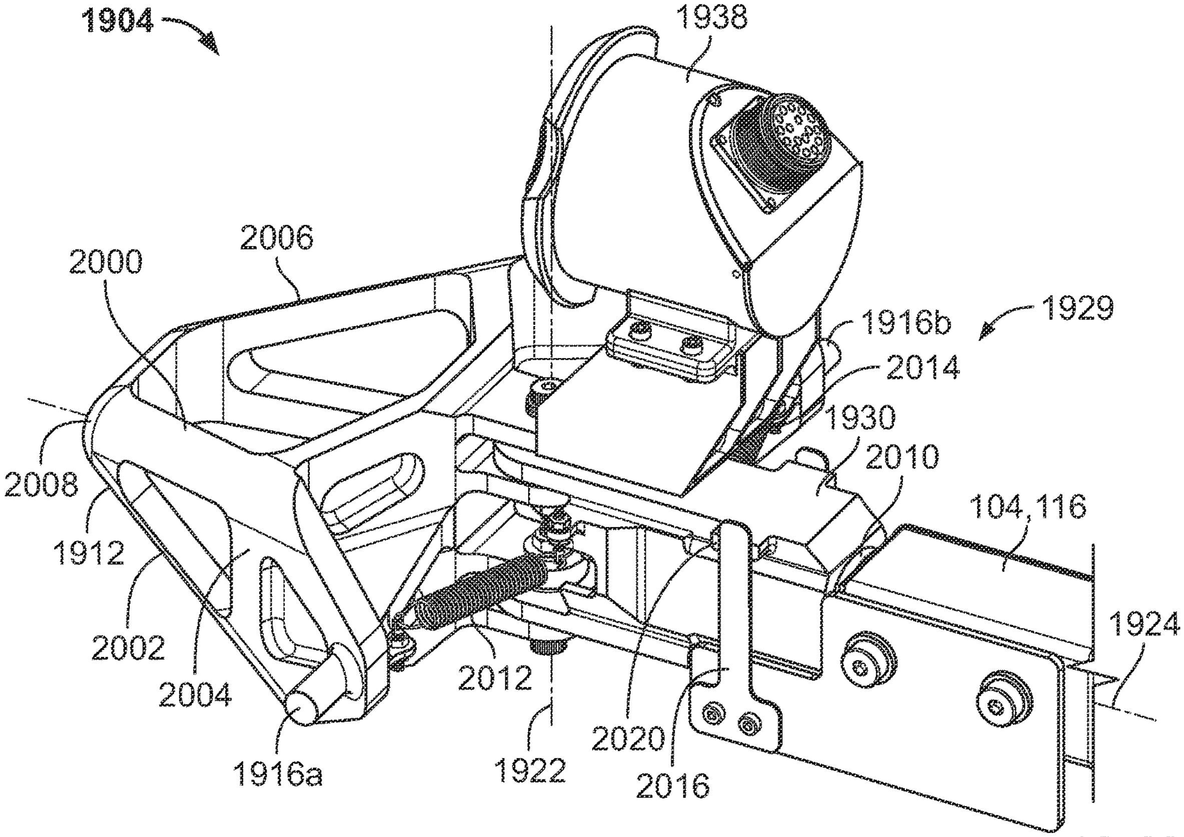
FIG. 20 is a perspective view of the example second docking assembly of the example docking system of FIG. 19.
Figure 21:
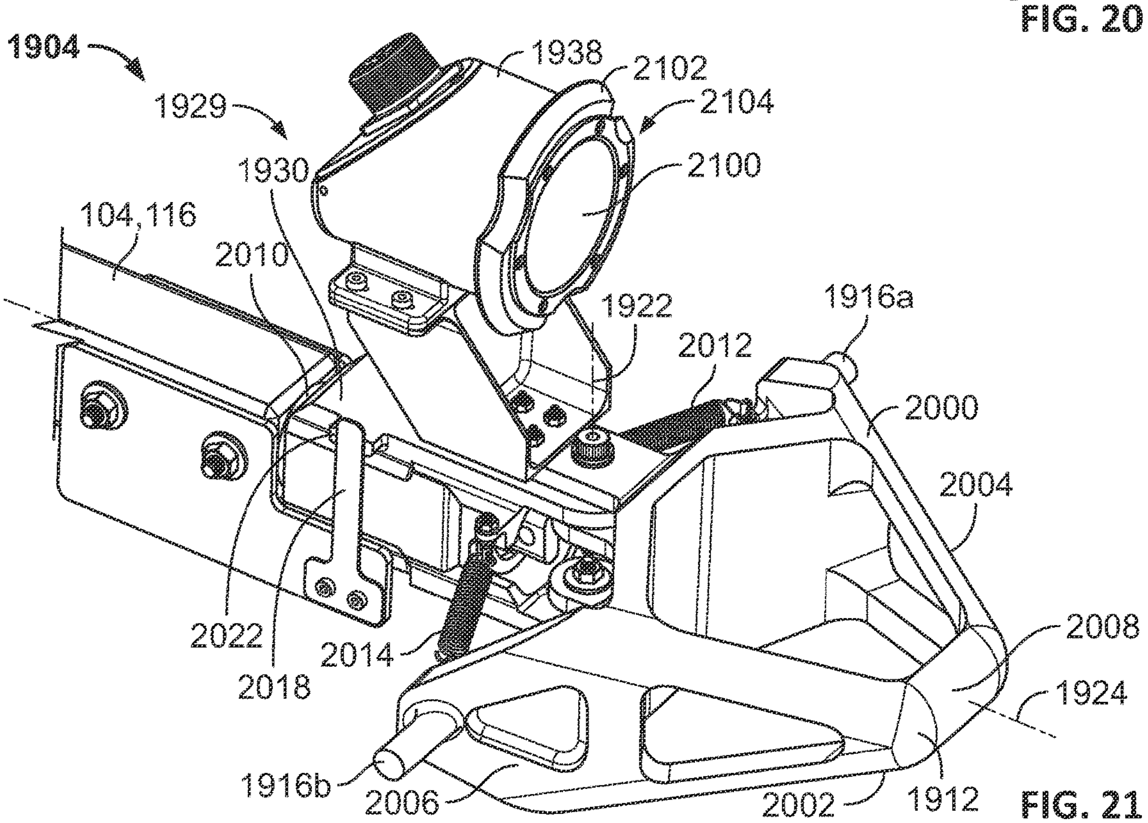
FIG. 21 is a perspective view of the example second docking assembly of the example docking system of FIG. 19.

FIGS. 20 and 21 are perspective views of the second docking assembly 1904 as shown coupled to the tow bar 116 of the trailer 104. The plug 1912 is similar to the plug 212 disclosed above and has a first side 2000 (e.g., a top side), a second side 2002 (e.g., a bottom side) opposite the first side 2000, a third side 2004 between the first and second sides 2000, 2002, and a fourth side 2006 between the first and second sides 2000, 2002 opposite the third side 2004 that converge to form a tip 2008. However, in this example, the middle sections of the wall or sides 2000-2006 have been removed. As such, the plug 1912 has a skeleton appearance. This reduces weight of the plug 1912, while still enabling the plug 1912 to operate as a guide and interface with the receiver 1910 (FIG. 19).

In the illustrated example, the plug 1912 includes the lock pin 1916. In this example, the lock pin 1916 includes two lock pins, referenced as a first lock pin 1916*a* and a second lock pin 1916*b*, which are used for locking the plug 1912 and the receiver 1910 (FIG. 19) as disclosed in further detail herein. In this example, the first lock pin 1916*a* is coupled to and extends outward (e.g., sideways or laterally) from the third side 2004 and the second lock pin 1916*b* is coupled to and extends outward from the fourth side 2006.

In the illustrated example of FIGS. 20 and 21, the second mounting interface 1929 includes a shaft 2010 coupled to the tow bar 116. The connections between the plug 1912, the coupler 1930, the shaft 2010, and the tow bar 116 are substantially the same as disclosed above in connection with the second docking assembly 204 in FIGS. 3-6. Thus, a description of these joints and components is not repeated herein.

The second docking assembly 1904 can include one or more features or mechanisms to center or bias the plug 1912 to a neutral or central yaw position and roll position. In this example, similar to the docking assembly 204 disclosed above, the second docking assembly 1904 includes first and second springs 2012, 2014 coupled between the plug 1912 and the coupler 1930, which bias or center the plug 1912 to neutral or central yaw position about the yaw axis 1922. In the illustrated example, the second docking assembly 1904 includes a first cantilever leaf spring 2016 coupled to the tow bar 116 and disposed on one side of the coupler 1930 and a second cantilever leaf spring 2018 coupled to the tow bar 116 and disposed on the opposite side of the coupler 1930. The coupler 1930 has a first tab 2020 aligned with the first cantilever leaf spring 2016 and a second tab 2022 aligned with the second cantilever leaf spring 2018. If the coupler 1930 is rotated about the roll axis 1924, the coupler 1930 engages one of the first or second cantilever leaf springs 2016, 2018, which biases the coupler 1930 back to a neutral or central roll position.

As shown in FIGS. 20 and 21, the second docking assembly 1904 includes the second utility connector 1938, which is coupled (e.g., bolted) to the plug 1912. Therefore, the second utility connector 1938 moves with the plug 1912 as the plug 1912 rotates about the yaw and roll axes 1922, 1924. In this example, the second utility connector 1938 is coupled to the first side 2000 (e.g., the top side) of the plug 1912 and is disposed over or above the plug 1912. In other examples, the second utility connector 1938 can be coupled to another side of the plug 1912. As shown in FIG. 21, a front side 2100 of the second utility connector 1938 has angled or chamfered edge 2102 with three notches 2104 (one of which is referenced in FIG. 21), which helps facilitate alignment with the first utility connector 1936 during connection of the utility connectors 1936, 1938.

Figure 22:
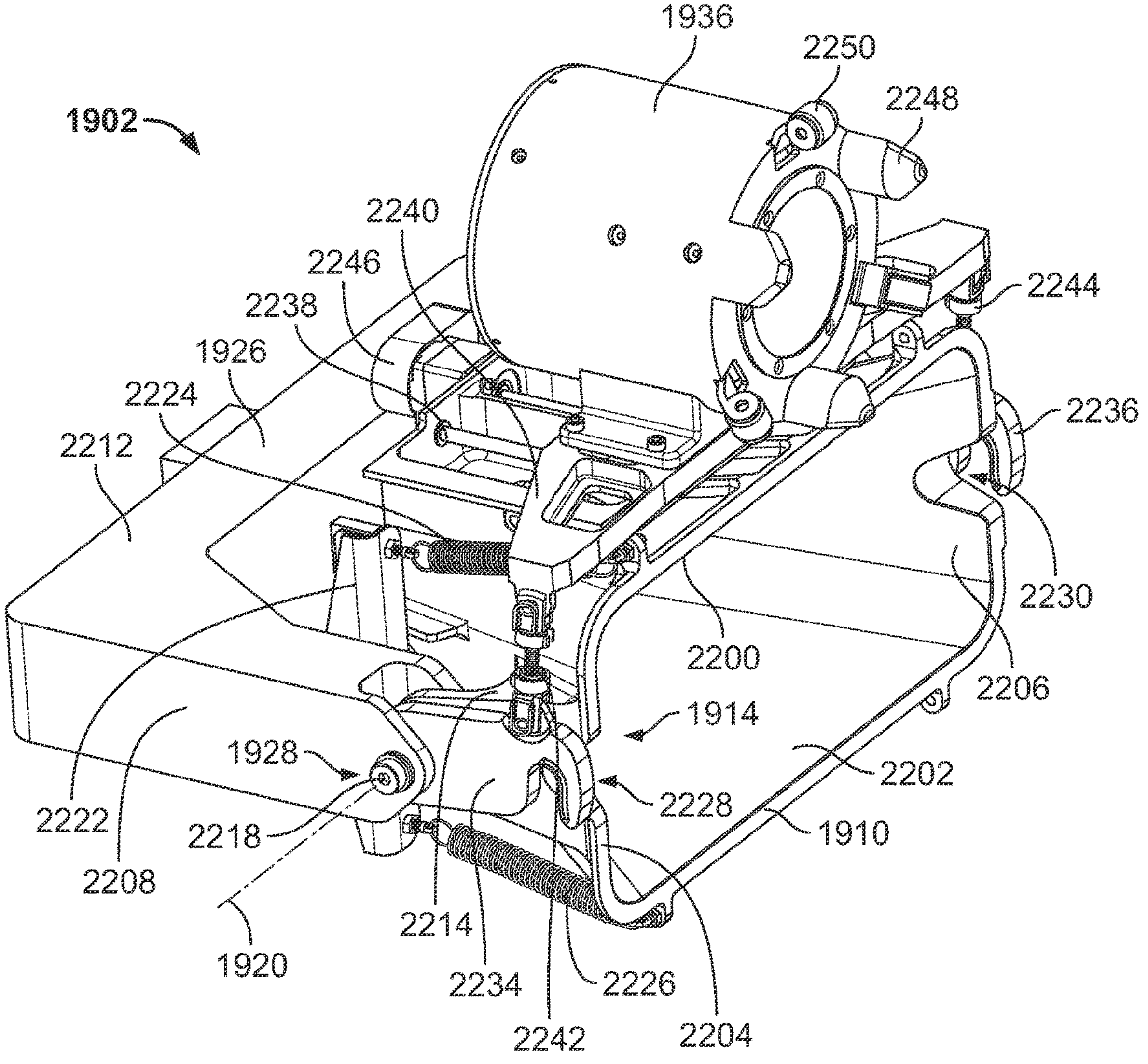
FIG. 22 is a perspective view of the example first docking assembly of the example docking system of FIG. 19.
Figure 23:
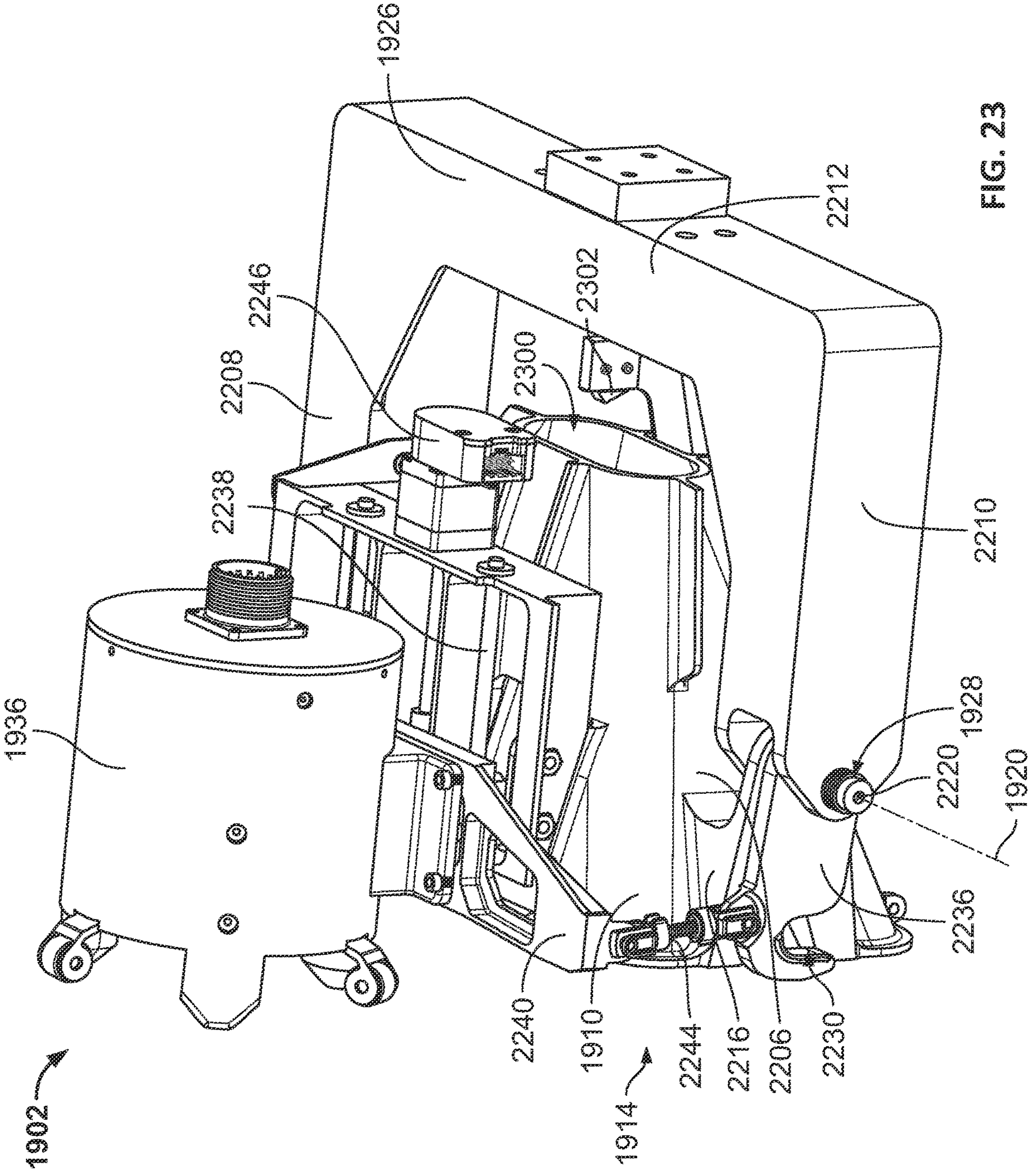
FIG. 23 is a perspective view of the example first docking assembly of the example docking system of FIG. 19.

FIGS. 22 and 23 are perspective views of the first docking assembly 1902. Referring to FIG. 22, the receiver 1910 is similar to the receiver 210 disclosed above and has a first wall 2200 (e.g., a top wall), a second wall 2202 (e.g., a bottom wall) opposite the first wall 2200, a third wall 2204 between the first and second walls 2200, 2202, and a fourth wall 2206 between the first and second walls 2200, 2202 opposite the third wall 2204 that converge inward. However, as shown in FIG. 23, the front end of the receiver 1910 has an opening 2300. As shown in FIG. 23, the first docking assembly 1902 includes a sensor 2302 (e.g., a contact sensor, a pressure sensor) coupled to the receiver 1910 and disposed adjacent (e.g., in front of) the opening 2300. The sensor 2302 is electrically coupled to the driving control system 132 (FIG. 1) of the tow vehicle 102. When the plug 1912 (FIGS. 20 and 21) is fully inserted into the receiver 1910, the tip 2008 (FIGS. 20 and 21) of the plug 1912 engages or contacts the sensor 2302. This is used to indicate the plug 1912 is fully inserted into the receiver 1910, which can be used to trigger the tow vehicle 102 to stop reversing and/or generate an alert for the driver.

As shown in FIGS. 22 and 23, the first docking assembly 1902 includes the first mounting interface 1926, which is to be coupled (e.g., bolted) to the rear side 122 (FIG. 1) of the tow vehicle 102 (FIG. 1). In this example, the first mounting interface 1926 includes a first arm 2208, a second arm 2210 parallel to the first arm 2208, and a cross-bar 2212 coupled between the first and second arms 2208, 2210. The first mounting interface 1926 may be constructed as a single unitary part or component (e.g., a monolithic structure) or may be constructed multiple separate structures that are (e.g., bolted, welded) together.

The receiver 1910 is rotatably coupled to the first mounting interface 1926. As shown in FIGS. 22 and 23, the receiver 1910 includes a first attachment portion 2214 (e.g., a first tab) extending from the third wall 2204 and a second attachment portion 2216 (e.g., a second tab) extending from the fourth wall 2206. The first and second attachment portions 2214, 2216 may be integrally formed with the walls 2204, 2206. The first attachment portion 2214 is rotatably coupled to the first arm 2208 by a first bolt 2218 and the second attachment portion 2216 is rotatably coupled to the second arm 2210 by a second bolt 2220. The bolts 2218, 2220 form the joint 1928, which defines the pitch axis 1920.

In some examples, the first docking assembly 1902 includes one or more features or mechanisms to center or bias the receiver 1910 to a neutral or central pitch position. For example, as shown in FIG. 22, the first docking assembly 1902 includes a bracket 2222 rigidly coupled (e.g., bolted) to the first arm 2208 of the first mounting interface 1926. The bracket 2222 may be an integral part of the first mounting interface 1926 or a separate component coupled to the first mounting interface 1926. The first docking assembly 1902 includes a first spring 2224 coupled between the bracket 2222 and the first wall 2200 of the receiver 1910 (e.g., on the top side of the receiver 1910) and a second spring 2226 coupled between the bracket 2222 and the second wall 2202 of the receiver 1910 (e.g., on the bottom side of the receiver 1910). The springs 2224, 2226 bias the receiver 1910 to a neutral or central pitch position. The springs 2224, 2226 act as a passive compliance mechanism to center the receiver 1910 about the pitch axis 1920. In other examples, the first docking assembly 1902 can include a mode-switching or active compliance mechanism capable of switching between one or more modes for affecting the state of the receiver 1910. For example, the first docking assembly 1902 can include the compliance mechanism 1100 of FIG. 11-13, similar to the first docking assembly 202 disclosed above.

As shown in FIG. 22, the third wall 2204 of the receiver 1910 has a first slot 2228 and the fourth wall 2206 of the receiver 1910 has a second slot 2230. During a docking process, the plug 1912 (FIG. 19) is inserted into the receiver 210 such that the first and second lock pins 1916*a*, 1916*b* (FIG. 20) move into the slots 2228, 2230. Once the plug 1912 is fully inserted into the receiver 1910 and the lock pins 1916*a*, 1916*b* are in the slots 2228, 2230, the lock 1914 can be activated to lock the lock pins 1916*a*, 1916*b* in the slots 2228, 2230 and thereby mechanically lock the receiver 1910 and the plug 1912.

In this example, the lock 1914 and the first utility connector 1936 are actuated via the same actuation system. For example, as shown in FIGS. 22 and 23, the lock 1914 includes a first lock jaw 2234 disposed near the first slot 2228 and a second lockjaw 2236 disposed near the second slot 2230. The first lockjaw 2234 is rotatably coupled to the first mounting interface 1926 and the first attachment portion 2214 of the receiver 1910 at the first bolt 2218, and the second lockjaw 2236 is rotatably coupled to the first mounting interface 1926 and the second attachment portion 2216 of the receiver 1910 at the second bolt 2220. The first docking assembly 1902 includes tracks 2238 (e.g., shafts) coupled (e.g., bolted, welded, etc.) to the first wall 2200 of the receiver 1910. The first docking assembly 1902 includes a cross-frame 2240 slidably coupled to the tracks 2238. The first utility connector 1936 is coupled (e.g., bolted) to the cross-frame 2240. Therefore, the first utility connector 1936 is slidably coupled to the receiver 1910. The first docking assembly 1902 includes a first link 2242 coupled between the cross-frame 2240 and the first lock jaw 2234 and a second link 2244 coupled between the cross-frame 2240 and the second lockjaw 2236. In the illustrated example, the first docking assembly 1902 includes an actuator 2246 (e.g., a linear actuator) coupled to the tracks 2238. The actuator 2246 is controlled by the docking control system 136 (FIG. 1). The actuator 2246 can be activated to move the cross-frame 2240 linearly along the tracks 2238. This moves the first utility connector 1936 forward or rearward and also rotates the first and second lock jaws 2234, 2236 between locked and unlocked positions. In some examples, the first utility connector 1936 may include one or more compliance or lead-in features to facilitate the final alignment of the first and second utility connectors 1936, 1938. For example, as shown in FIG. 22, the first utility connector 1936 has angled posts 2248 and rollers 2250. The angled posts 2248 and the rollers 2250 help guide the utility connectors 1936, 1938 into proper alignment. In some examples the angled posts 2248 and the rollers 2250 are compliant or flexible.

Figure 24A:
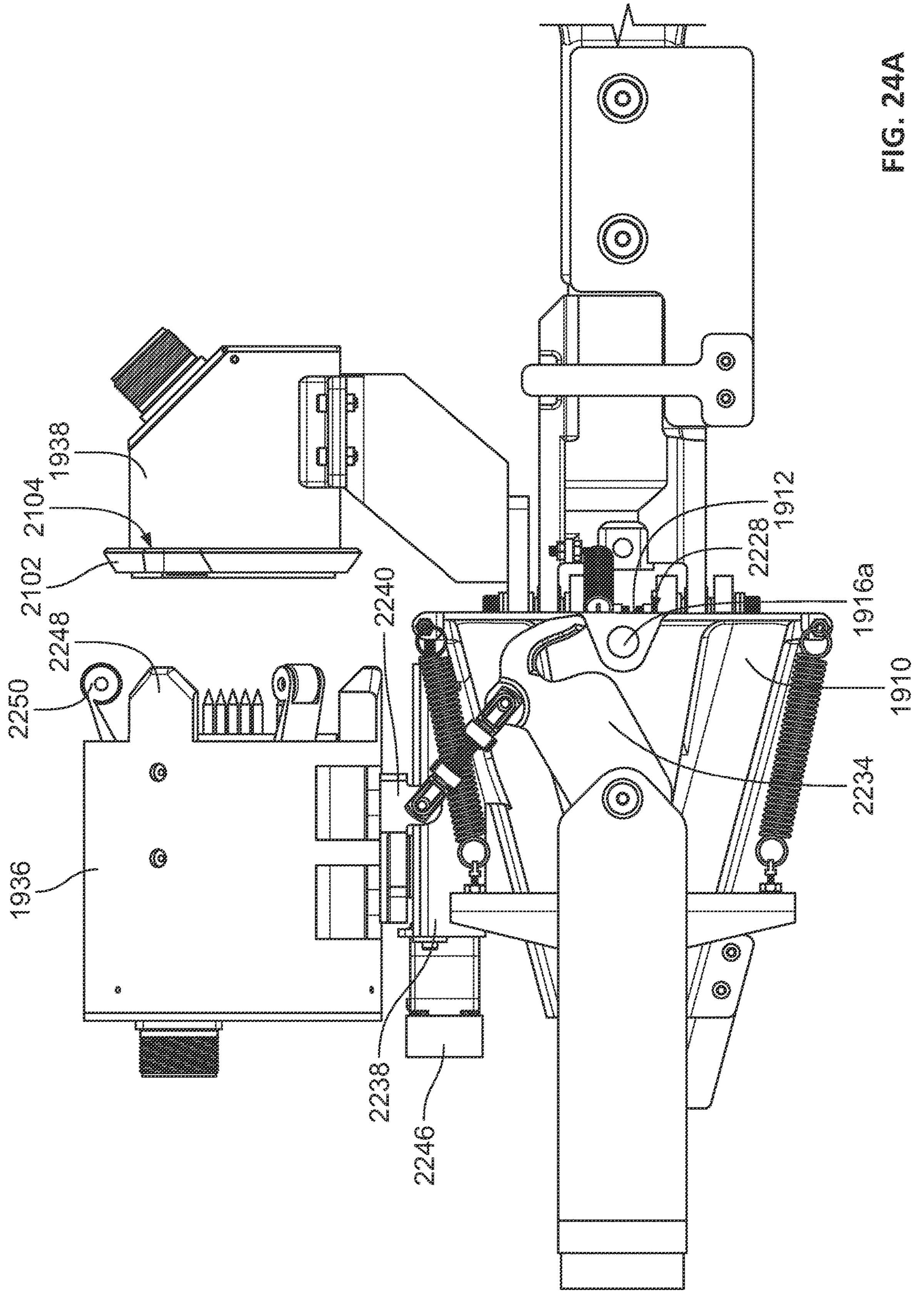
FIGS. 24A and 24B illustrate an example sequence of activating an example lock and moving an example first utility connector of the example first docking assembly of FIG. 19.
Figure 24B:
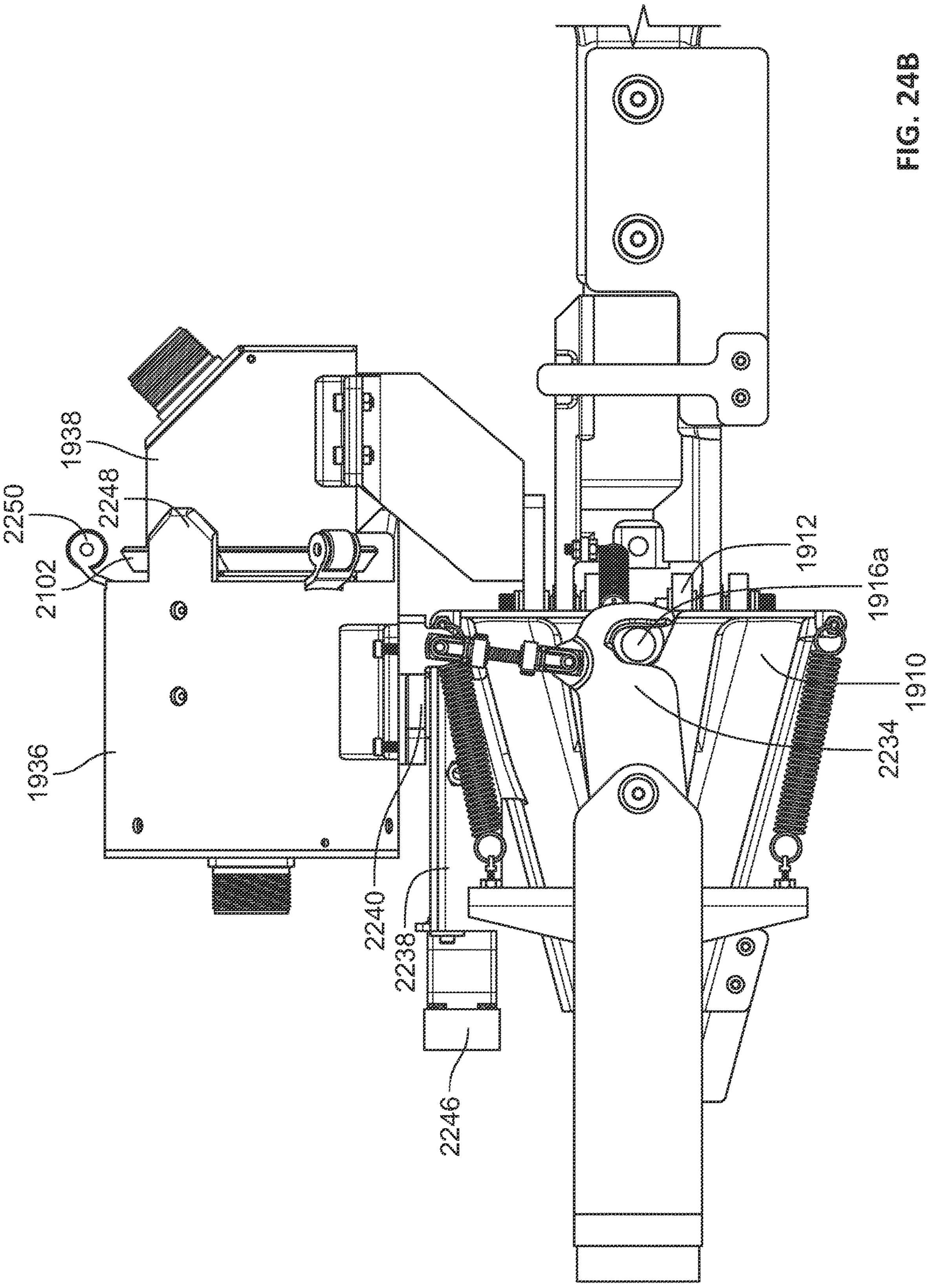

FIGS. 24A and 24B show an example sequence of locking the receiver 1910 and the plug 1912 and connecting the utility connectors 1936, 1938. FIG. 24A is a side view showing the plug 1912 fully inserted into the receiver 1910. The first and second lock pins 1916*a*, 1916*b* of the plug 1912 are disposed in the respective slots 2228, 2230. In FIG. 24A, the cross-frame 2240 is in a forward position. As such, the first and second lock jaws 2234, 2236 are in an open or unlocked position in which the first and second lock jaws 2234, 2236 are clear of the first and second slots 2228, 2230. This enables the first and second lock pins 1916*a*, 1916*b* to be inserted into the slots 2228, 2230. Further, in this position, the first utility connector 1936 is spaced or separated from the second utility connector 1938.

Once the plug 1912 is fully inserted into the receiver 1910, the actuator 2246 can been activated to move the cross-frame 2240 rearward along the tracks 2238 to a second position, as shown in FIG. 24B. This causes the first and second lock jaws 2234, 2236 to rotate downward to a locked position. In the locked position, the first and second lock jaws 2234, 2236 are wrapped at least partially around the respective first and second lock pins 1916*a*, 1916*b*. This prevents the plug 1912 and the receiver 1910 from separating. As such, the plug 1912 and the receiver 1910 are mechanically locked, which enables the tow vehicle 102 (FIG. 1) to tow the trailer 104 (FIG. 1).

Also, when the cross-frame 2240 is moved to the position shown in FIG. 24B, the first utility connector 1936 engages or mates with the second utility connector 1938, which provides electrical and/or fluid connections between the tow vehicle 102 and the trailer 104. As the first and second utility connectors 1936, 1938 are moved together, the rollers 2250 on the first utility connector 1936 engage the angled edge 2102 on the second utility connector 1938, and the posts 2248 extend into the notches 2104 (one of which is referenced in FIG. 24A). This compensates for final misalignment between the utility connectors 1936, 1938 and helps guide the connectors 1936, 1938 into proper mating position.

To undock or disconnect the first and second docking assemblies 1902, 1904, the actuator 2246 can be activated to move the cross-frame 2240 forward to the position shown in FIG. 24A, which unlocks the plug 1912 and disconnects the utility connectors 1936, 1938. Therefore, in this example, the actuator 2246 moves the lock jaws 2234, 2236 and the first utility connector 1936 simultaneously. As such, in this example, the actuator 2246 performs both the locking operation and the utility (e.g., electrical, fluid) connection simultaneously.

Figure 25A:
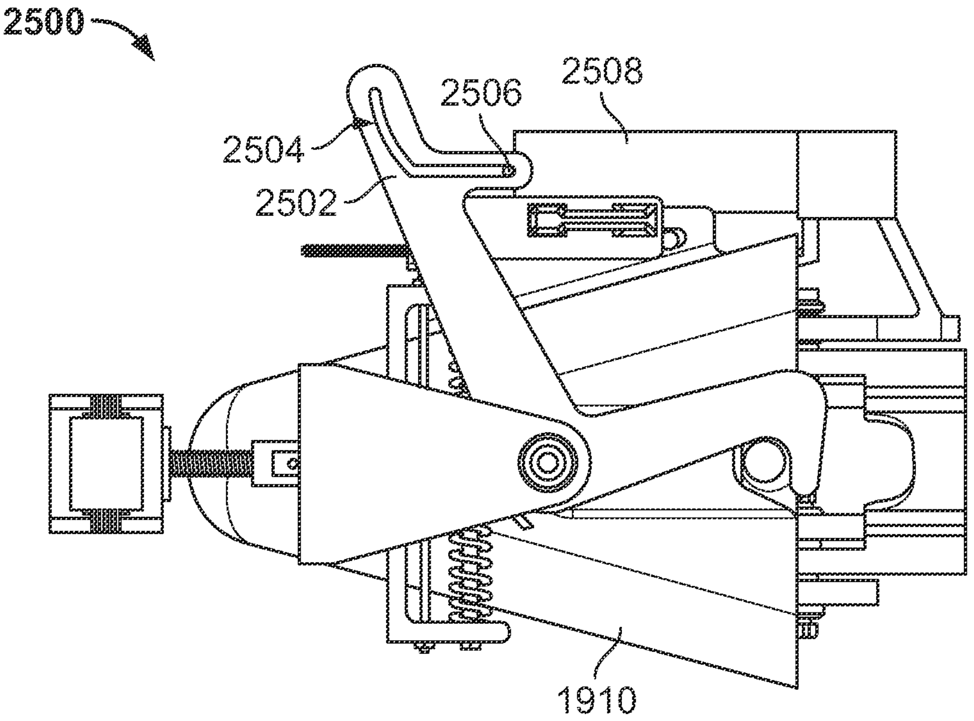
FIGS. 25A-25F illustrate example locks that can be implemented in connection with the example first docking assembly of FIG. 19.

FIGS. 25A-25F illustrate other example lock designs that can be implemented in connection with the first docking assembly 1902. FIG. 25A illustrates an example lock 2500 having a lock jaw 2502 that is rotatably coupled to the receiver 1910. The lockjaw 2502 has an L-shaped slot 2504. In the illustrated example, a pin 2506 extends from a first utility connector 2508, which may correspond to the first utility connector 1936. The first utility connector 2508 can be moved forward or backward (left or right in FIG. 25A) by an actuator, such as the actuator 2246 (FIG. 22). As the first utility connector 2508 moves forward or backward, the interaction of the pin 2506 in the slot 2504 causes the lockjaw 2502 to rotate, which can be used to rotate the lock jaw 2502 between the locked and unlocked positions.

Figure 25B:
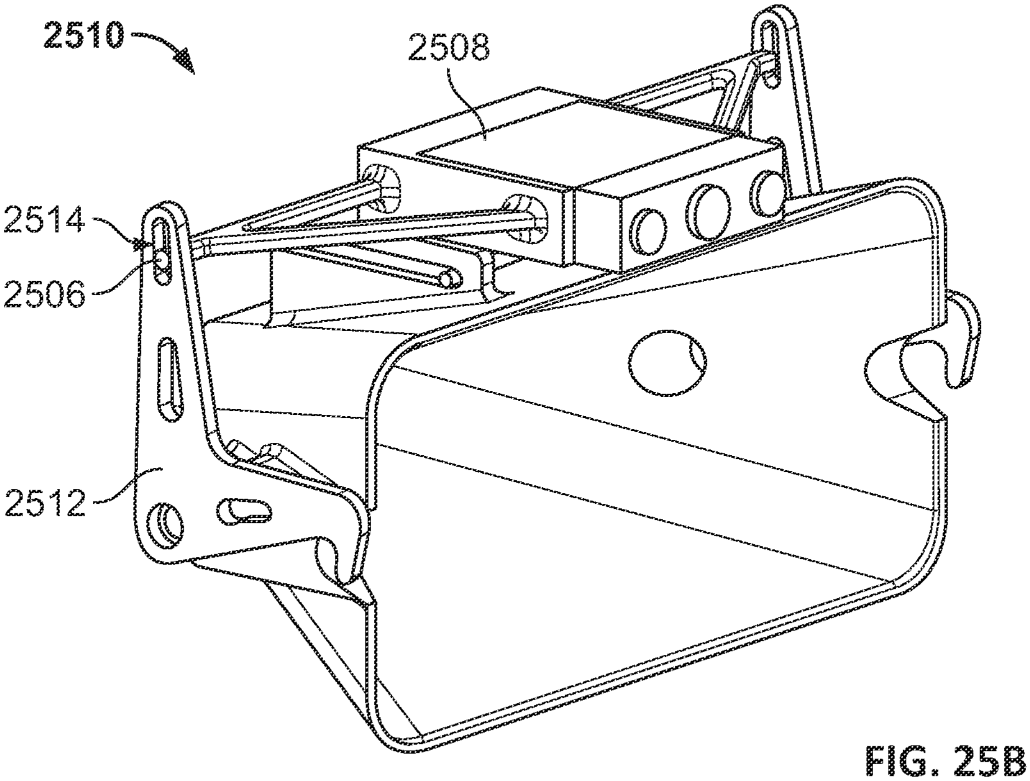

FIG. 25B illustrates an example lock 2510 having a lock jaw 2512 that is similar to the lockjaw 2502 of FIG. 25A. However, in this example, the lockjaw 2512 has vertical slot 2514. The pin 2506 is disposed in the slot 2514. As the first utility connector 2508 moves forward or backward, the interaction of the pin 2506 in the slot 2514 causes the lockjaw 2512 to rotate, which can be used to rotate the lockjaw 2512 between the locked and unlocked positions.

Figure 25C:
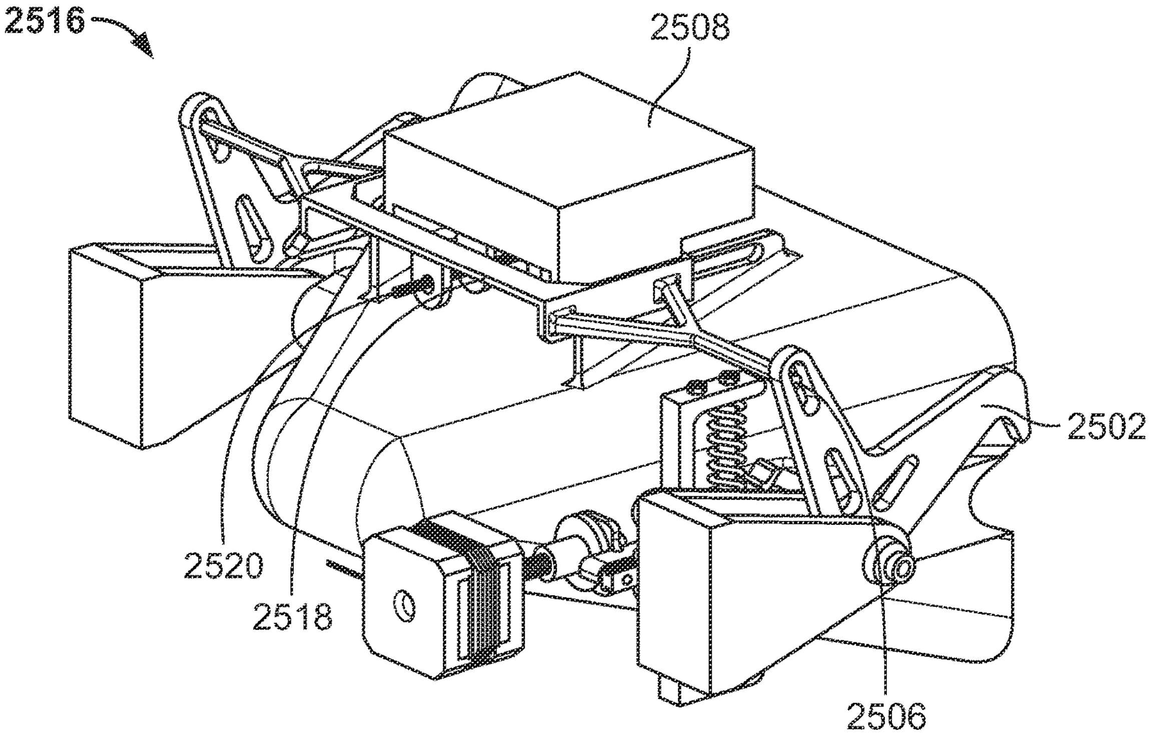

FIG. 25C illustrates an example lock 2516 that is similar to the lock 2510 of FIG. 25B. However, in this example, the pin 2506 is coupled to a bracket 2518 that is moveable separately from the first utility connector 2508. A screw 2520 of a ball screw actuator is engaged with the bracket 2518 and the first utility connector 2508. The ball screw actuator can be activated to move the bracket 2518 and the first utility connector 2508 forward or backward, and thereby rotate the lock jaw 2502 between the locked and unlocked positions.

Figure 25D:
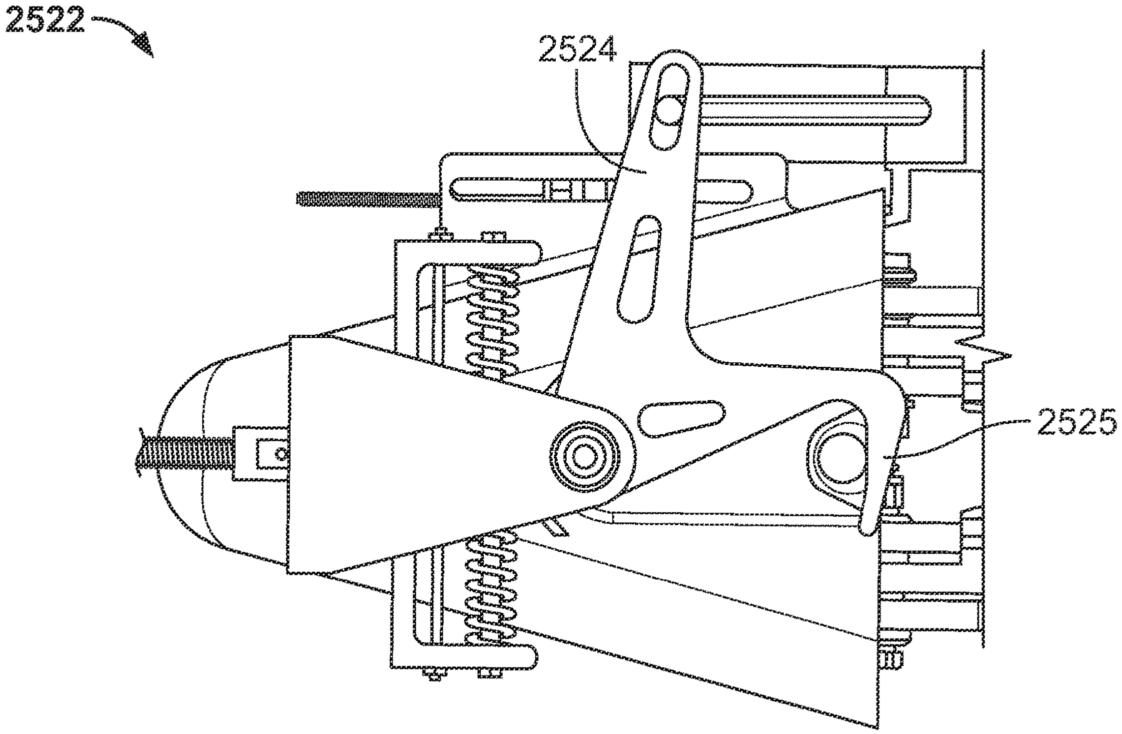

FIG. 25D illustrates an example lock 2522 having an elongated a lockjaw 2524. The lockjaw 2524 has an elongated arm 2525.

Figure 25E:
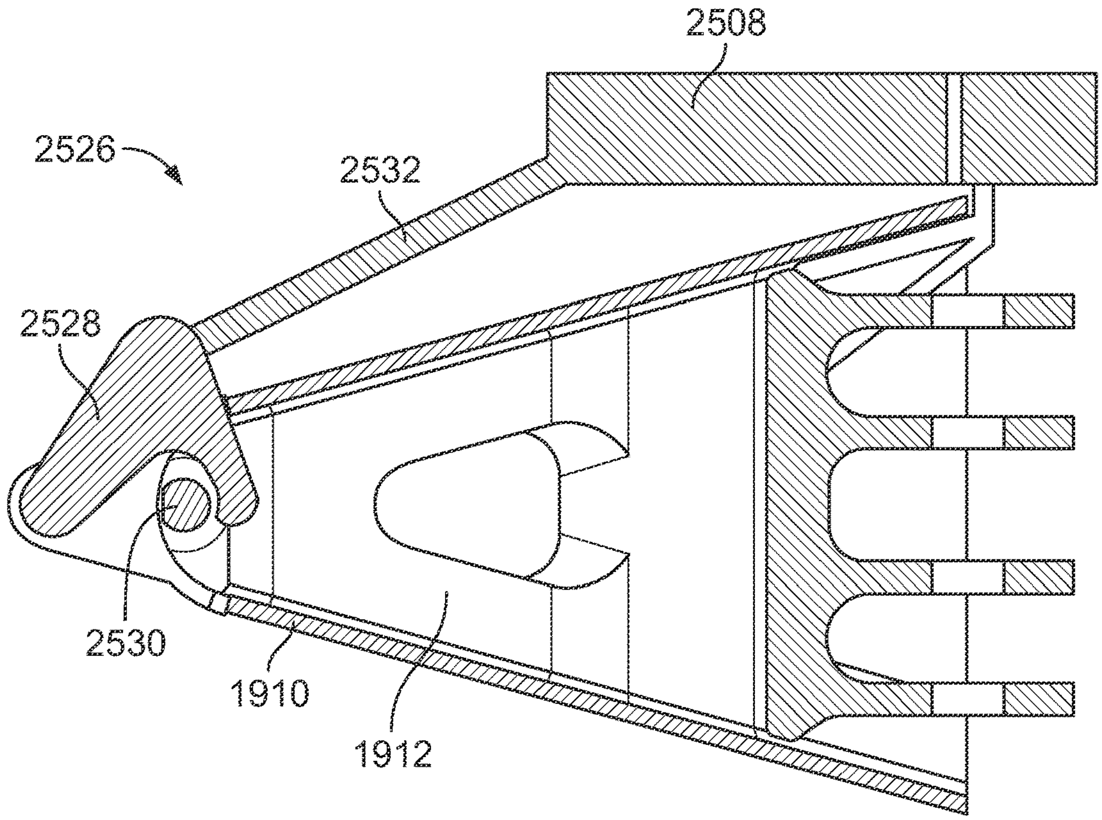

FIG. 25E is a cross-sectional view of an example lock 2526. In this example, the lock 2526 includes a lockjaw 2528 near the front end (left end in FIG. 25E) of the receiver 1910. The lockjaw 2528 is rotatable to engage a lock pin 2530 on the tip of the plug 1912. The lock 2526 includes a link 2532 between the lock jaw 2528 and the first utility connector 2508. As the first utility connector 2508 moves forward or backward (left or right in FIG. 25E), the link 2532 causes the lockjaw 2528 to rotate between the locked and unlocked positions.

Figure 25F:
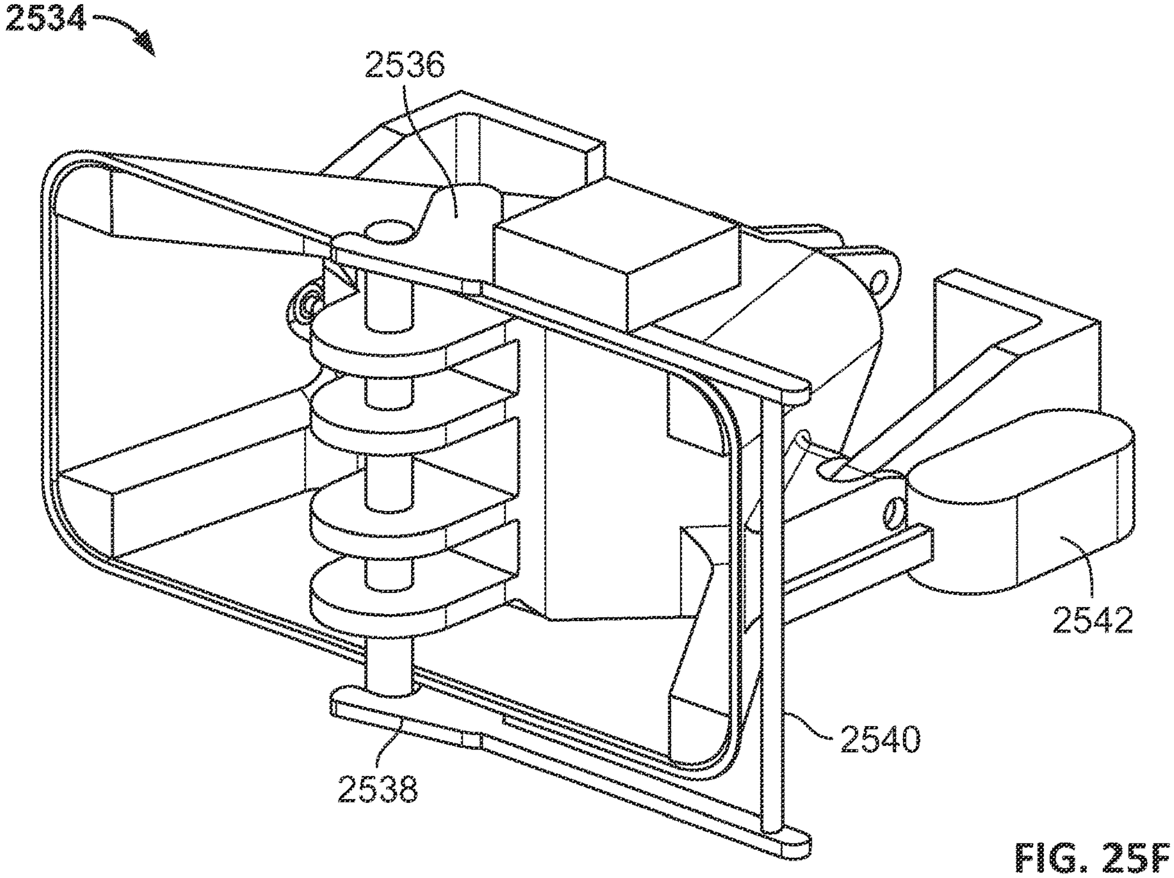

FIG. 25F illustrates an example lock 2534 having a first lockjaw 2536 and a second lockjaw 2538. The first and second lock jaws 2536, 2538 are coupled by a link bar 2540, similar to the lock 214 disclosed in connection with FIGS. 9A and 9B. The lock 2534 includes an actuator 2542 that can move the link bar 2540, thereby rotating both lock jaws 2536, 2538 simultaneously.

FIGS. 26A-26D illustrate an example pitch compliance mechanism 2600 that can be implemented in connection with the receiver 1910. The compliance mechanism 2600 is switchable between different modes. For example, the compliance mechanism 2600 may be operable between three modes that are the same as the three modes of the compliance mechanism 1100 disclosed above.

Figure 26A:
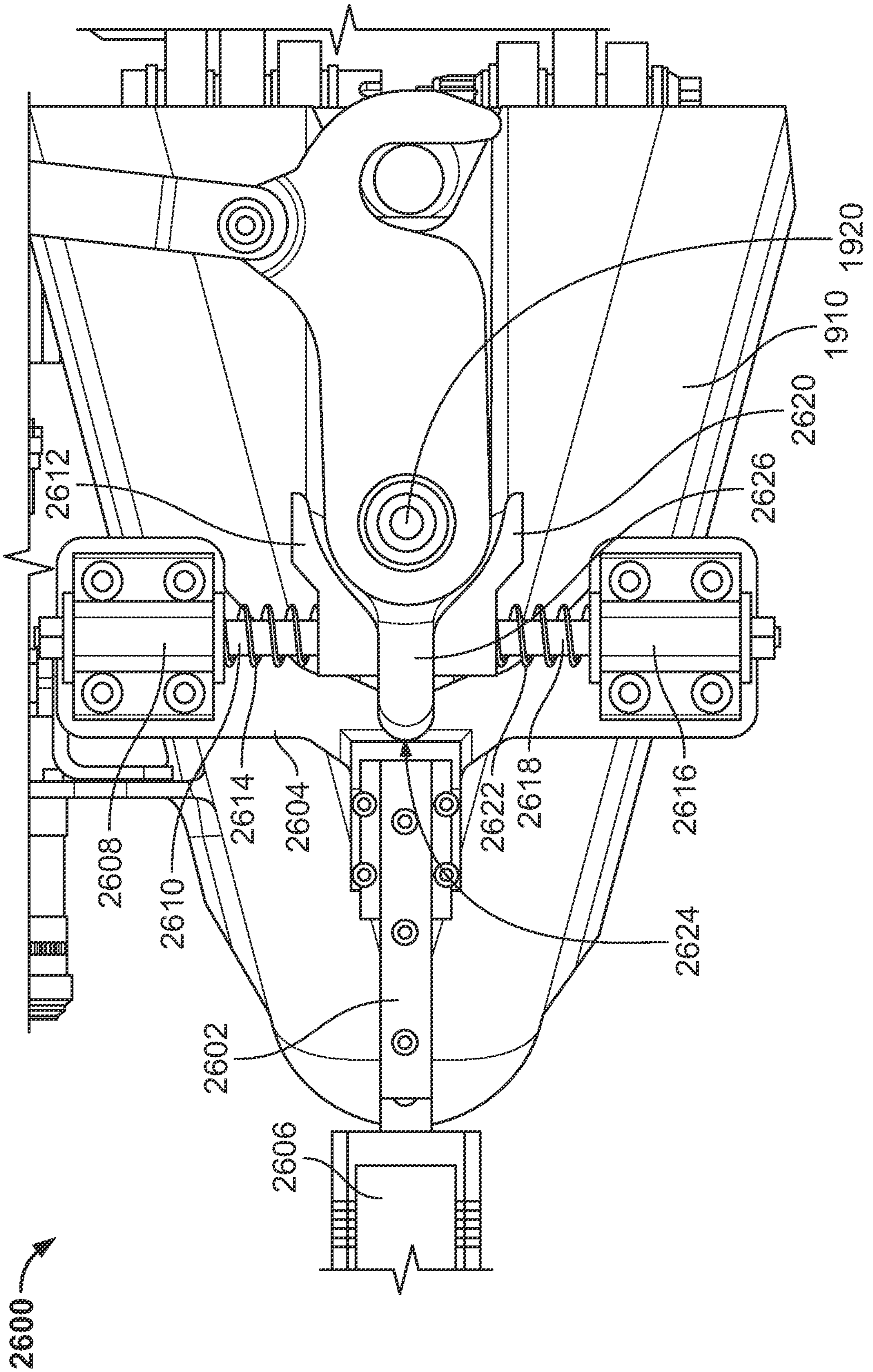
FIGS. 26A-26D illustrate an example pitch compliance mechanism that can be implemented in connection with the example first docking assembly of FIG. 19.

FIG. 26A is a side view of the receiver 1910 showing the compliance mechanism 2600 in a first mode. In the first mode, the compliance mechanism 2600 locks the receiver 1910 from rotating about the pitch axis 1920. This may be beneficial while the tow vehicle 102 is driving around without the trailer 104 to prevent the receiver 1910 from bouncing up and down while the tow vehicle 102 is driving, which may cause unnecessary wear on the components of the compliance mechanism 2600. In the illustrated example of FIG. 26A, the compliance mechanism 2600 includes a track 2602 and a frame 2604 that is moveable (e.g., slidable) forward and rearward (left and right in FIG. 26A) along the track 2602. In some examples, the track 2602 is coupled to the first arm 2208 (FIG. 22) of the first mounting interface 1926 (FIG. 22). Therefore, the frame 2604 is moveably coupled to the first mounting interface 1926. In the illustrated example, the compliance mechanism 2600 includes an actuator 2606 (e.g., a linear actuator) that can be activated to move the frame 2604 forward or rearward (left or right in FIG. 26A) along the track 2602. The actuator 2606 is controlled by the docking control system 136 (FIG. 1).

In the illustrated example of FIG. 26A, the frame 2604 has a first socket 2608. The first socket 2608 can also be implemented as a linear bearing, a bushing, or another type of linear joint. The compliance mechanism 2600 includes a first post 2610 partially disposed in and extending downward from the first socket 2608. In the illustrated example, the compliance mechanisms 2600 includes a first cam 2612 coupled to an end of the first post 2610. The first cam 2612 and the first post 2610 can be moved upward or downward in FIG. 26A. In the illustrated example, the compliance mechanism 2600 includes a first spring 2614 disposed between the first socket 2608 and first cam 2612, which biases the first cam 2612 downward in FIG. 26A. Similarly, the frame 2604 has a second socket 2616, and the compliance mechanism 2600 includes a second post 2618 partially disposed in and extending upward from the second socket 2616. The compliance mechanism 2600 includes a second cam 2620 coupled to an end of the second post 2618. The compliance mechanism 2600 also includes a second spring 2622 disposed between the second socket 2616 and the second cam 2620, which biases the second cam 2620 upward in FIG. 26A. In the illustrated example, the frame 2604 also has a notch 2624, which is located between the first and second cams 2612, 2620.

In the illustrated example of FIG. 26A, the receiver 1910 has a pin 2626 extending in the forward direction (to the left in FIG. 26A). In some examples, the pin 2626 is an extension of the first attachment portion 2214 (FIG. 22). The pin 2626 extends between the first and second cams 2612, 2620. In FIG. 26, the frame 2604 is in a first position (e.g., a rearward position), which corresponds to the first mode. In this position, the pin 2626 extends between the first and second cams 2612, 2620 and into the notch 2624 in the frame 2604. In some examples, the pin 2626 is engaged with the notch 2624 via an interference fit or slip fit. This prevents the pin 2626 from moving upward or downward. As a result, the receiver 1910 is locked from rotating about the pitch axis 1920 (e.g., clockwise or counter-clockwise in FIG. 26A).

Figure 26B:
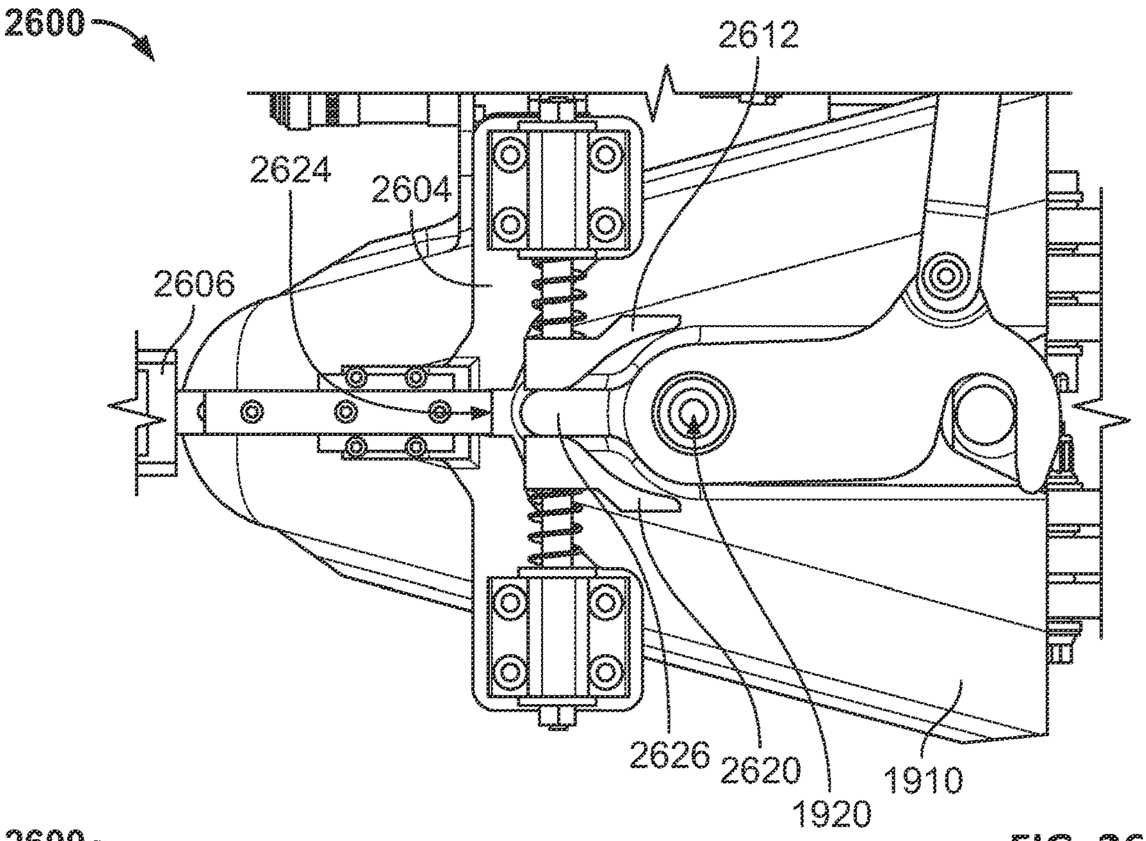
Figure 26C:
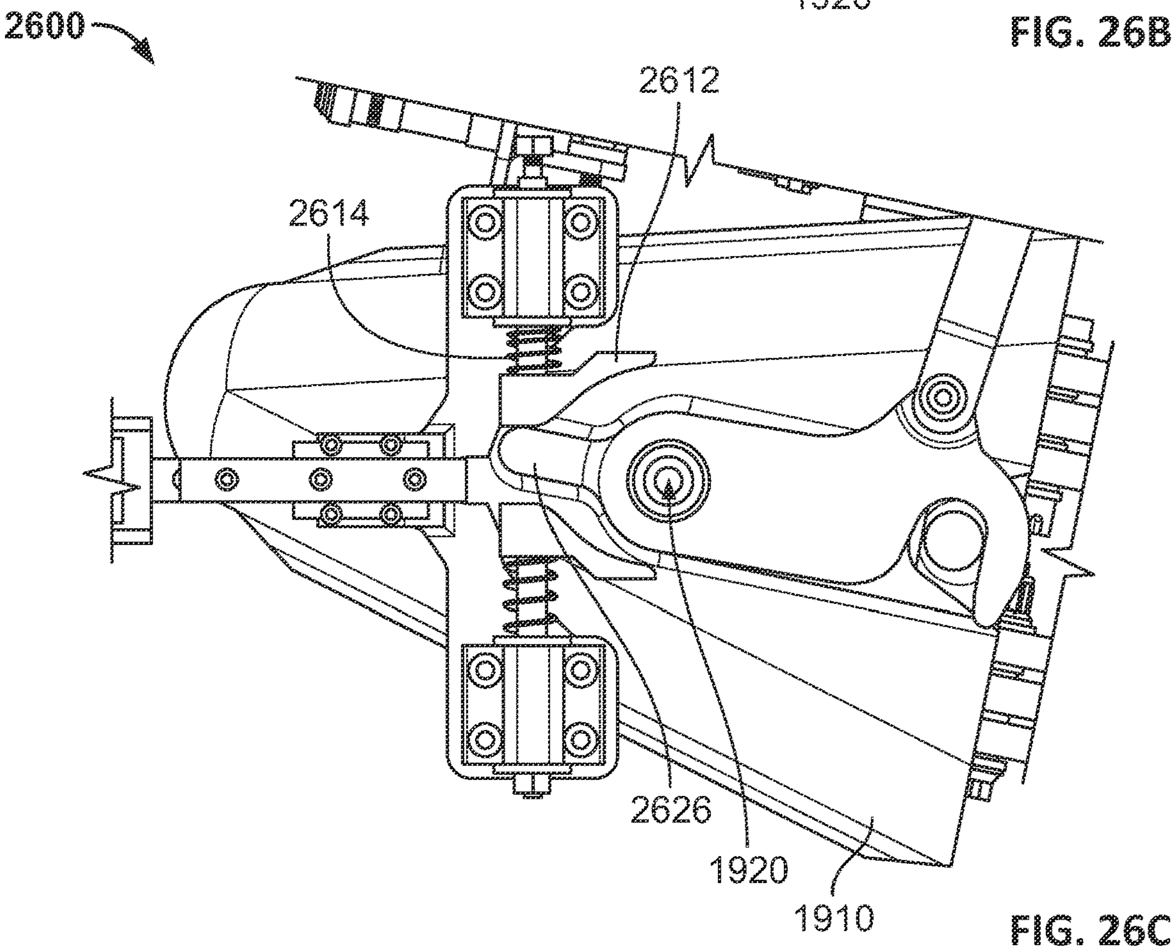

FIG. 26B shows the compliance mechanism 2600 in a second mode. In FIG. 26B, the actuator 2606 has been activated to move the frame 2604 to a second position (to the left relative to the position in FIG. 26A). As such, the pin 2626 is not disposed in the notch 2624, which enables the receiver 1910 to rotate about the pitch axis 1920. However, in this position, the pin 2626 is engaged with the first and second cams 2612, 2620. As the receiver 1910 rotates upward or downward (clockwise or counter-clockwise in FIG. 26B), the pin 2626 pushes one of the first or second cams 2612, 2620 upward or downward. For example, as shown in FIG. 26C, the receiver 1910 has rotated downward (clockwise in FIG. 26C). As such, the pin 2626 has pushed the first cam 2612 upward, which compresses the first spring 2614. Once the rotating force is removed, the first spring 2614 expands, which pushes the first cam 2612 downward and rotates the receiver 1910 back to the neutral or central pitch position. The same effect occurs if the receiver 1910 is rotated in the opposite direction. Therefore, in this second mode, the receiver 1910 is rotatable about the pitch axis 1920, but biased to the neutral or central pitch position. This may be beneficial during a docking process to help keep the receiver 1910 in a neutral pitch position while still enabling the receiver 1910 to rotate about the pitch axis 1920 in case of misalignment.

Figure 26D:
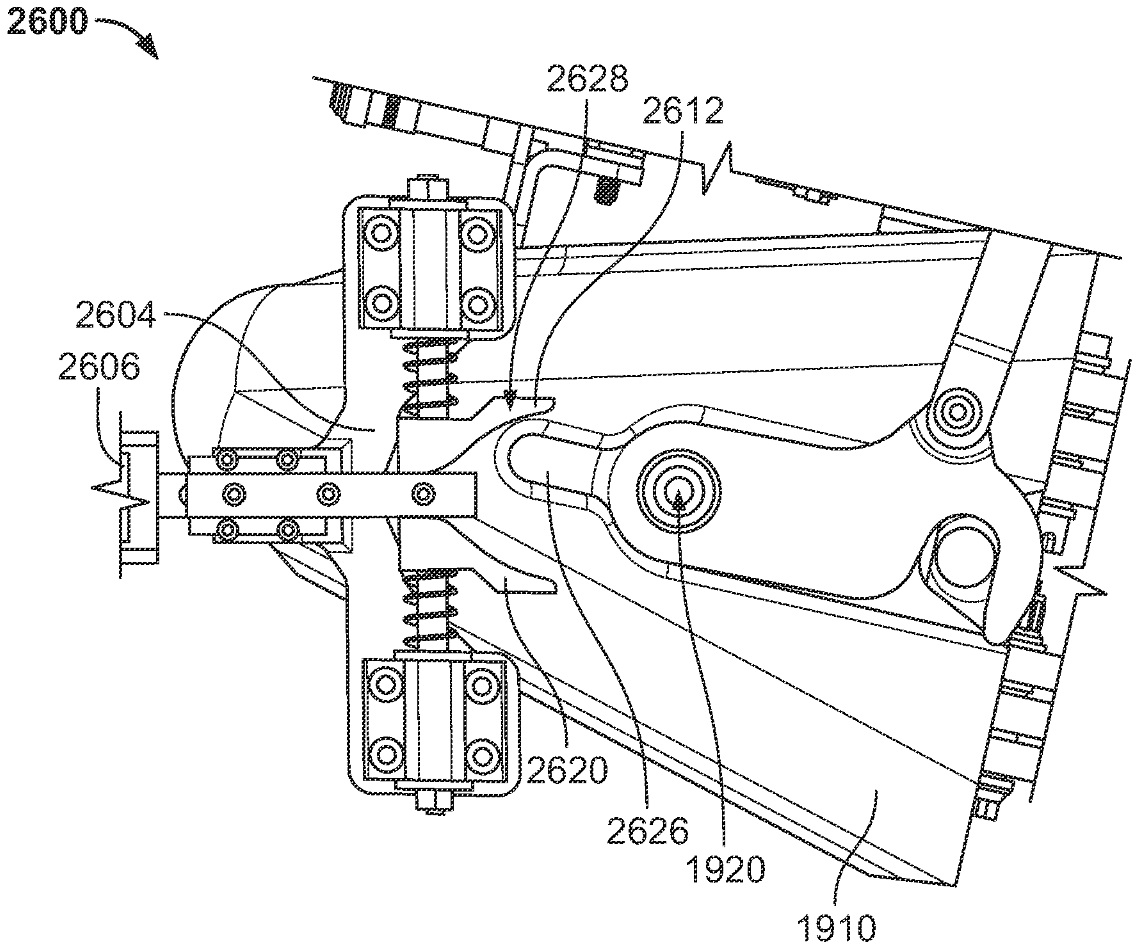

FIG. 26D shows the compliance mechanism 2600 in a third mode. In FIG. 26B, the actuator 2606 has been activated to move the frame 2604 forward (to the left relative to the position in FIG. 26B). The pin 2626 is disposed in a gap 2628 between the first and second cams 2612, 2620. This enables the receiver 1910 to rotate freely about the pitch axis 1920, without being biased to a neutral or central position. This mode may be beneficial while the trailer 104 is being towed by the tow vehicle 102. As such, the compliance mechanism 2600 is operable between a first mode in which the receiver 1910 is locked from rotating about the pitch axis 1920, a second mode in which the receiver 1910 is rotatable about the pitch axis 1920 and biased to a neutral or central pitch position, and a third mode in which the receiver 1910 is freely rotatable about the pitch axis 1920.

Figure 27A:
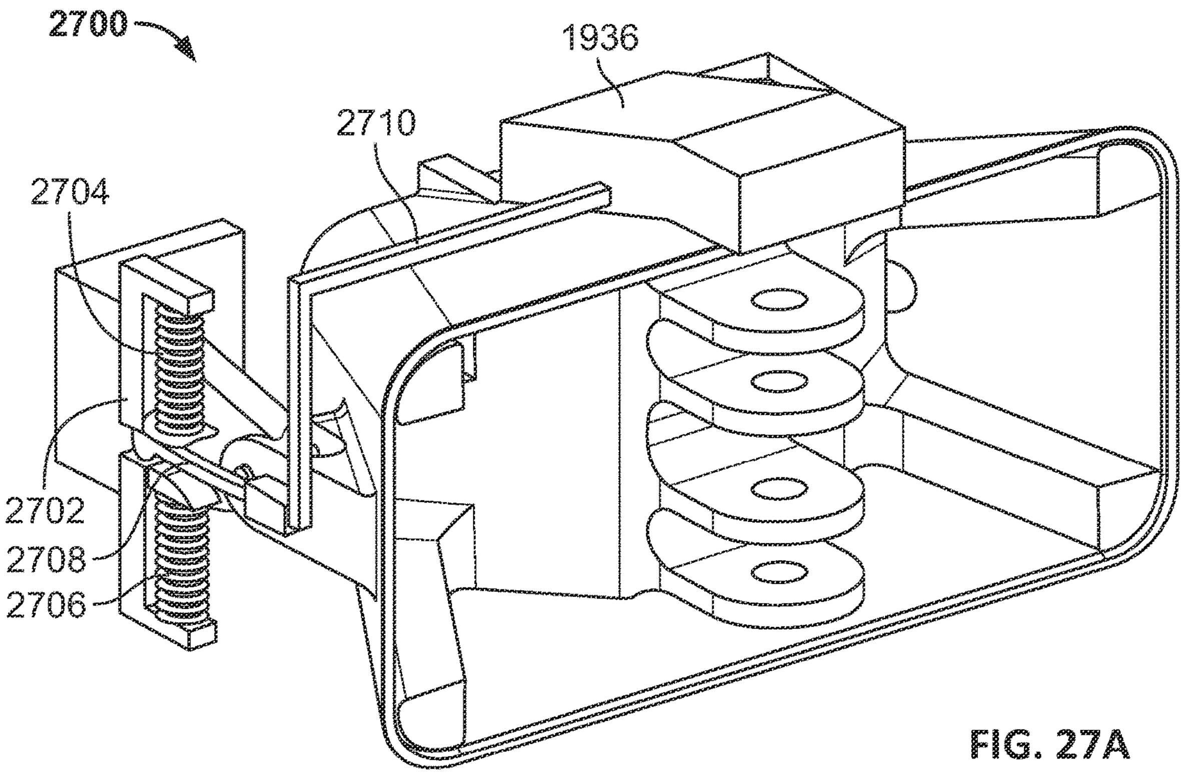
FIGS. 27A-27F illustrate example pitch compliance mechanisms that can be implemented in connection with the example first docking assembly of FIG. 19.

FIGS. 27A-27F illustrate other example compliance mechanisms that can be implemented in connection with the first docking assembly 1902. FIG. 27A illustrates an example compliance mechanism 2700 that is similar to the compliance mechanism 2600 disclosed above. In particular, the compliance mechanism 2700 includes a frame 2702 with springs 2704, 2706 and a pin 2708 that is moveable relative to the frame 2702. However, in this example, the pin 2708 is driven by movement of the first utility connector 1936. The compliance mechanism 2700 includes a link 2710 coupling the first utility connector 1936 and the pin 2708. As such, as the first utility connector 1936 is moved into engagement with the second utility connector 1938 (FIG. 19), the compliance mechanism 2700 is switched between modes. Therefore, both operations are activated simultaneously, which reduces the number of actuators on the first docking assembly 1902. This reduces weight and control system complexity.

Figure 27B:
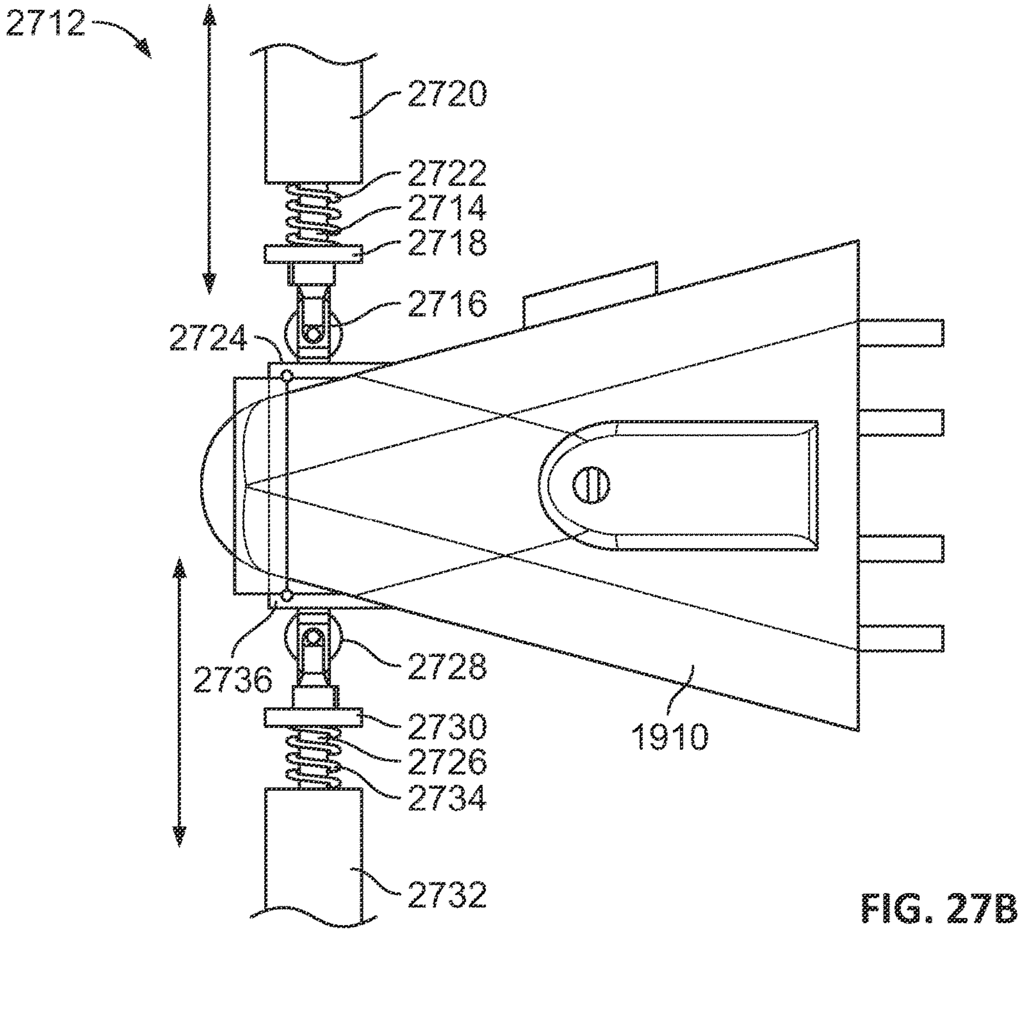

FIG. 27B illustrates another example compliance mechanism 2712. In this example, the compliance mechanism 2712 includes a first rod 2714 with a first roller 2716 and a first end stop 2718. The first rod 2714 extends from a first guide 2720. A spring 2722 is disposed between the first guide 2720 and the first end stop 2718, which biases the first end roller 2716 into engagement with a surface 2724 of the receiver 1910. The compliance mechanism 2712 similarly includes a second rod 2726 with a second roller 2728 and a second end stop 2730, a second guide 2732, and a second spring 2734 to bias the second roller 2728 into engagement with a second surface 2736 of the receiver 1910. The first and second guides 2720, 2732 are moveable (e.g., via an actuator) toward or away from the receiver 1910 to switch between the different modes. The compliance mechanism 2712 operates substantially the same as the compliance mechanism 1100 disclosed above. However, in this example, the guides 2720, 2732 and the rods 2714, 2726 are aligned (e.g., vertically in FIG. 27B) and disposed on opposite sides of the receiver 1910.

Figure 27C:
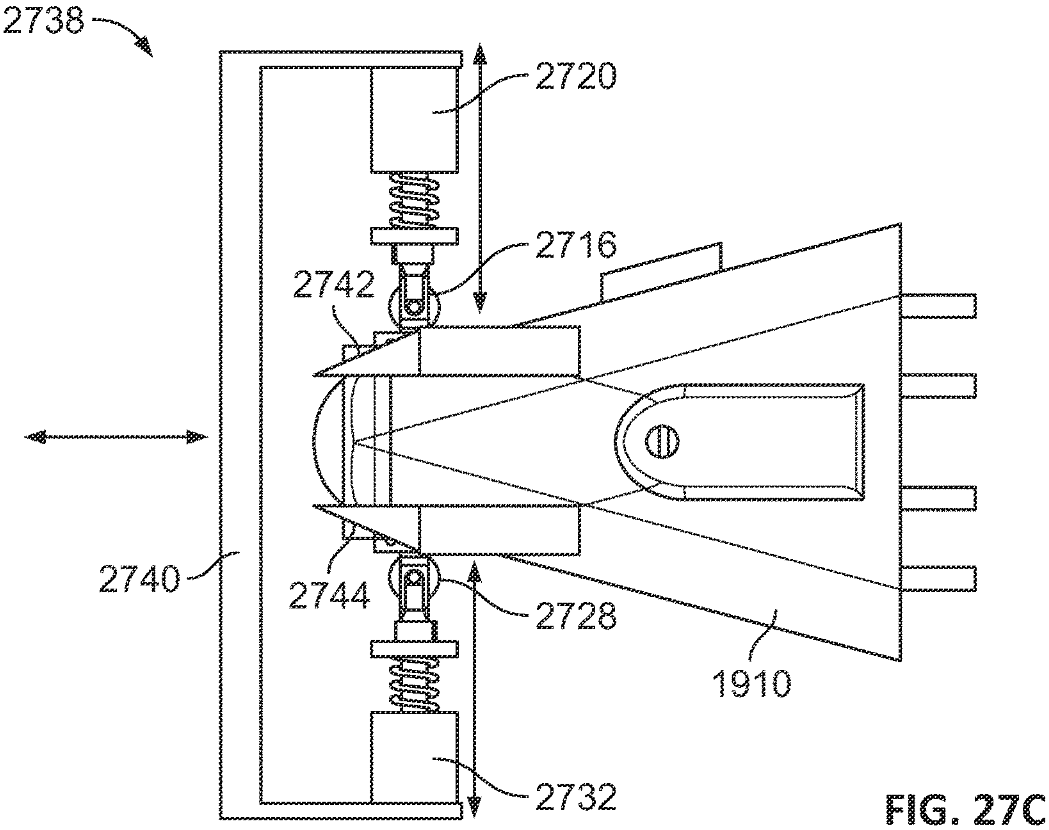

FIG. 27C illustrates another example compliance mechanism 2738. The compliance mechanism 2738 includes the same components as in FIG. 27B. However, in this example, the first and second guides 2720, 2732 are coupled to a frame 2740 that is moveable left and right in FIG. 27C. The frame 2740 may be moveable via an actuator. The receiver 1910 has sloped surfaces 2742, 2744. The frame 2740 can be moved to the left (e.g., to the third mode), such that the first and second rollers 2716, 2728 are not engaged with the sloped surfaces 2742, 2744 and do not provide any biasing force.

Figure 27D:
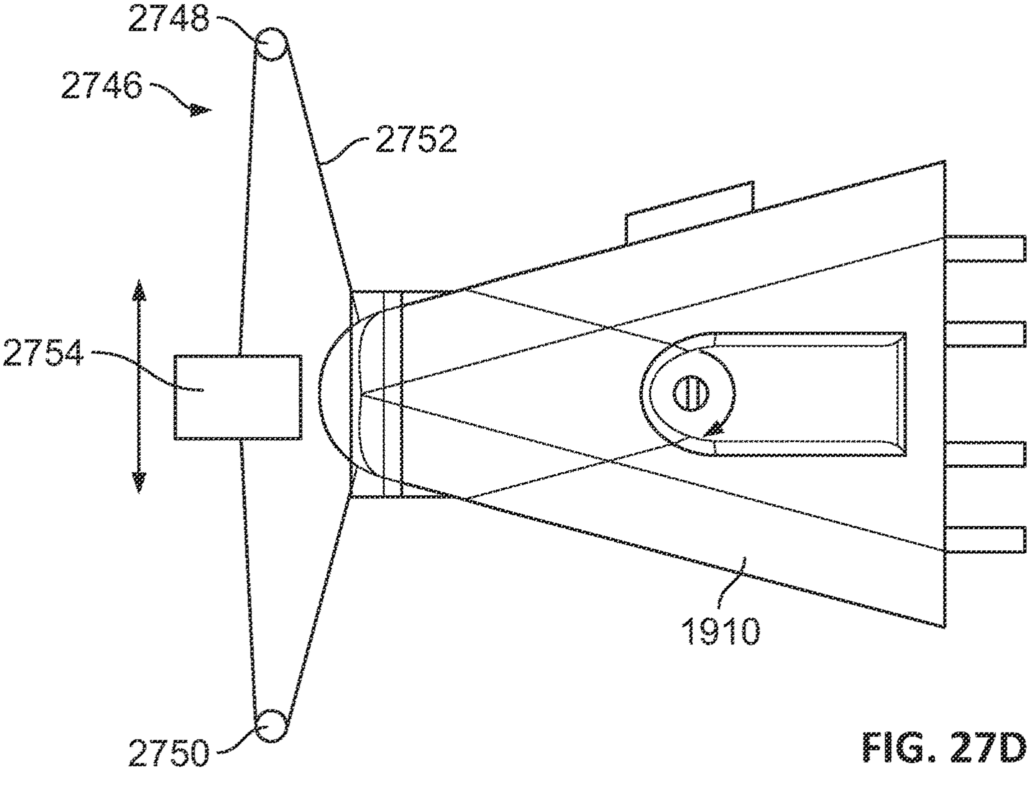

FIG. 27D illustrates another example compliance mechanism 2746. In this example, the compliance mechanism 2746 includes a pulley system including a first pulley 2748, a second pulley 2750, a line 2752 (e.g., a cord, a rope, a chain, etc.) wrapped around the pulleys 2748, 2750 and coupled to opposite sides of the receiver 1910. The compliance mechanism 2746 includes a block 2754 coupled to the line 2752. As the receiver 1910 is rotated up and down, the block 2754 is moved up and down in FIG. 27D. In some examples, an actuator can be used to bias the block 2754 to a center position, thereby biasing the receiver 1910 to the neutral or central pitch position. The block 2754 can also be locked, which prevents the receiver 1910 from rotating.

Figure 27E:
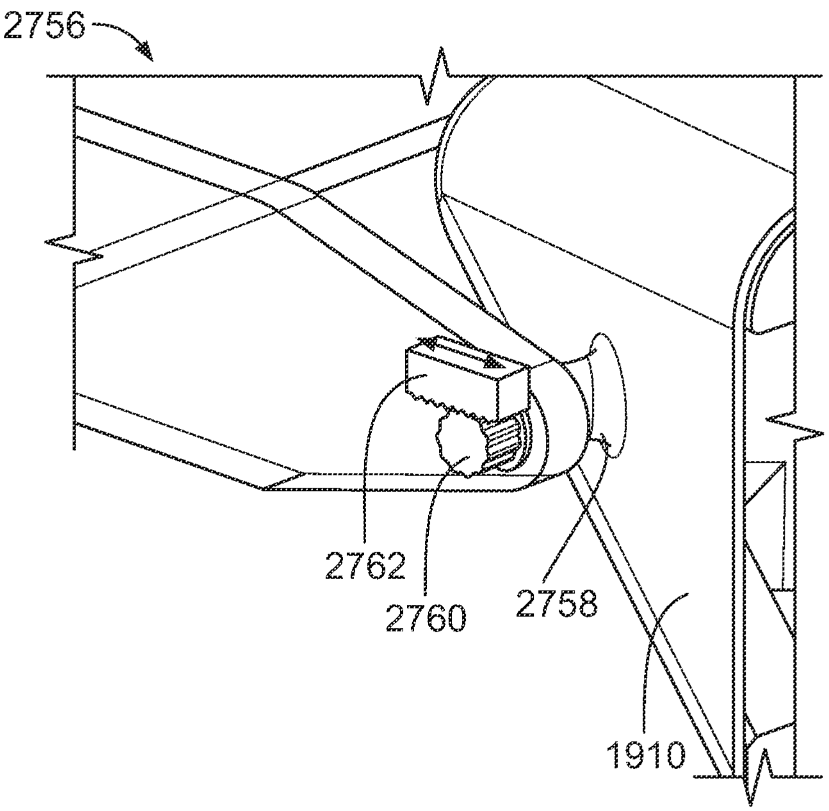

FIG. 27E illustrates another example compliance mechanism 2756. In FIG. 27E, the receiver 1910 includes a post or trunnion 2758. The compliance mechanism 2756 includes a gear 2760 coupled to the trunnion 2758 and a rack 2762 that is engaged with the gear 2760. The rack 2762 can be moved (e.g., via an actuator) to rotate the gear 2760 and thereby rotate the receiver 1910. The actuator can be activated to bias the receiver 1910 to the neutral position and/or lock the receiver 1910 from rotating.

Figure 27F:
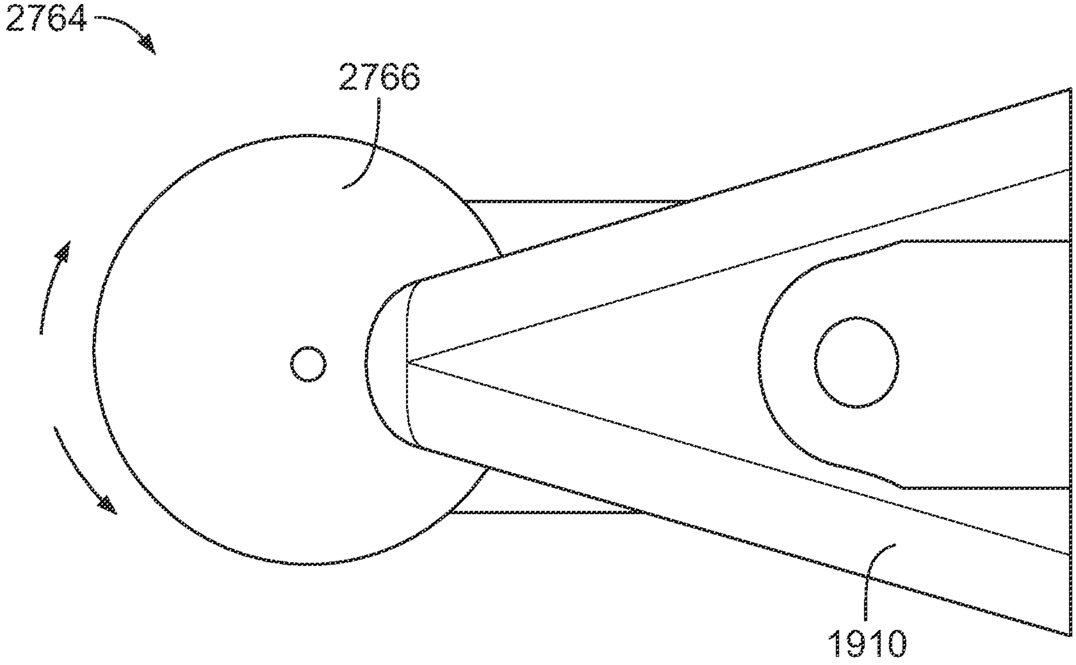

FIG. 27F illustrates another example compliance mechanism 2764. The compliance mechanism 2764 includes a flywheel 2766 coupled to the forward end of the receiver 1910. The flywheel 2766 can be driven by an actuator. The actuator can be activated to bias the receiver 1910 to the neutral position and/or lock the receiver from rotating.

Figure 28:
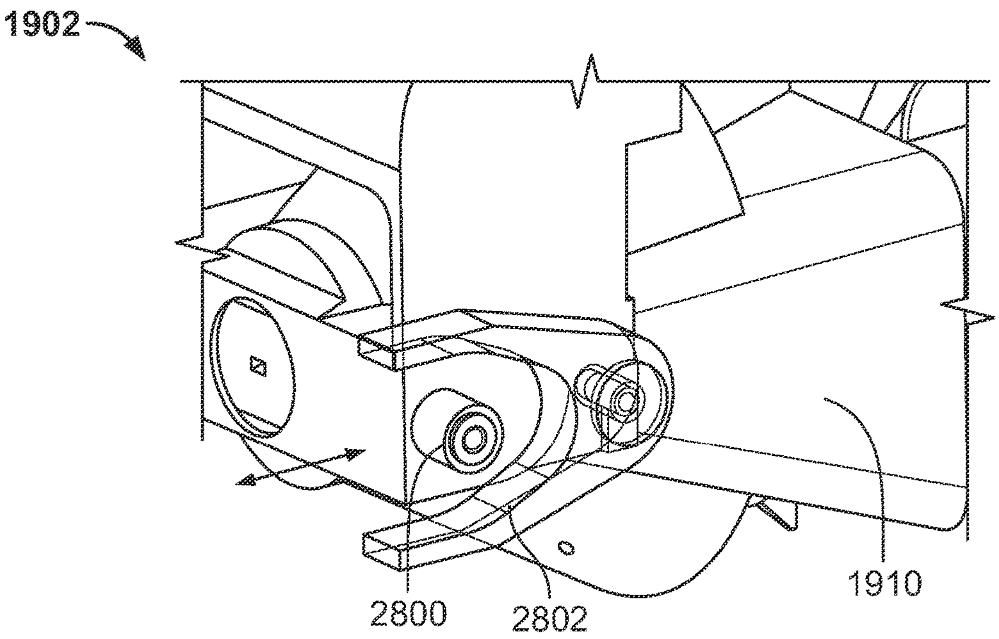
FIG. 28 illustrates an example frame used for locking an example receiver of the example first docking assembly of FIG. 19.

In some examples, the receiver 1910 is balanced or substantially balanced about the pitch axis 1920 to reduce (e.g., minimize) unwanted drooping or upward pitching (e.g., due to connector wiring or conduit weight on front of the receiver 1910). Additionally or alternatively, in some examples, the first docking assembly 1902 may include a mechanism to prevent the receiver 1910 from rotating downward (e.g., drooping) during the docking process. For example, FIG. 28 shows the example receiver 1910, which is pivotable about a joint 2800 (e.g., a pin, a roller, etc.), which defines the pitch axis 1920. In the illustrated example, the first docking assembly 1902 includes a frame 2802 that is movable relative to the receiver 1910. In particular, the frame 2802 is moveable forward or rearward (left and right in FIG. 28) as shown by the arrow. In some examples, the frame 2802 is moveably coupled to the first arm 2208 (FIG. 22) of the first mounting interface 1926 (FIG. 22). The frame 2802 can be moved forward or rearward via an actuator, which may be controlled by the docking control system 136 (FIG. 1).

Figure 29:
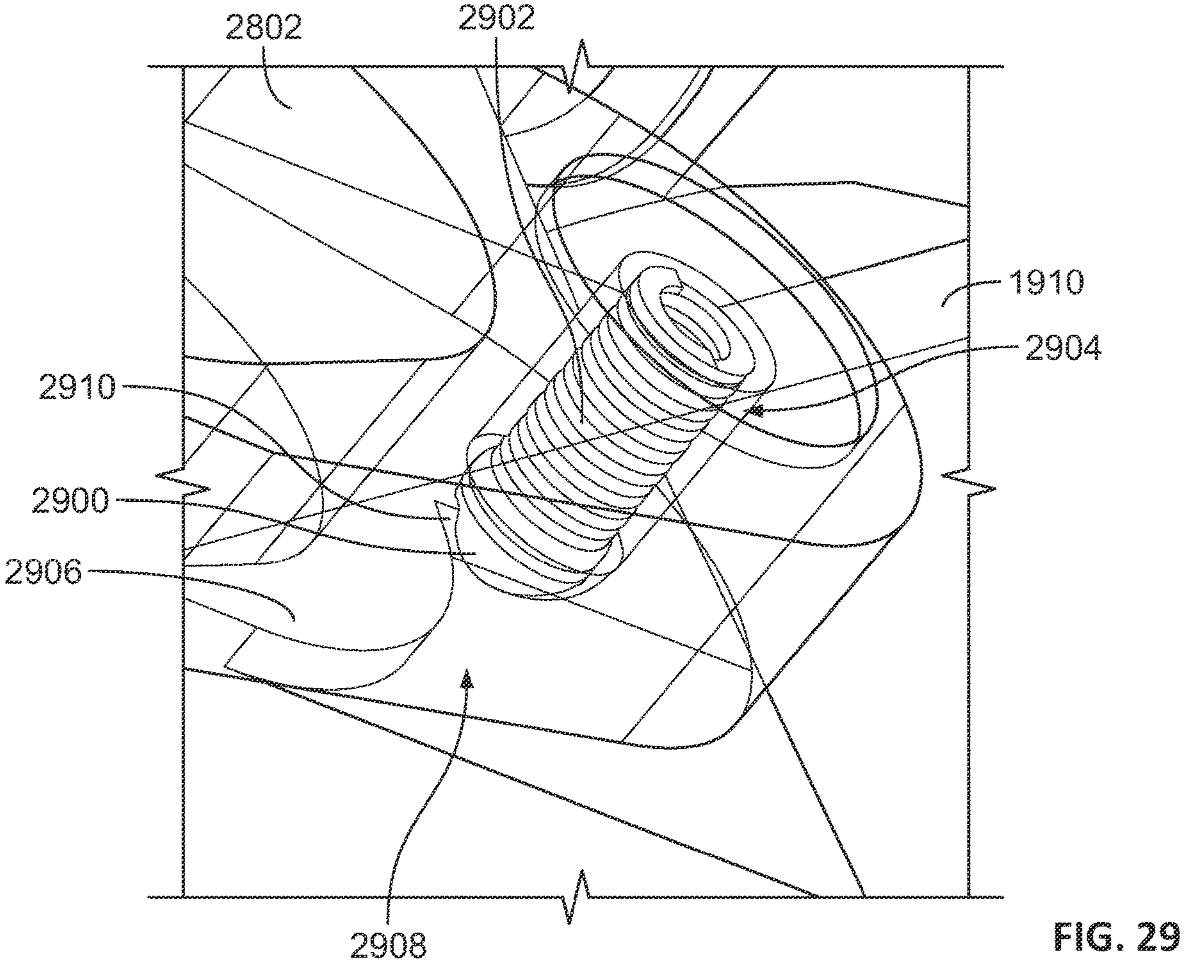
FIG. 29 is an enlarged view of the example frame of FIG. 28.

FIG. 29 is an enlarged view of the receiver 1910 and the frame 2802. The frame 2802 is shown as partially transparent. A ball 2900 and a spring 2902 are disposed in a bore 2904 defined in the frame 2802. The spring 2902 biases the ball 2900 into a side 2906 of the receiver 1910. As shown in FIG. 29, the side 2906 of the receiver 1910 has a notch 2908 with a ledge 2910, which forms a detent. When the ball 2900 is disposed in the notch 2908 below the ledge 2910, as shown in FIG. 29, the ball 2900 prevents the receiver 1910 from rotating downward (clockwise in FIGS. 28 and 29). However, in this position, the ball 2900 can still slide along the notch 2908 downward. Therefore, the receiver 1910 can still be rotated upward (counter-clockwise in FIGS. 28 and 29). The frame 2802 can be moved forward (to the left), which moves the ball 2900 out of the notch 2908 and enables the receiver 1910 to rotate downward freely unimpeded. When the frame 2802 is in the rearward position shown in FIGS. 28 and 29, the ball 2900 prevents the receiver 1910 from rotating downward as long as the force is below a retaining force provided by the spring 2902 behind the ball 2900. In other words, the spring 2902 can still be overcome if the downward force exceeds pre-designed limit, which may be chosen to be larger than the incidental or gravity loads but smaller than the force needed during docking if the plug 1912 is below the receiver 1910 during alignment.

Figure 30:
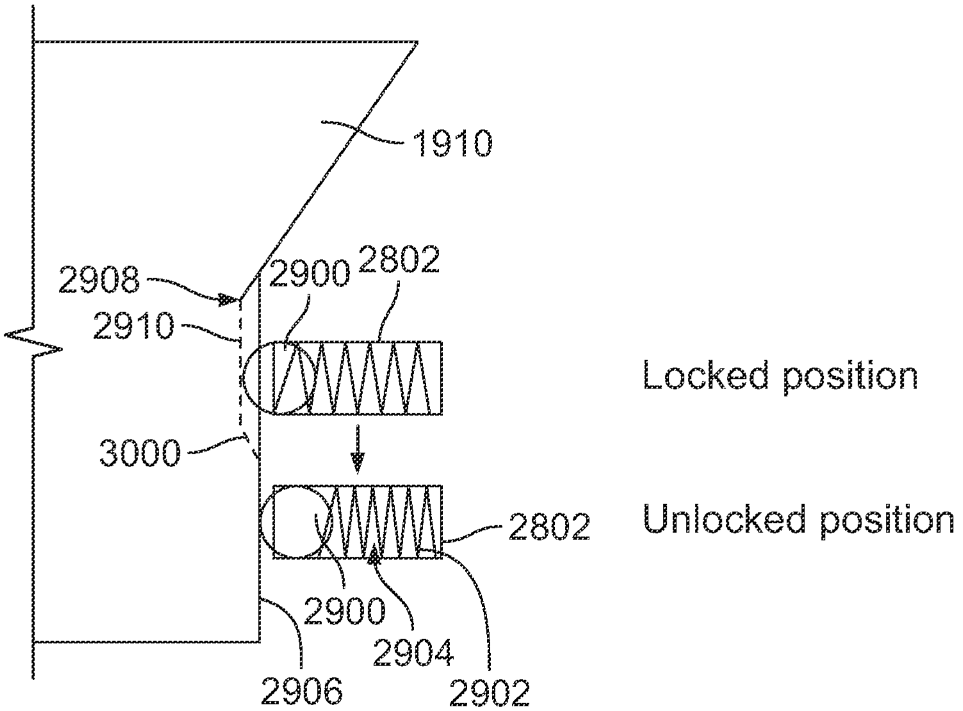
FIG. 30 shows an example configuration of the example frame of FIGS. 28 and 29.

For example, FIG. 30 is a top view of the receiver 1910 showing the frame 2802 in a locked position and an unlocked position. The dashed lines represent the ledge 2910 of the notch 2908, which is hidden. When the frame 2802 is in the locked position, the ball 2900 is partially disposed under the ledge 2910, which prevents the receiver 1910 from rotating downward. The side 2906 of the receiver 1910 has a sloped surface 3000. If the frame 2802 is moved forward (downward in FIG. 30), the ball 2900 slides along the sloped surface 3000 and into the bore 2904 of the frame 2802 (against the bias of the spring 2902). In the unlocked position, the ball 2900 is pushed against the side 2906 of the receiver 1910 by the spring 2902, but the ball 2900 is not disposed under the ledge 2910. As such, the receiver 1910 can rotate downward, while the ball 2900 slides or rolls along the side 2906 of the receiver 1910.

Figure 31:
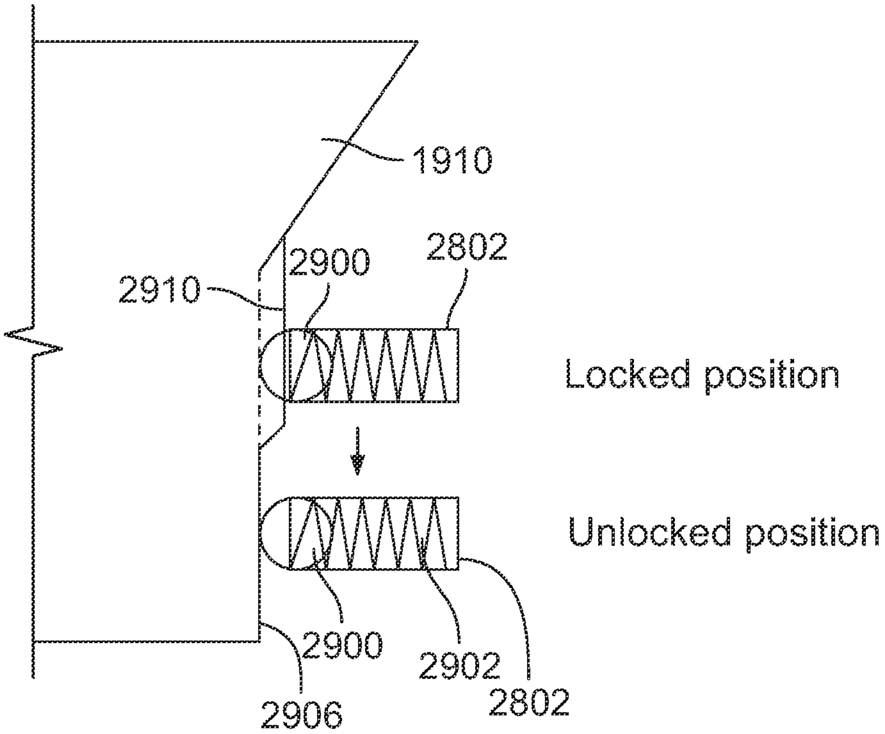
FIG. 31 shows another example configuration of the example frame of FIGS. 28 and 29.

FIG. 31 illustrates another example configuration of the ledge 2910 and the ball 2900. In this example, the ledge 2910 extends outward from the side 2906 of the receiver 1910. Therefore, when the frame 2802 is moved from the locked position to the unlocked position, the ball 2900 does not retract into the frame 2802. In some examples the ball 2900 may not even contact the side 2906 of the receiver 1910. This configuration may be advantageous because it requires less force to move the frame 2802, because the ball 2900 is not pushed into the frame 2802 against the bias of the spring 2902. This configuration also results in less contact wearing of the surfaces during driving when in the unlocked position.

As disclosed herein, the docking system 1900 enables the receiver 1910 and/or the plug 1912 to move (rotate) about certain axes, such as pitch, yaw, and roll axes, which enables the components to mate even if they are misaligned along any of these axes. Additional or alternatively, the example docking system 1900 may also enable translational movement in the lateral (y- (side-to-side) and z- (vertical)) directions. This may be beneficial because in some docking situations, the receiver 1910 and the plug 1912 may be out of alignment in the lateral directions (side-to-side and/or vertical directions). Further, while the components are pitching and yawing, there is a tendency for lateral misalignment. As used herein, movement in the lateral direction refers to horizontal movement side-to-side along the pitch axis 1920 and/or vertically along the yaw axis 1922. In other words, lateral movement is movement along a vertical plane that is perpendicular to the roll axis 1924 (e.g., the direction of driving). In some examples, the second docking assembly 1904 and/or the trailer 104 includes a lateral compliance mechanism or joint that enables the plug 1912 to move laterally (side-to-side and/or vertically) relative to the trailer 104. As such, as the receiver 1910 and the plug 1912 engage during a docking process, the plug 1912 can move (translate) left or right and/or up and down if the receiver 1910 and the plug 1912 are misaligned in these directions. This prevents the system from dragging the trailer 104 on uneven terrain during docking. In some examples, the lateral compliance joint is a passive device that does not require power.

Figure 32:
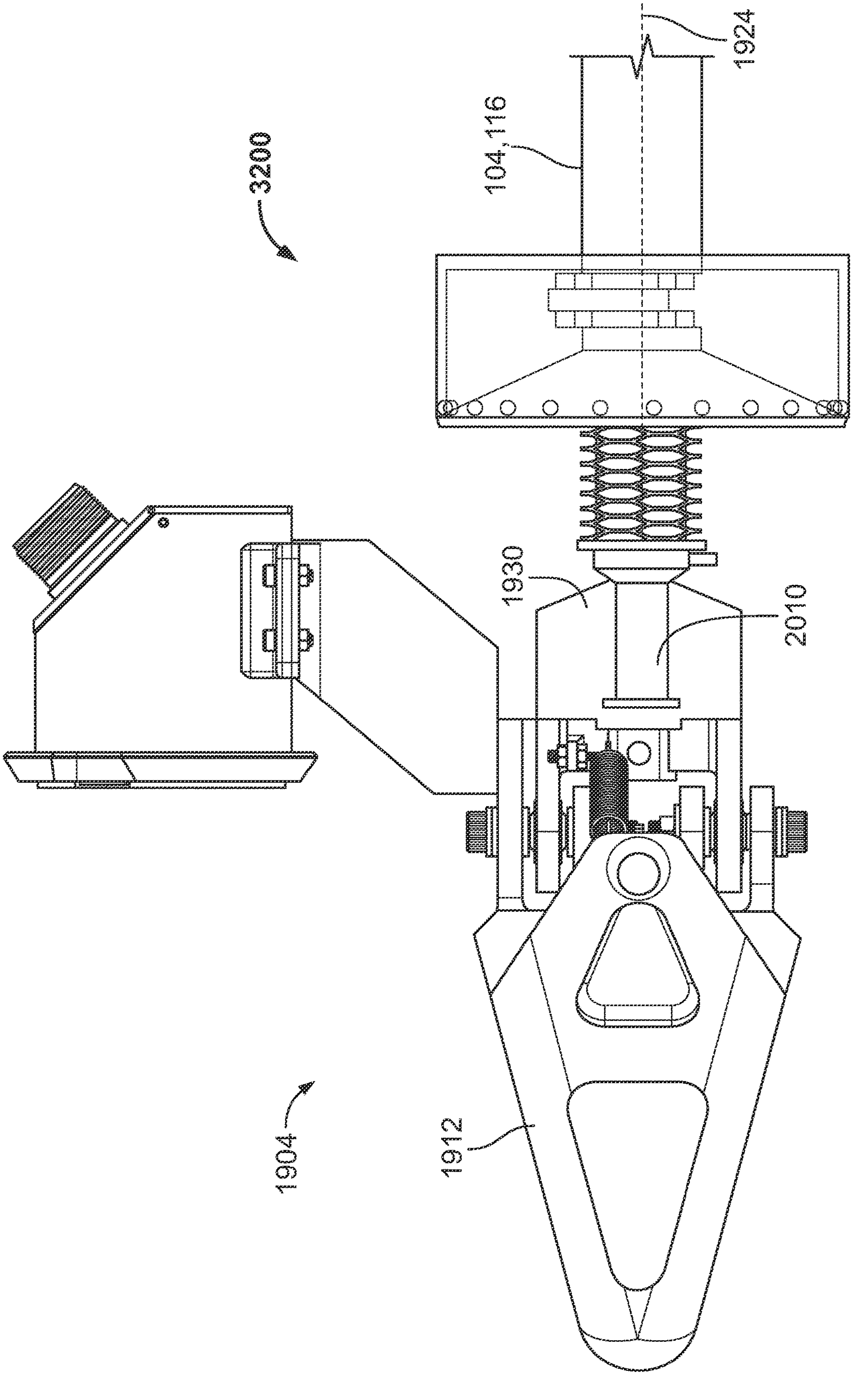
FIG. 32 illustrates an example lateral compliance joint implemented in connection with the example second docking assembly of FIG. 19.

Now referring to FIG. 32, the second docking assembly 1904 includes an example lateral compliance joint 3200. In this example, the lateral compliance joint 3200 is coupled between the tow bar 116 of the trailer 104 and the coupler 1930. The lateral compliance joint 3200 enables the plug 1912 to move laterally (side-to-side and/or vertically) relative to the tow bar 116. As such, if the receiver 1910 and the plug 1912 are misaligned laterally during a docking process, the plug 1912 can move laterally into alignment with the receiver 1910 so the plug 1912 can be fully inserted into the receiver 1910. In this example, a portion of the lateral compliance joint 3200 forms the shaft 2010 about which the coupler 1930 rotates. The lateral compliance joint 3200 does not rotate, but allows the coupler 1930 and the plug 1912 to rotate about the roll axis 1924 unimpeded. In other examples, the lateral compliance joint 3200 can be in another location on the trailer 104 that enables lateral movements of the plug 1912. For example, the lateral compliance joint 3200 can be located between two portions of the tow bar 116 or between the tow bar 116 and a front of the trailer bed.

Figure 33A:
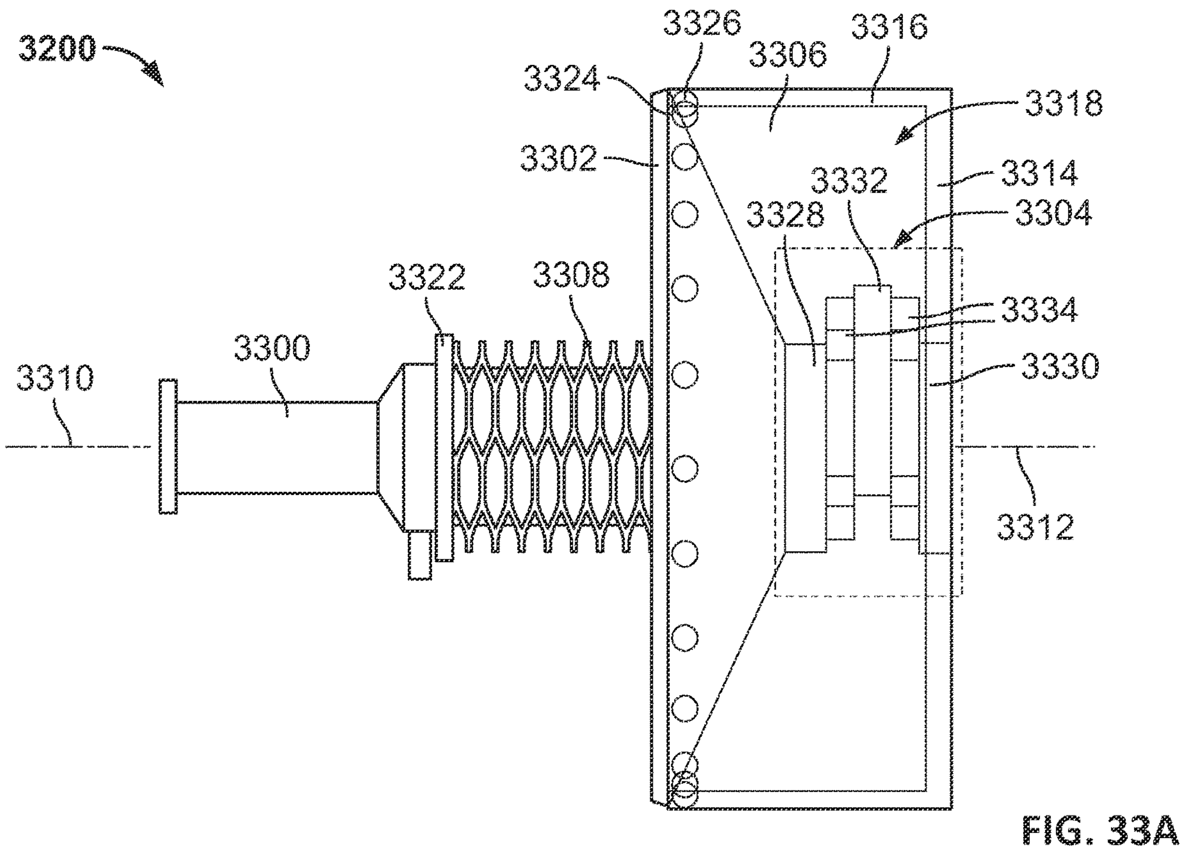
FIGS. 33A-33C are different views of the example lateral compliance joint of FIG. 32 in a neutral position.
Figure 33B:
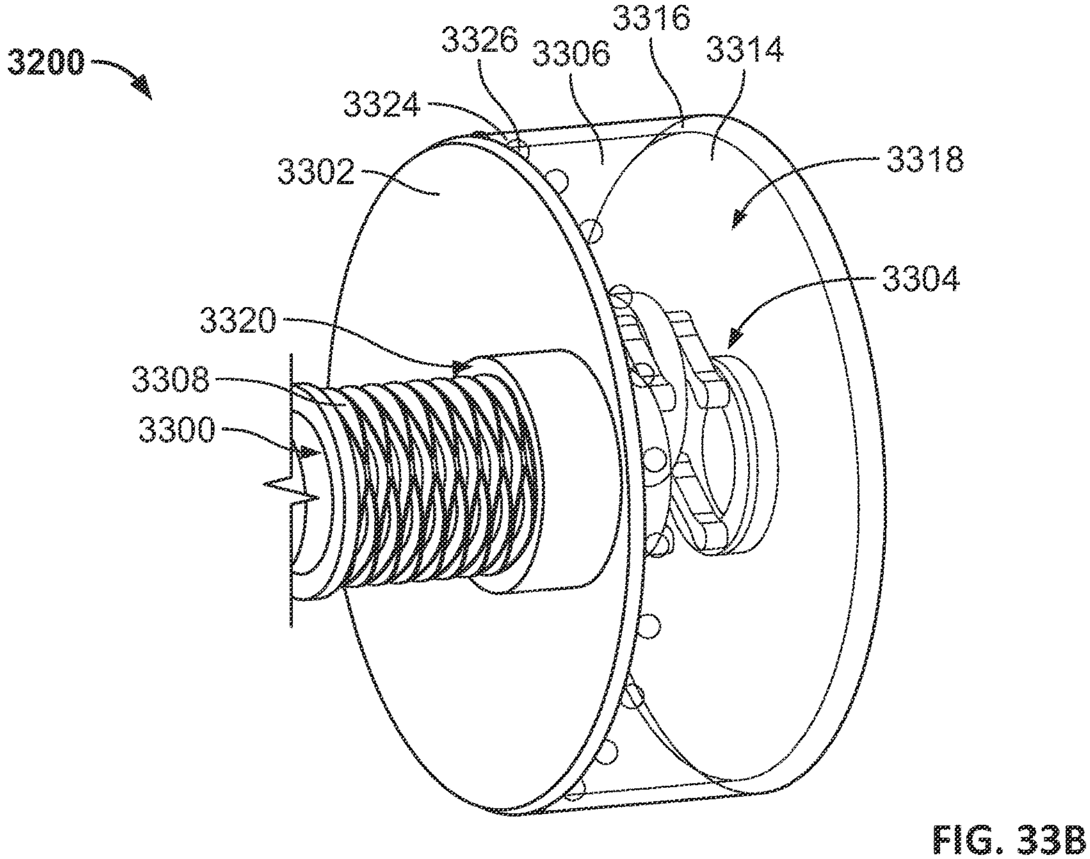
Figure 33C:
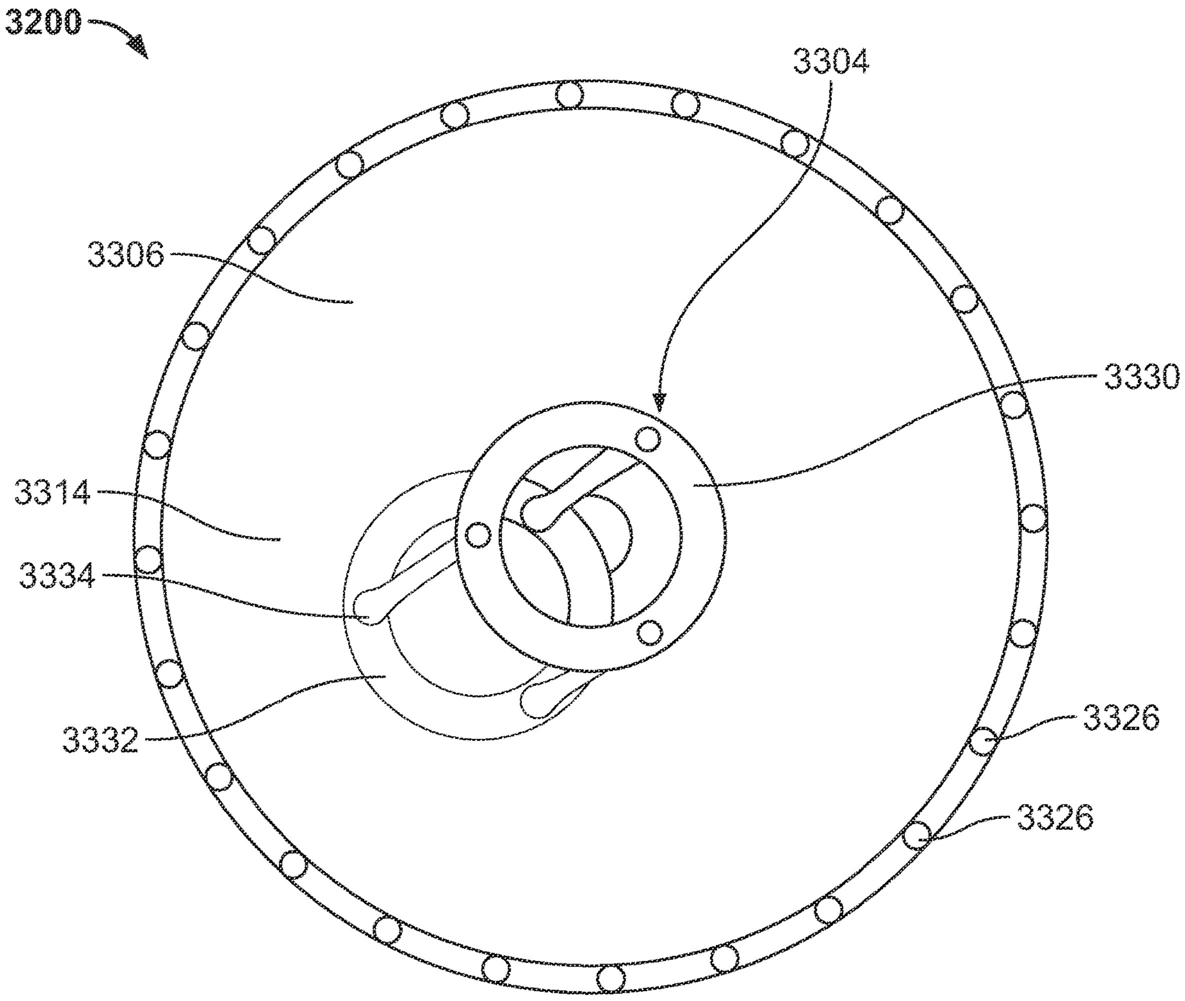

FIGS. 33A, 33B, and 33C are isolated views of the example lateral compliance joint 3200 of FIG. 32. FIG. 33A is a side view of the lateral compliance joint 3200, FIG. 33B is a perspective view of the lateral compliance joint 3200, and FIG. 33C is an end view of the lateral compliance joint 3200. In the example of FIGS. 33A-33C, the lateral compliance joint 3200 is in a neutral or central position (e.g., no lateral forces acting upon the lateral compliance joint 3200 as a result of docking). The lateral compliance joint 3200 includes a connection spigot 3300, a conical guide 3302, a lateral coupling assembly 3304, a frame 3306, and a spring 3308. The connection spigot 3300 is to be coupled to the coupler 1930 (and, thus, to the plug 1912), and the frame 3306 is to be coupled to the tow bar 116. As shown in FIG. 33A, the connection spigot 3300 has a first central axis 3310 and the frame 3306 has a second central axis 3312. In the neutral position in FIG. 33A, the first and second axes 3310, 3312 are aligned or coincident. As such, the plug 1912 and the tow bar 116 are axially aligned.

In the illustrated example, the frame 3306 includes a plate 3314 and a wall 3316 extending from the plate 3314. The frame 3306 is cylindrically-shaped. The plate 3314 and the wall 3316 define a cavity 3318. The lateral coupling assembly 3304 is disposed in the cavity 3318 and coupled to the plate 3314 of the frame 3306. In the illustrated example, the connection spigot 3300 is coupled to the frame 3306 by the lateral coupling assembly 3304. The connection spigot 3300 extends through an opening 3320 (FIG. 33B) in the conical guide 3302. The conical guide 3302 is slidable axially along the connection spigot 3300.

In the illustrated example, the spring 3308 is disposed between a flange 3322 on the connection spigot 3300 and the conical guide 3302. Therefore, the spring 3308 biases the conical guide 3302 into engagement with an edge or end 3324 of the wall 3316 of the frame 3306. This provides a force that acts as a neutralizing force to guide the guide back into the neutral position. In this example, the spring 3308 is a stacked wave spring. However, in other examples, the spring 3308 can be implemented by another type of spring (e.g., a compression spring, a leaf spring, etc.). The conical guide 3302 can slide into and out of the frame 3306 to allow lateral movement of the connection spigot 3300. In the illustrated example, the end 3324 of the wall 3316 has ball bearings 3326, which enables the conical guide 3302 to slide smoothly along the end 3324 of the wall 3316. In the illustrated example, the conical guide 3302 is conical shaped, which assists the conical guide 3302 in gliding into and out of the frame 3306.

The lateral coupling assembly 3304 enables the spigot 3300 and the frame 3306 to move out of alignment with each other. In particular, the lateral coupling assembly 3304 allows movement in two degrees of freedom. In this example, the lateral coupling assembly 3304 is a Schmidt coupling. As shown in FIG. 33A, the lateral coupling assembly includes a coupling input ring 3328, a coupling output ring 3330, an intermediate coupling ring 3332, and a plurality of links 3334. The coupling input ring 3328 is coupled to the connection spigot 3300. The coupling output ring 3330 is coupled to the plate 3314 of the frame 3306. The intermediate coupling ring 3332 is coupled to the coupling input ring 3328 and the coupling output ring 3330 via the plurality of links 3334. The intermediate ring 3332 and the links 3334 allow the coupling input ring 3328, which is coupled to the connection spigot 3300, and the coupling output ring 3330, which is coupled to the frame 3306, to be at different translational positions while still being connected. While in this example the lateral coupling assembly 3304 is implemented as a Schmidt coupling, in other examples, the lateral coupling assembly 3304 can be implemented by another type of coupling for maintaining a connection between two shafts.

In FIGS. 33A-33C, the lateral compliance joint 3200 is in the neutral or central position in which the connection spigot 3300 and the frame 3306 are axially aligned. This may occur when there is little or no lateral force acting on the lateral compliance joint 3200. In this position, the conical guide 3302 is aligned with the frame 3306. The conical guide 3302 is at least partially disposed in the cavity 3318 of the frame 3306.

Figure 34A:
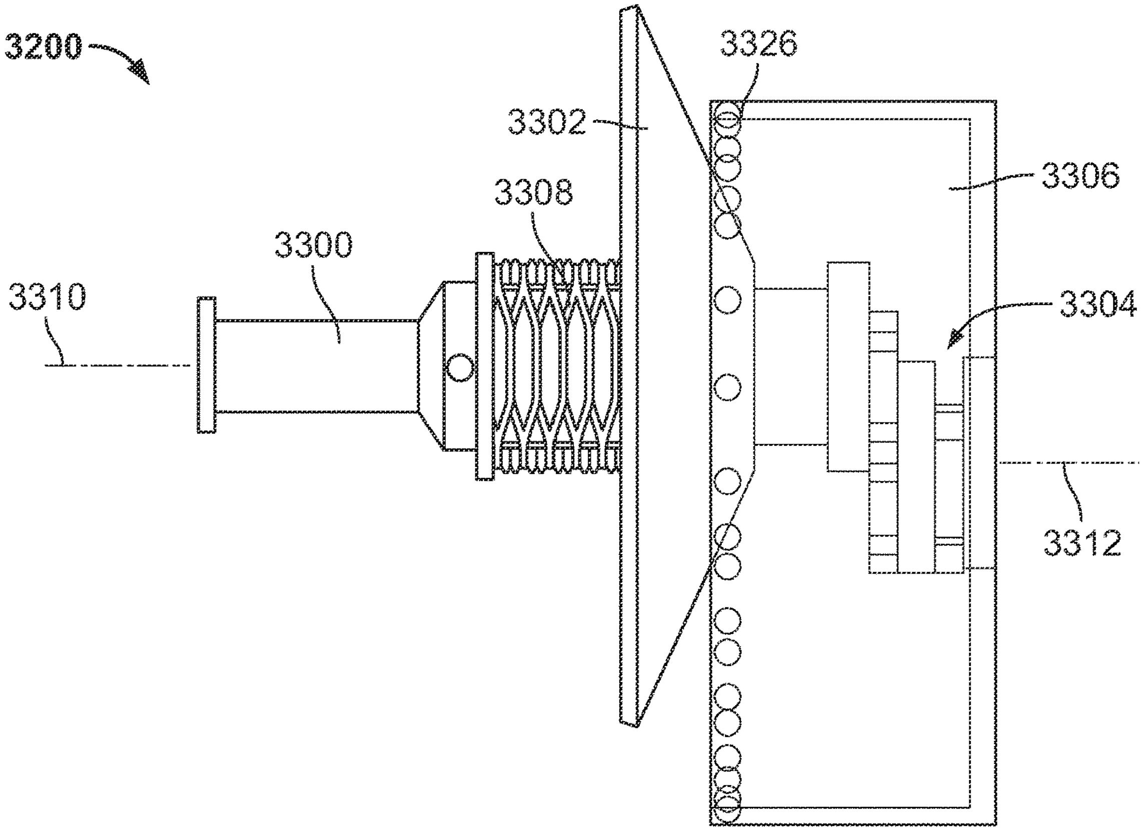
FIGS. 34A and 34B show the example lateral compliant joint of FIG. 32 in a partially extended position.
Figure 34B:
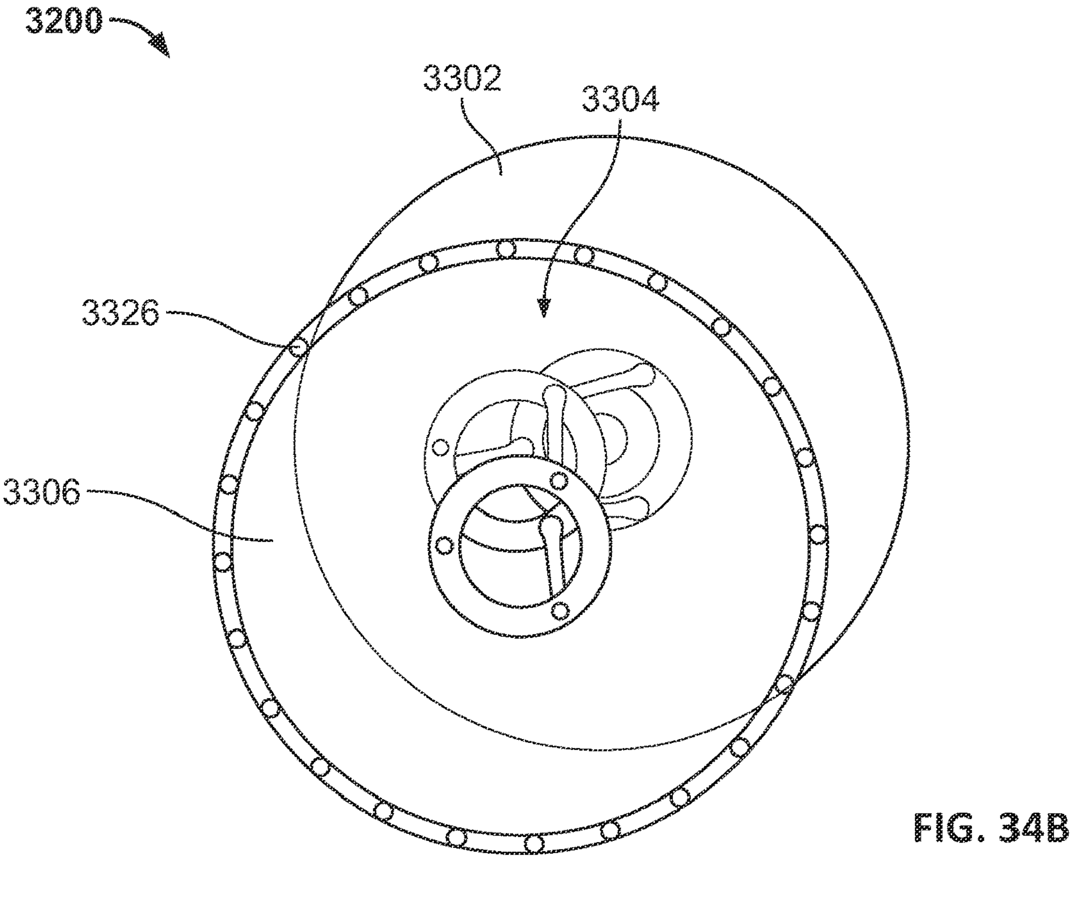

During a docking process, the receiver 1910 and the plug 1912 may be misaligned in a lateral direction (e.g., side-to-side and/or vertically). As the plug 1912 starts to slide into the receiver 1910, this lateral misalignment force may cause the spigot 3300 to move radially (i.e., in a lateral direction) relative to the frame 3306. For example, FIGS. 34A and 34B show the lateral compliance joint 3200 in an intermediate lateral position in which the spigot 3300 has moved radially relative to the frame 3306. As such, the central axes 3310, 3312 are not aligned. The lateral coupling assembly 3304 enables the spigot 3300 to move radially in any direction relative to the frame 3306. As the spigot 3300 move out of alignment with the frame 3306, the conical guide 3302 slides along the ball bearings 3326 and is forced to move axially along the connection spigot 3300 (to the left in FIG. 34A). This compresses the spring 3308.

Figure 35A:
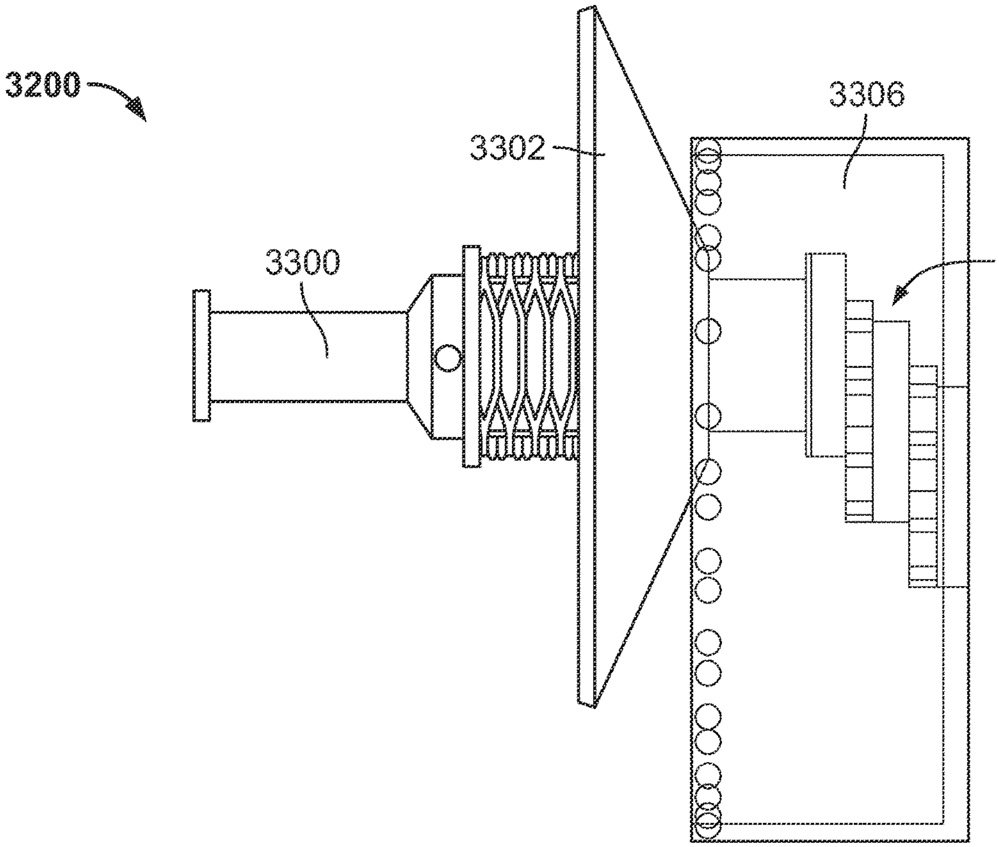
FIGS. 35A and 35B show the example lateral compliance joint of FIG. 32 in a fully extended position.
Figure 35B:
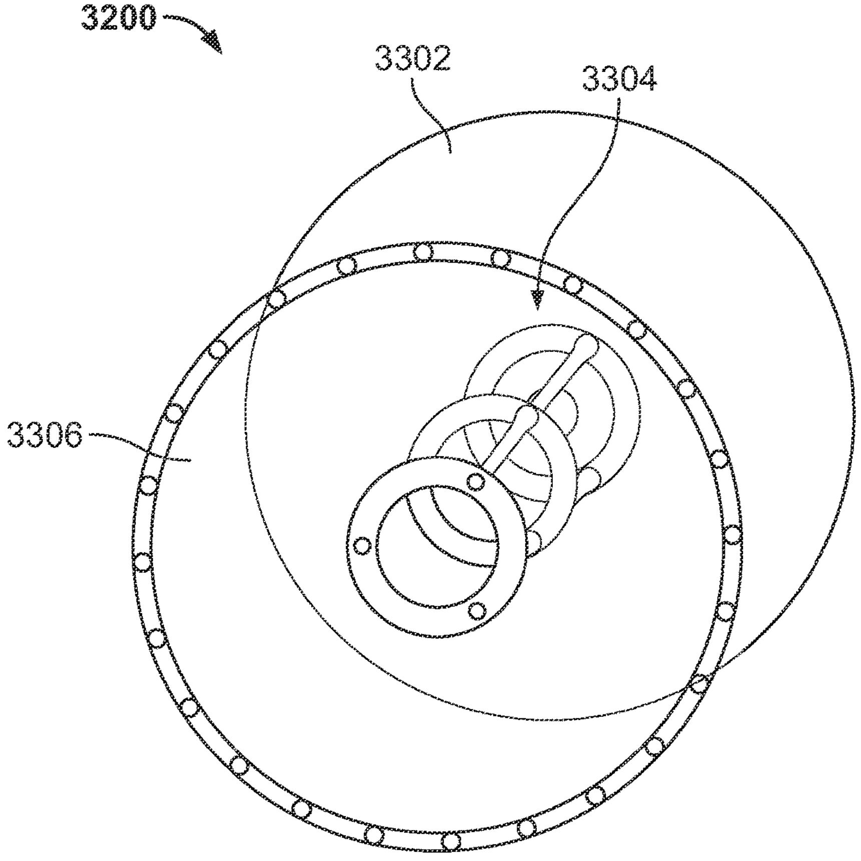

FIGS. 35A and 35B show the lateral compliance joint 3200 in an extended lateral position, which corresponds to the limit of lateral movement between the spigot 3300 and the frame 3306. As shown in FIG. 35A, the conical guide 3302 is moved further up the spigot 3300. In this position, the lateral coupling assembly 3304 is fully expanded. In some examples, the lateral compliance joint 3200 is capable of providing 50 mm (±25 mm from the center position) of radial movement between the spigot 3300 and the frame 3006, as shown between the positions in FIGS. 33A and 35A. Thus, the plug 1912 can move within a range of 50 mm in the lateral direction. However, in other examples, the lateral coupling assembly 3304 can be configured to achieve a larger or smaller amount of lateral movement between the spigot 3300 and the frame 3306. For instance, as another example, the lateral compliance joint 3200 may be capable of providing ±113 mm of lateral movement of the spigot 3300 relative to the frame 3306. In some examples, the range of motion is based on the size of the lateral compliance joint 3200. In some examples, the frame 3306 has a diameter of about 172 mm (e.g., ±5 mm) and the coupling input ring 3328 and the coupling output ring 3330 have a diameter of about 50 mm (e.g., ±5 mm). In other examples, these diameters may be larger or smaller. Also, the example of the lateral compliance joint 3200 in FIGS. 35A and 35B shows movement in one radial direction. However, it is understood that the lateral coupling assembly 3304 enables the the spigot 3300 and the frame 3306 to move in any radial (lateral) direction.

Figure 36:
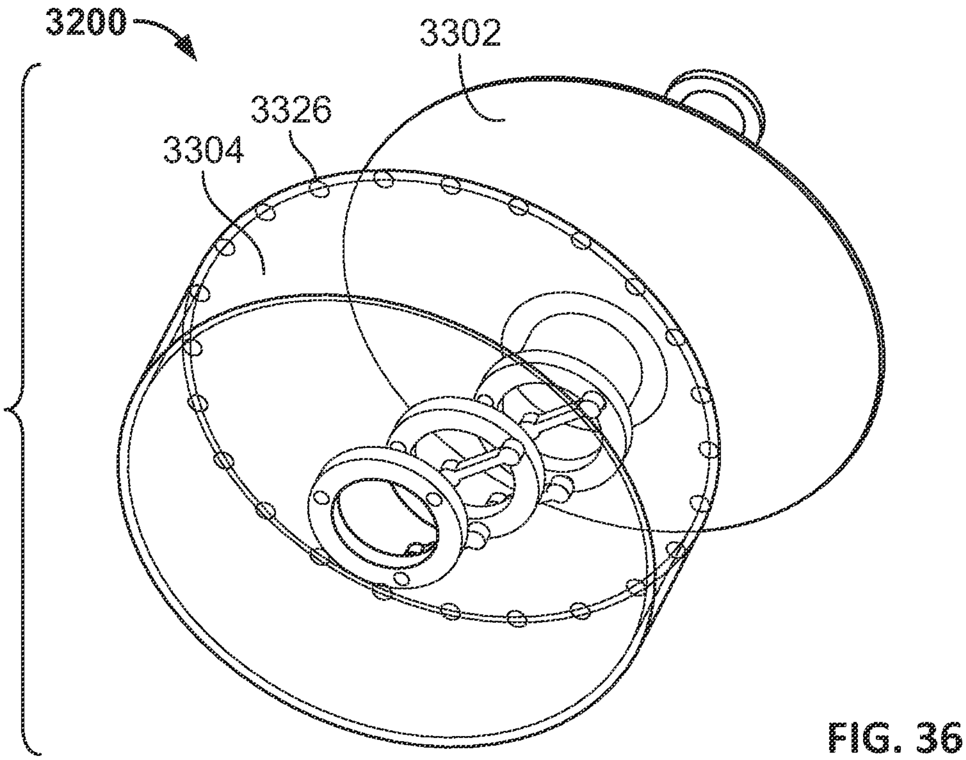
FIG. 36 is a perspective view of the example lateral compliance joint of FIG. 32 in the fully extended position.
Figure 37:
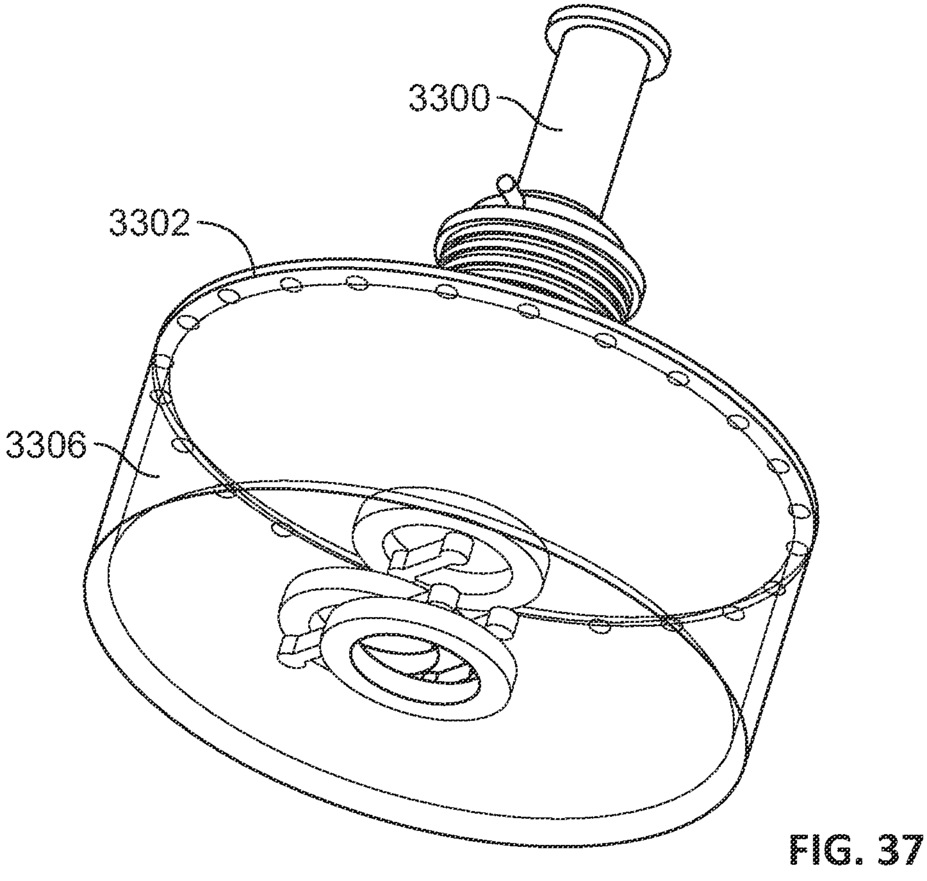
FIG. 37 is a perspective view of the example lateral compliance joint of FIG. 32 in the neutral position.

FIG. 36 is a perspective view of the lateral compliance joint 3200 in the extended lateral position. When the lateral force is removed, such as after undocking the tow vehicle 102 and the trailer 104, the spring force on the conical guide 3302 biases the conical guide 3302 back into the frame 3306. The conical guide 3302 slides along the ball bearings 3326. As a result, the conical guide 3302 moves back into alignment with the central axis of the frame 3306 and, thus, moves the spigot 3300 back to the central position, as shown in FIG. 37. This centering may also occur while the trailer 104 is being towed by the tow vehicle 102 as the tow bar 116 moves into alignment with the tow vehicle 102. Thus, the example lateral compliance joint 3200 enables lateral movements between the plug 1912 and the tow bar 116, which is advantageous during a docking assembly, and also passively centers the plug 1912. This may be advantageous in a lunar environment where the terrain is uneven and the docking components are often misaligned in the y (side-to-side) and z (vertical) directions. This is also beneficial for use with autonomous systems because it reduces the need for precise lateral alignment. This is advantageous because the lateral misalignment is a direct result of misalignment in the pitch, yaw and roll axes. In some examples, when the lateral compliance joint 3200 is in the neutral or central position, the lateral compliance joint 3200 can be locked to prevent lateral and vertical movements of the conical guide 3302 when the plug 1912 is docked with the receiver 1910. In other examples, the lateral compliance joint 3200 may allow lateral movement while the tow vehicle 102 is towing the trailer 104. Also, the lateral compliance joint 3200 can be oriented in other directions, which allows the spigot 3300 and the frame 3306 to move relative to each other along different planes or axes. In some examples, the lateral compliance joint 3200 does not include any elastomeric components that would otherwise become brittle due to low temperatures in harsh environment (e.g., on the moon). As such, the lateral compliance joint 3200 is relatively robust and can be used in harsher environments. Although the docking process disclosed herein is described for lunar vehicles, the lateral compliance joint 3200 disclosed herein can be used on any other kind of docking systems to enable lateral compliance.

As disclosed above, the docking systems 200, 1900 can account for the three rotational DOFs, in the yaw, pitch, and roll axes. The docking systems 200, 1900 also inherently rely on fourth and fifth DOFs in the side-to-side and vertical directions. Movement along these fourth and fifth DOFs can be accounted for in two different methods, for example. In a first method, the trailer 104 has two wheels 118 and a sprung stabilizer leg, such as the stabilizer leg 120, to effectively allow for vertical motion via rotation about the axle and corresponding substantially vertical motion of the stabilizer leg, either unloading or compressing the compliance spring of the stabilizer leg 120, which provides the fourth DOF. In addition, the wheels 118 have the ability to rotate differentially—one rolling forward and the other rolling backward effectively provides the horizontal side-to-side fifth DOF. This first method relies on some level of trailer shifting and the foot of the stabilizer leg 120 sliding on the ground surface. The second method is to include a dedicated translational compliance mechanism (e.g., the lateral compliance mechanism 3200) to provide the vertical and side-to-side translations required during docking, which provides the fourth and fifth DOFs. This dedicated mechanism enables docking to be fully locked prior to any trailer wheel or foot movement along the ground. Therefore, in some examples, the components of the docking systems 200, 1900 are moveable about five degrees of freedom (DOFs). In particular, the docking systems 200, 1900 enable movements of the docking components along the pitch, yaw, and roll axes, as well as the lateral (side-to-side and vertical) directions. The sixth DOF, in the axial direction, is accounted for by movement of the tow vehicle 102 driving toward the trailer 104 during the docking process. In some examples, the docking systems 200, 1900 can include one or more mechanisms to allow some movement of the components in the axial direction. As such, the docking systems 200, 1900 may enable movement in all six DOFs.

As disclosed above, in some examples, when the plug 212 is fully inserted into the receiver 1910, the first vehicle 102 can be stopped manually and/or via an autonomous driving control system. Due to the nature of manual driving and/or autonomous control systems, there may be a slight overshoot or under-shoot when reversing. There are several example options for the system to handle this part of the docking process. For example, the manual driving and/or autonomous driving system can have precise enough control at slow enough speeds when reversing that the over-shoot or under-shoot is negligible. As another example, the trailer 104 is pushed backwards once the plug 212 reaches the end of travel in the receiver 210, thereby sliding the stabilizer leg 120 and/or the wheels 118 of the trailer 104 along terrain during docking. As another example, the manual driving and/or the autonomous driving system can stop the first vehicle 102 slightly early before the plug 212 reaches the end of travel in the receiver 210. In such an example, during the locking operation, the lock jaws 902, 912 and the actuators 906 act on the lock pins 216*a*, 216*b* to finish pulling the plug 212 into the receiver 210. As such, the lock jaws 902, 912 and the actuators 906 are sized and selected accordingly to be capable of this final pulling force. In another example, a longitudinal spring can be incorporated into the two bar 116 of the trailer 104 and/or the first mounting interface 226 to permit some compliance along the direction of reversing, thereby allowing the plug 212 to travel fully into the receiver 210 without sliding the trailer 104 backwards along the ground. As another example, a hybrid combination of the example options disclosed above can be used, which can be optimized for factors including performance, mass, simplicity and reliability depending on Concept of Operations (CONOPS) requirements.

In some examples, the trailer 104 includes the two wheels 118 on opposite sides of the trailer 104. As such, the trailer 104 may be supported on a third side to maintain stability in a neutral, non-docked position. Therefore, in some examples, the trailer 104 includes the stabilizer leg 120 for supporting the trailer 104 in the neutral position. In some examples, the stabilizer leg 120 includes an actuator that can be used to extend or retract the leg.

Figure 38:
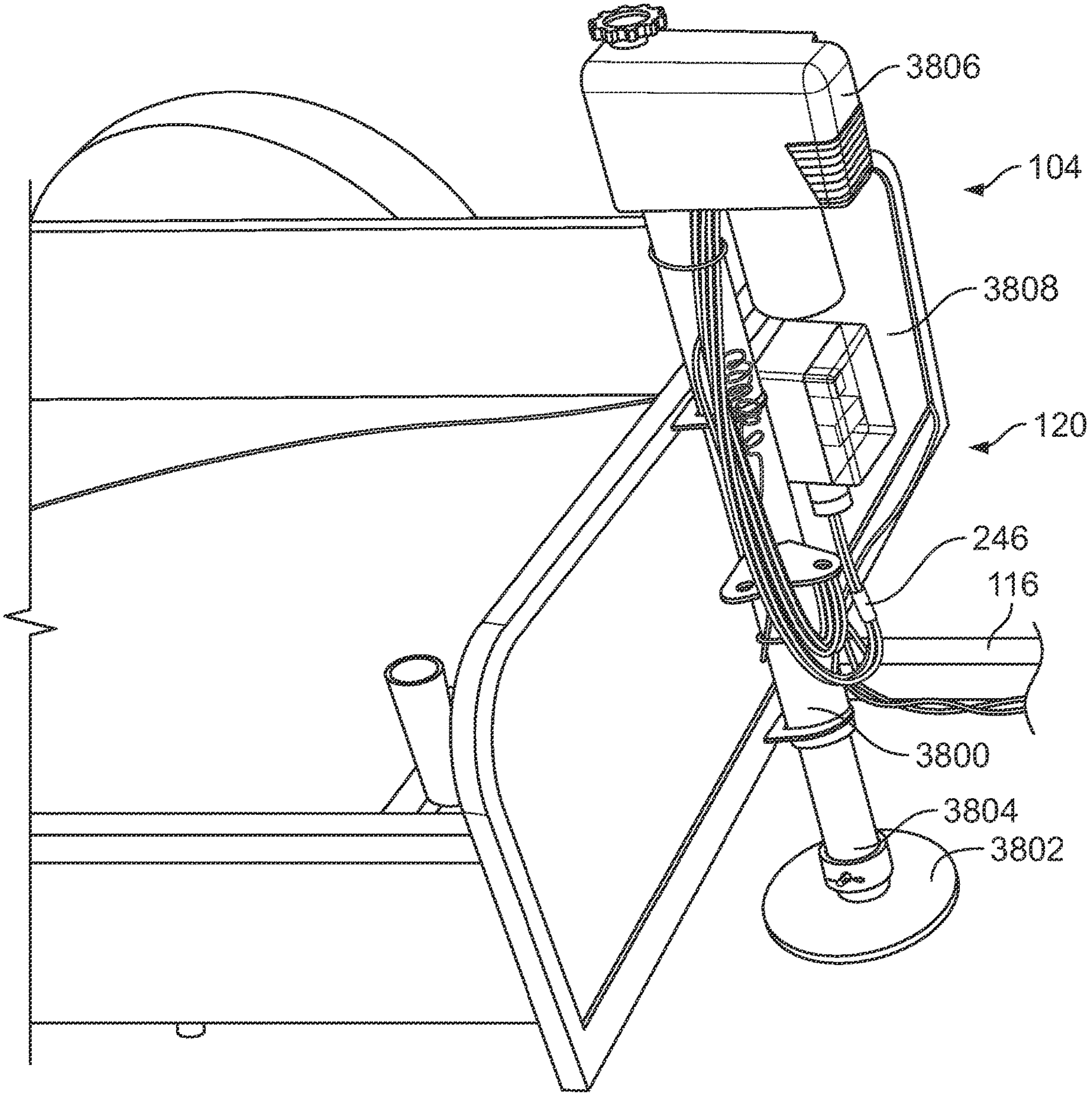
FIG. 38 illustrates an example stabilizer leg on the example trailer of FIG. 1.
Figure 39:
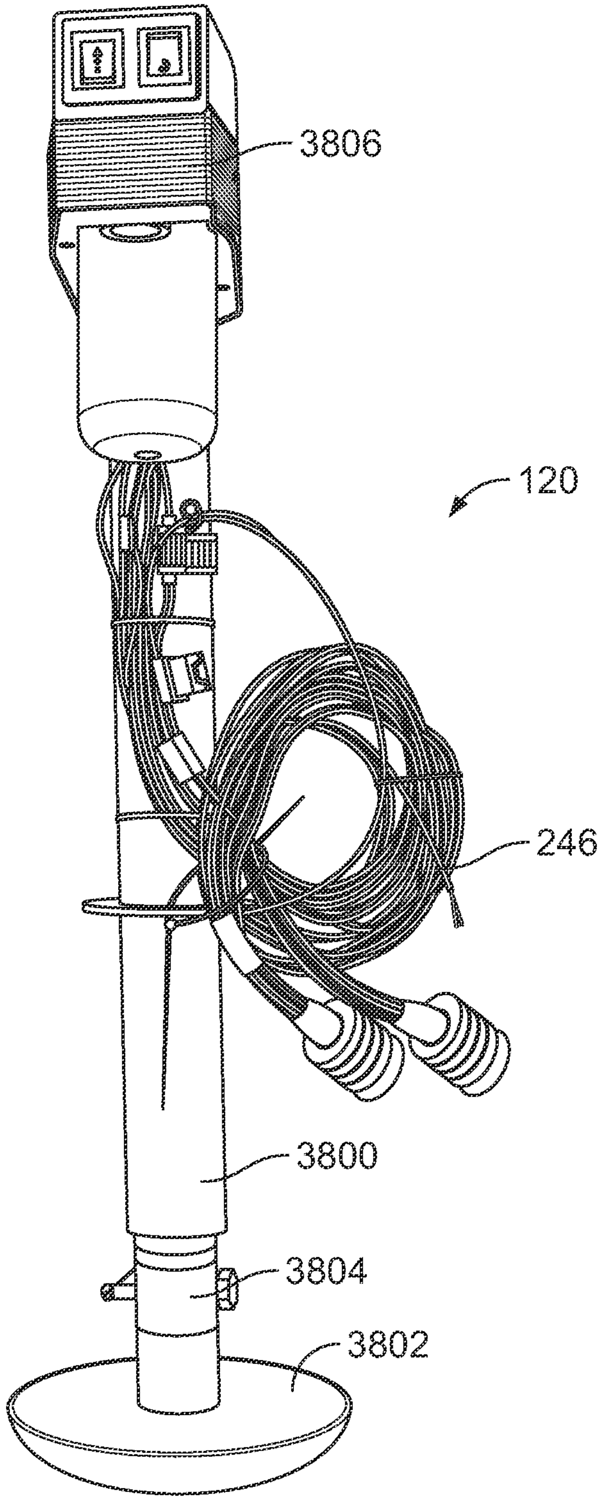
FIG. 39 is a side view of the example stabilizer leg of FIG. 38.

FIG. 38 shows the stabilizer leg on the trailer 104 and FIG. 39 is an isolated view of the stabilizer leg 120. In the illustrated example, the stabilizer leg 120 includes a sleeve 3800 (e.g., a body), a footpad 3802, a slidable shaft 3804, and an actuator 3806 (e.g., an electric motor). In the illustrated example, the sleeve 3800 is coupled (e.g., bolted, welded, etc.) to a front panel 3808 of the trailer 104. In other examples, the sleeve 3800 can be coupled to another part of the trailer 104, such as the tow bar 116. The shaft 3804 is disposed in and extends outward from the sleeve 3800. The footpad 3802 is coupled to the shaft 3804 and contacts the ground. In some examples, the footpad 3802 is disc-shaped and is relatively wide to support the trailer load limit or prevent digging into the ground. In other examples, the footpad 3802 can be shaped differently. In some examples, the stabilizer leg 120 has a pivot joint, which may allow the footpad 3802 to pivot a sufficient amount to conform to the terrain angle.

The actuator 3806 can be activated to extend or retract the shaft 3804 into/from the sleeve 3800. In the illustrated example, the actuator 3806 is connected to the cable 246, which connects to the second utility connector 1938. Therefore, when the first and second utility connectors 1936, 1938 are connected, the tow vehicle 102 can provide power and commands for controlling the actuator 3806. For example, after the receiver 1910 and the plug 1912 are engaged and locked, the docking control system 136 (FIG. 1) can activate the actuator 3806 to retract the slidable shaft 3804, which lifts the footpad 3802 off of the ground. This prevents the footpad 3082 from dragging on the ground while the tow vehicle 102 is towing the vehicle. In some examples, the actuator 3806 also activates or controls the roll compliance mechanism 1400 (FIG. 14) and the yaw compliance mechanism 1800 (FIG. 18). Therefore, the same actuator can be used to drive the stabilizer leg 120 and the mode-switching compliance mechanisms. This reduces the number of actuators on the trailer side.

When it is desired to undock the tow vehicle 102 and the trailer 104, the docking control system 136 can activate the actuator 3806 to extend the footpad 3802 to engage the ground, such that the stabilizer leg 120 vertically supports the front side of the trailer 104. In some examples, the second cable 246 can include one or more fluid lines. The fluid lines connect to the second utility connector 1938, which can provide fluid connection with the first utility connector 1936. In some examples, hydraulic or pneumatic pressure can be supplied by the tow vehicle 102 for controlling the actuator 3806. Additionally or alternatively, these fluid connections can route other types of fluids between the tow vehicle 102 and the trailer 104, such as oxygen, fuel, water, etc.

Figure 40:
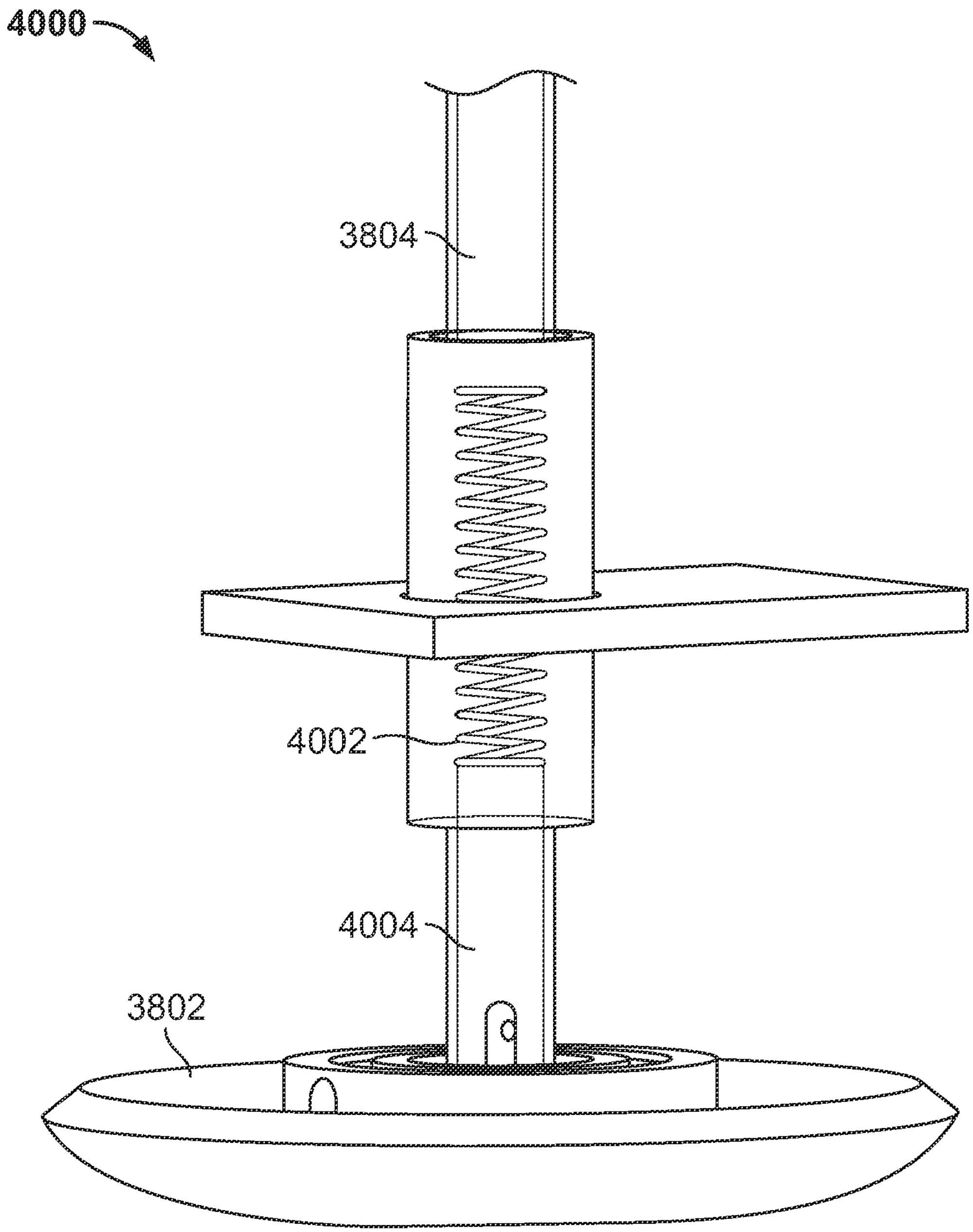
FIG. 40 illustrates an example vertical compliance mechanism that can be implemented on the example stabilizer leg of FIG. 38.

FIG. 40 shows a vertical compliance mechanism 4000 for enabling movement in the vertical direction to assist in docking the trailer 104 with the tow vehicle 102. In the example illustration of FIG. 40, the vertical compliance mechanism 4000 includes a spring 4002 coupled to the slidable shaft 3804, between the shaft 3804 and a post 4004 extending from the footpad 3802. This enables the shaft 3804 to move up or down relative to the footpad 3802. In some examples, during a docking assembly, the plug 1912 is not perfectly aligned with the receiver 1910 in the vertical direction. In such an example, the spring 4002 allows the trailer 104 to move upward or downward to assist in docking the plug 1912 with the receiver 1910. In some examples, the spring 4002 allows vertical movement of 62 mm. In other examples, the stabilizer leg 120 can be configured to allow a greater or smaller amount of vertical compliance. While the example illustration of FIG. 40 shows the vertical compliance mechanism 4000 to include a spring, any other form of vertical compliance device may be used herein to provide vertical adjustments to a docking process where the tow vehicle 102 and the trailer 104 are misaligned in the vertical direction.

In some examples, the docking system 200 and/or the docking system 1900 may include one or more covers to help protect the components and their joints from dust and other debris that could potentially damage the docking system 200, 1900. This may be beneficial when the docking system 200, 1900 is used in harsher environments, such as those on the moon and/or other celestial bodies.

Figure 41A:
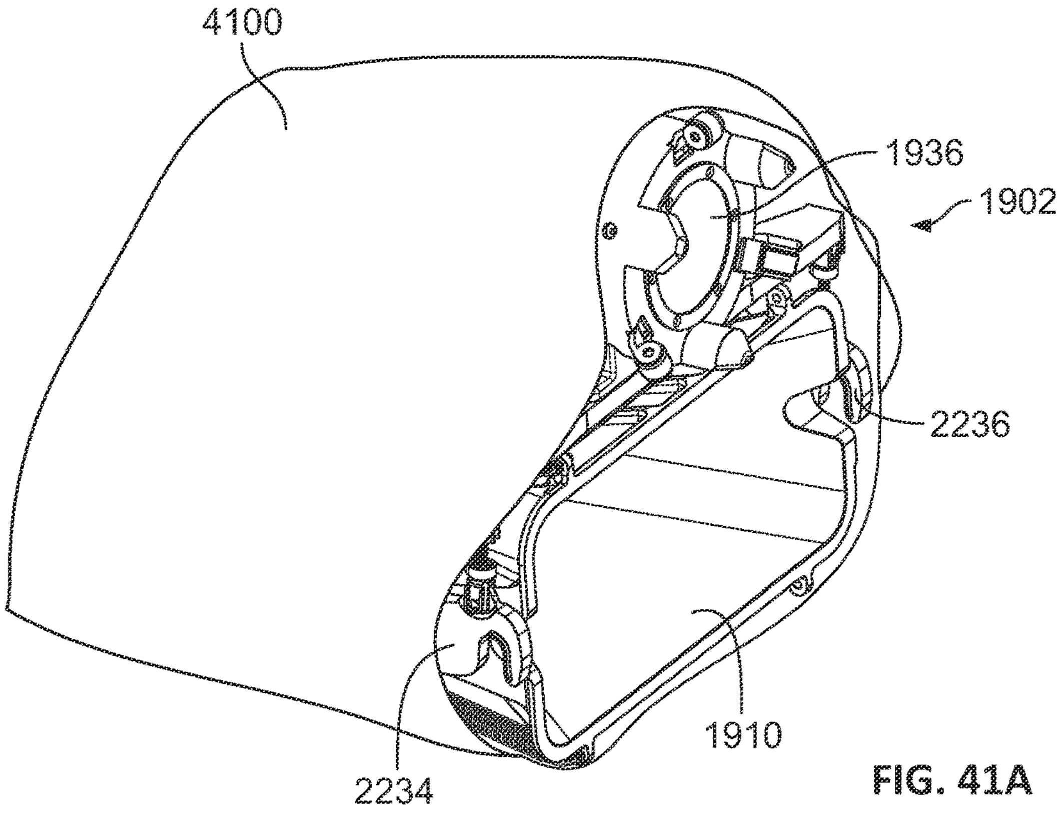
FIG. 41A illustrates an example first cover for the example first docking assembly of FIG. 19.
Figure 41B:
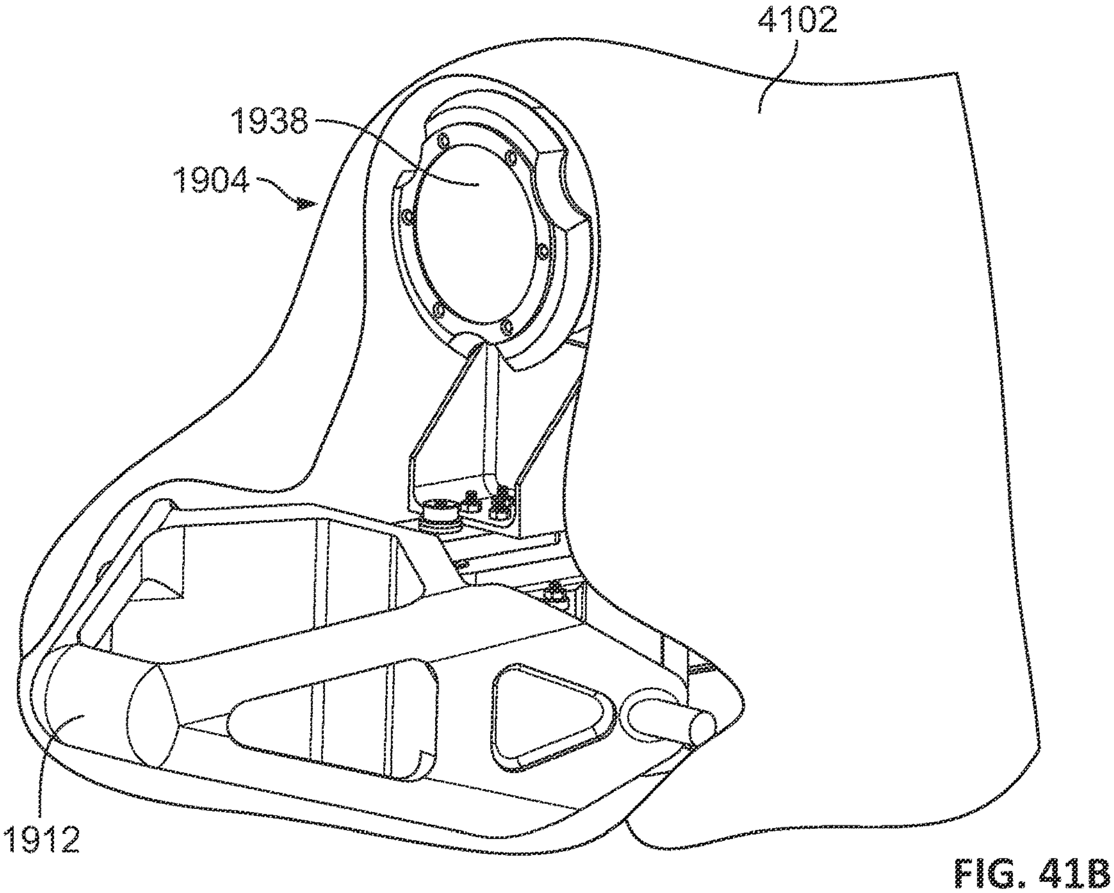
FIG. 41B illustrates an example second cover for the example second docking assembly of FIG. 19.

For example, FIG. 41A illustrates an example first cover 4100 disposed at least partially around the example first docking assembly 1902. The first cover 4100 may be implemented as a flexible sock. For example, the first cover 4100 may be a tubular piece of fabric or rubber that is sized to fit (e.g., snuggly) around a portion of the first docking assembly 1902. The first cover 4100 may leave some of (e.g., a minimum number of) the components exposed to facilitate the docking operation. For example, the inside of the receiver 1910 remains exposed, the rear side of the first utility connector 1936 remains exposed, and the lock jaws 2234, 2236 remain exposed. Similarly, FIG. 41B illustrates an example second dust cover 4102 disposed at least partially around the example second docking assembly 1904. The outer surface of the plug 1912 remains exposed and the front side of the second utility connector 1938 remains exposed.

While an example manner of implementing the control system 138 is illustrated in FIG. 1, one or more of the elements, processes, and/or devices illustrated in FIG. 1 may be combined, divided, re-arranged, omitted, eliminated, and/or implemented in any other way. Further, the example driving control system 132, the example docking control system 136, and/or, more generally, the example control system 138 of FIG. 1, may be implemented by hardware alone or by hardware in combination with software and/or firmware. Thus, for example, any of the example driving control system 132, the example docking control system 136, and/or, more generally, the example control system 138, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example control system 138 of FIG. 1 may include one or more elements, processes, and/or devices in addition to, or instead of, those illustrated in FIG. 1, and/or may include more than one of any or all of the illustrated elements, processes and devices.

Figure 42:
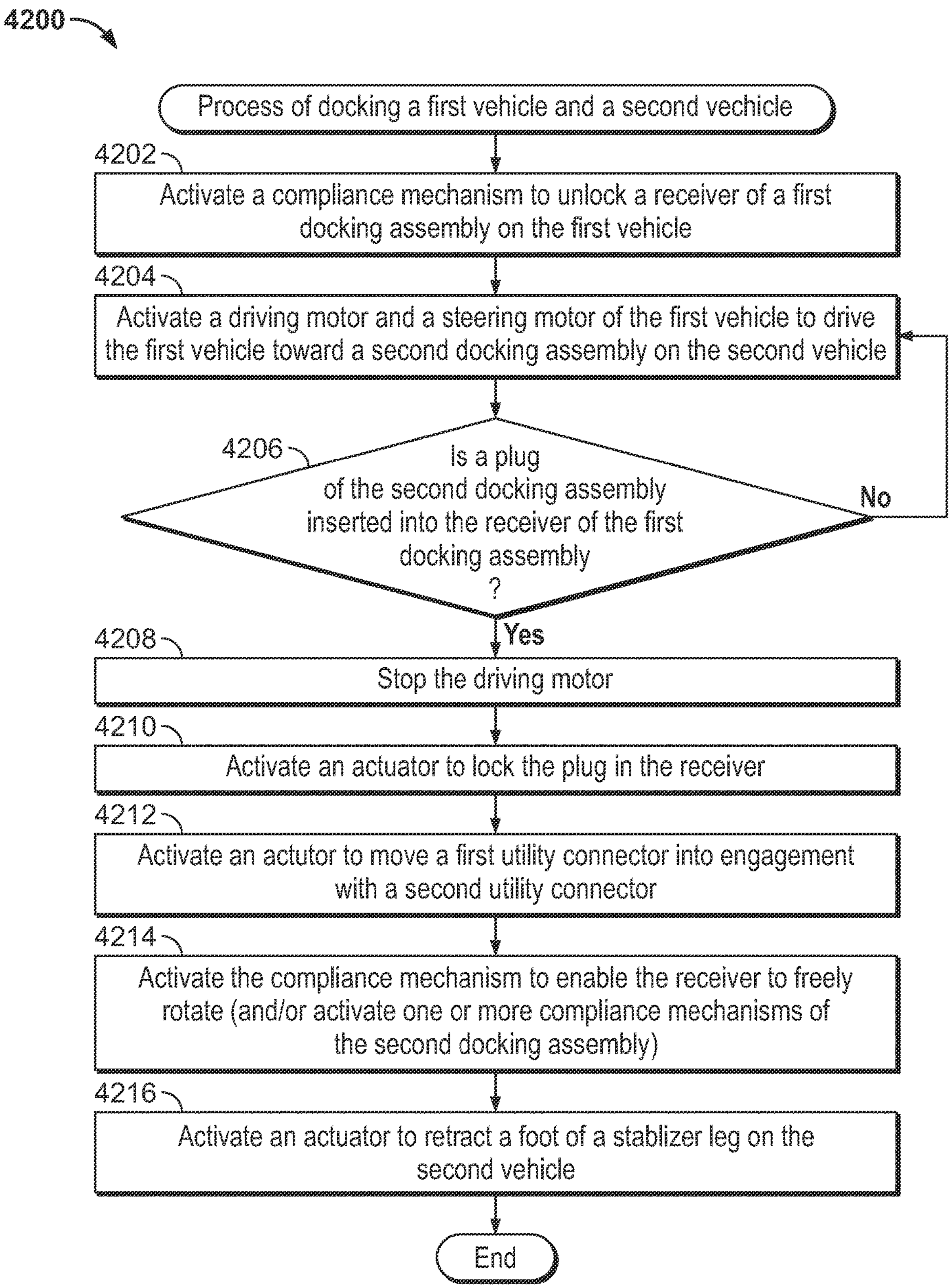
FIG. 42 is a flowchart representative of example machine readable instructions and/or example operations that may be executed by example processor circuitry to implement an example control system of FIG. 1 for performing an example docking process.
Figure 43:
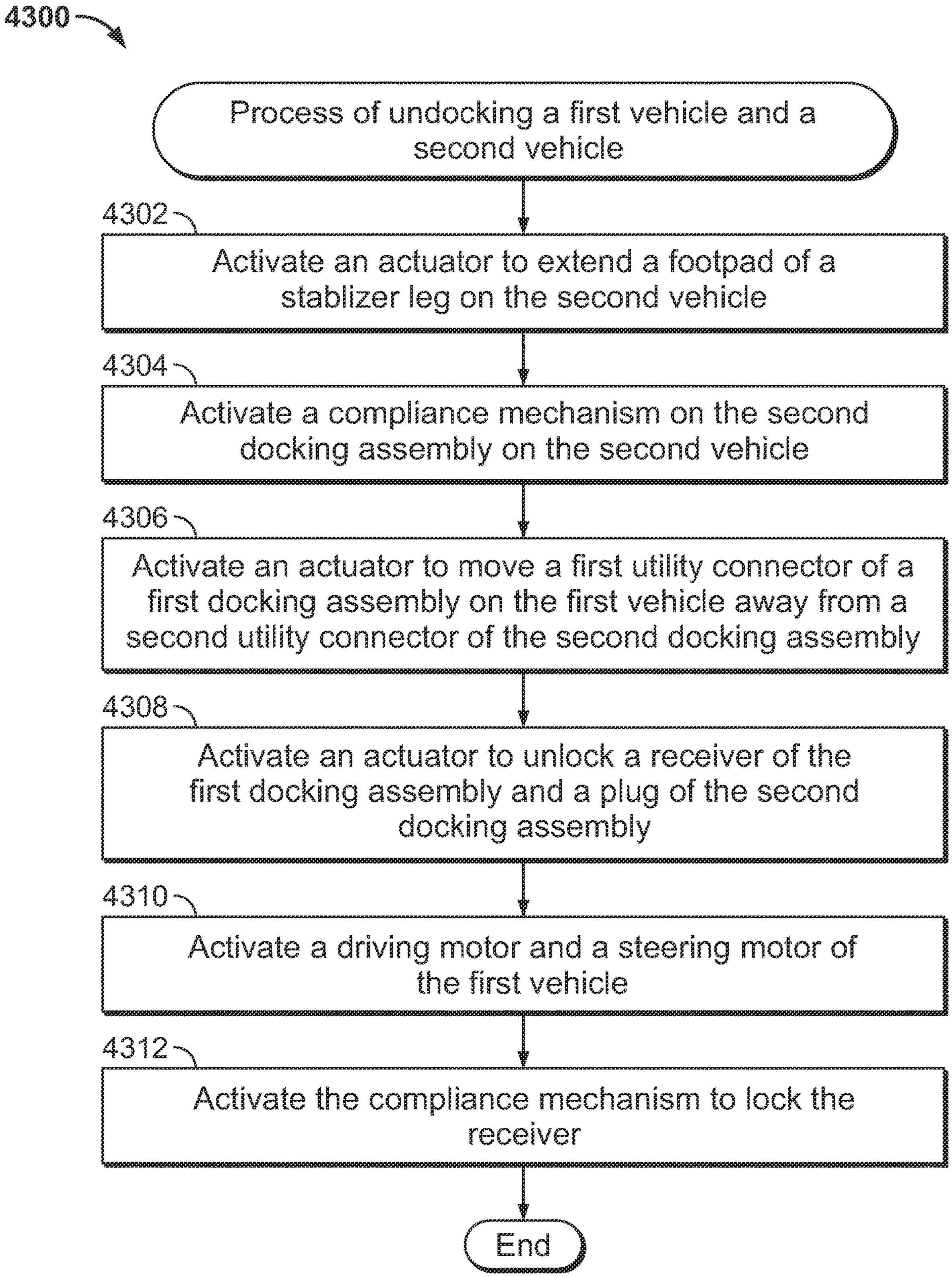
FIG. 43 is a flowchart representative of example machine readable instructions and/or example operations that may be executed by example processor circuitry to implement the example control system of FIG. 1 for performing an example undocking process.

Flowcharts representative of example machine readable instructions, which may be executed to configure processor circuitry to implement the control system 138 of FIG. 1, are shown in FIGS. 42 and 43. The machine readable instructions may be one or more executable programs or portion(s) of an executable program for execution by processor circuitry, such as the processor circuitry 4412 shown in the example processor platform 4400 discussed below in connection with FIG. 44 and/or the example processor circuitry discussed below in connection with FIGS. 45 and/or 46. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 42 and 43, many other methods of implementing the example control system 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 42 and 43 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 45:
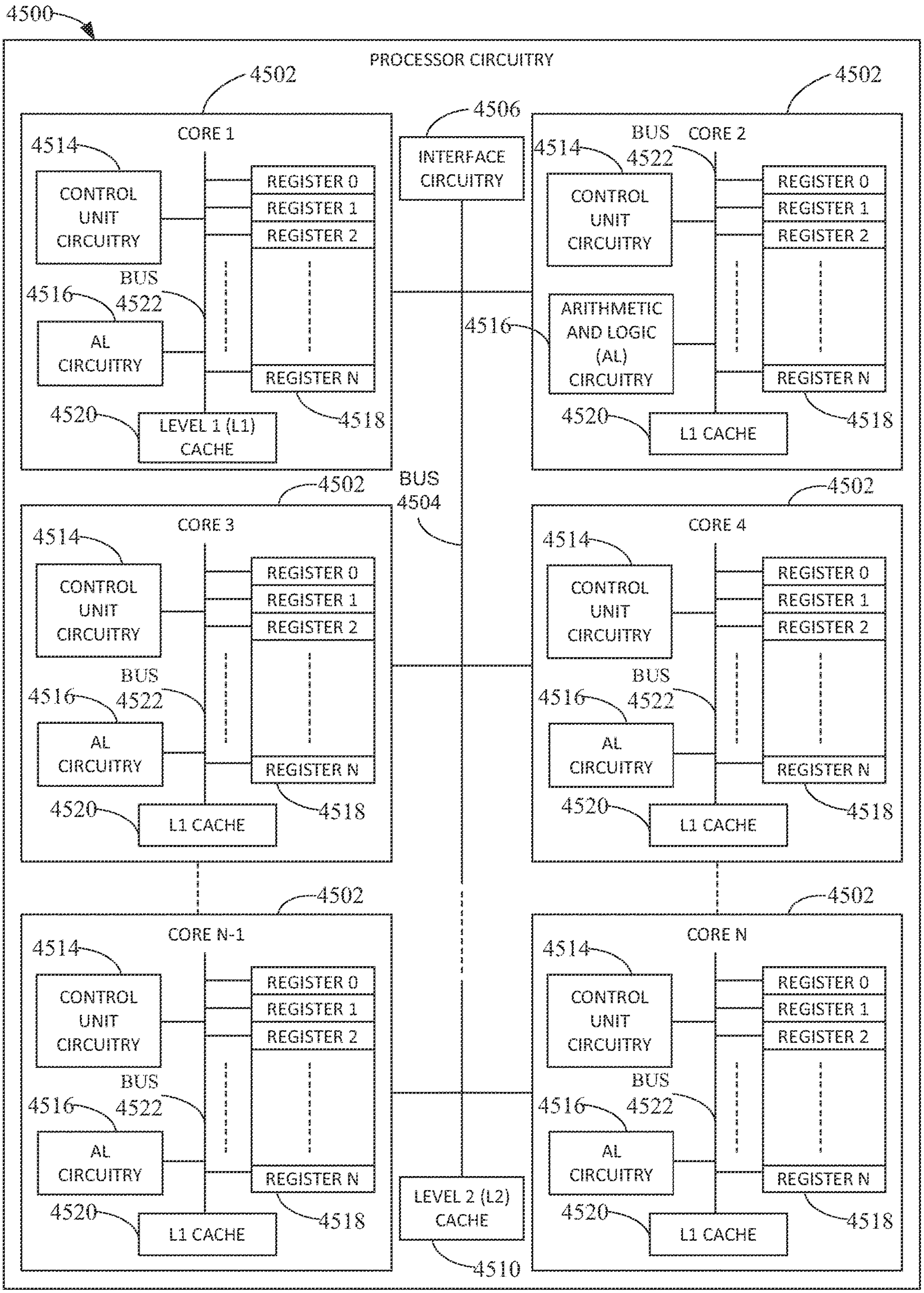
FIG. 45 is a block diagram of an example implementation of the processor circuitry of FIG. 44.

FIG. 42 is a flowchart representative of example machine readable instructions and/or example operations 4200 that may be executed and/or instantiated by processor circuitry to perform one or more operations to facilitate docking of the tow vehicle 102 and the second vehicle 104 (the trailer 104) using an example docking assembly disclosed herein. The example process of FIG. 45 is described in connection with the first and the docking system 1900. However, it is understood the example process can be similarly performed in connection with the docking system 200.

The example process assumes the tow vehicle 102 and the trailer 104 are disconnected. In some examples, the first docking assembly 1902 includes a compliance mechanism, such as the compliance mechanism 2600, that is operable between different modes to affect the state of the receiver 1910. In some examples, when tow vehicle 102 is not connected to the trailer 104, the compliance mechanism 2600 is in the first mode in which the receiver 1910 is locked from rotating about the pitch axis 1920 (as shown in FIG. 26A). Before trying to mate the receiver 1910 and the plug 1912, it may be desired to switch the compliance mechanism 2600 into the second mode in which the receiver 1910 is rotatable about the pitch axis 1920 but biased to the neutral or central pitch position (as shown in FIGS. 26B and 26C).

Therefore, at block 4202, the docking control system 136 activates the compliance mechanism 2600 (e.g., activates the actuator 2606) to unlock the receiver 1910 of the first docking assembly 1902 on the tow vehicle 102. In some examples, the actuator 2606 switches the compliance mechanism 2600 into the second mode so that the receiver 1910 is biased to the neutral or central pitch position. In some examples, the compliance mechanism 2600 is switched into the second mode prior to or during the process of driving the tow vehicle 102 toward the trailer 104 (at block 4204).

In some examples, the tow vehicle 102 is an autonomous vehicle that is programmed to automatically reverse toward the trailer 104 during the docking process. Therefore, at block 4204, the driving control system 132 activates the driving motor(s) 128 and the steering motor(s) 130 of the tow vehicle 102 to drive (e.g., reverse) the tow vehicle 102 toward the second docking assembly 1904 on the trailer 104 (the second vehicle). The tow vehicle 102 carries the first docking assembly 1902 and the trailer 104 (the second vehicle) carries the second docking assembly 1904. In some examples, the driving control system 132 uses input from the sensors 134 to help guide the tow vehicle 102 so the receiver 1910 is moved toward the plug 1912. This ensures the receiver 1910 is generally aligned with the plug 1912. In other examples, the tow vehicle 102 may be manually controlled by a driver. As the tow vehicle 102 with the first docking assembly 1902 approaches the trailer 104 with the second docking assembly 1904, the plug 1912 is inserted into the receiver 1910. The plug 1912 and the receiver 1910 may be misaligned in the pitch, yaw, and roll axes, as well as laterally (e.g., radially). As disclosed herein, the first and second docking assemblies 1902, 1904 include joints to enable the plug 1912 and the receiver 1910 to rotate about different axes to compensate for such misalignment. In some examples, the lateral misalignment can be handled by the compliance mechanism (e.g., the spring 4002) in the stabilizer leg 120 plus the rotation of the trailer 104 about its axle. This lateral misalignment is also handled via the movement of the wheels 118 (sliding or rolling) and the footpad 3802 of the stabilizer leg 120 relative to the ground (but within an acceptable small range). In other examples, the docking system 200 includes the lateral compliance joint 3200, which enables the plug 1912 to move in the laterally to account for misalignment in the side-to-side and/or vertical directions.

At block 4206, the docking control system 136 determines whether the plug 1912 of the second docking assembly 1904 is inserted into the receiver 1910 of the first docking assembly 1902. In some examples, the docking control system 136 determines whether the plug 1912 is inserted into the receiver 1910 based on a signal from the sensor 2302. If the docking control system 136 determines the plug 1912 is not inserted (e.g., not fully inserted) into the receiver 1910, the tow vehicle 102 continues to drive (e.g., reverse) toward the trailer 104 at block 4204. If the docking control system 136 determines the plug 1912 is inserted into the receiver 1910 (e.g., based on a signal from the sensor 2302), the driving control system 132, at block 4208, stops the driving motor(s) 128, which causes the tow vehicle 102 to stop moving. Additionally or alternatively, the driving control system 132 can activate an alert or indicator (e.g., a light on the dash of the tow vehicle 102) to indicate to the driver that the plug 1912 is fully inserted into the receiver 1910.

Once the plug 1912 is fully inserted into the receiver 1910, the first and second lock pins 1916*a*, 1916*b* are aligned with first and second lock jaws 2234, 2236. At block 4210, the docking control system 136 activates the actuator 2246 to cause the first and second lock jaws 2234, 2236 to move the locked position (as shown in FIG. 24B). The lock jaws 2234, 2236 engage the first and second lock pins 1916*a*, 1916*b* and thereby lock the plug 1912 in the receiver 1910. This prevents the plug 1912 from being removed from the receiver 1910. As such, the first and second docking assemblies 1902, 1904 are mechanically coupled and, thus the tow vehicle 102 and the trailer 104 are mechanically coupled.

In some examples, the first utility connector 1936 is to be moved into engagement with the second utility connector 1938 to form an electrical connection and/or fluid connection between the tow vehicle 102 and the trailer 104. In some examples, the same actuator controls both the lock and the movement of the first utility connector 1936. Therefore, activating the actuator 2246 also causes the first utility connector 1936 to move into engagement with the second utility connector 1938. For example, as shown in FIGS. 24A, 24B, when the actuator 2246 is activated to move the lock jaws 2234, 2236 to the locked position, the first utility connector 1936 is moved rearward and into engagement with the second utility connector 1938. In other examples, a separate actuator may be activated to move the first utility connector 1936. For example, as shown in FIGS. 10A and 10B, the actuator 1004 can be activated to move the first utility connector 236 toward and into engagement the second utility connector 244. Therefore, at block 4212, the docking control system 136 activates an actuator (e.g., the actuator 2246 or the actuator 1004) to move the first utility connector 1936 into engagement with the second utility connector 1944.

In some examples, once the plug 1912 and the receiver 1910 are locked, the compliance mechanism 2600 can switch into the third mode to enable the receiver 1910 to rotate freely about the pitch axis 1920. Therefore, at block 4214, the docking control system 136 activates the compliance mechanism 2600 (e.g., activates the actuator 2606) to switch into the third mode to enable the receiver 1910 to rotate freely about the pitch axis 1920 (as shown in FIG. 26D). In some examples, the second docking assembly 1904 includes one or more compliance mechanisms for the yaw and/or roll axes. For example, the second docking assembly 1904 may include the compliance mechanism 1800 (FIG. 18). In such an example, the docking control system 136 can activate the compliance mechanism 1800 into a mode to enable the plug 1912 to rotate freely. As described above, the first and second docking assemblies 1902, 1904 are electrically coupled by the first and second utility connectors 1936, 1938. This enables the docking control system 136 on the tow vehicle 102 to control the actuation mechanism(s) on the second docking assembly 1904.

In some examples, the trailer 104 may include a vertical stabilizer leg, such as the stabilizer leg 120. The stabilizer leg 120 may be used to support the trailer 104 on the ground when the trailer 104 is not connected to a vehicle. At block 4216, the docking control system 136 activates the actuator 3806 to retract (e.g., raise) the footpad 3802 off of the ground. In some examples, the actuator 3806 is activated after the receiver 1910 and the plug 1912 are locked together. In some examples, the actuator 3806 also activates the roll compliance mechanism 1400 and the yaw compliance mechanism 1800. At this point, the tow vehicle 102 and the trailer 104 are mechanically and electrically coupled, and the tow vehicle 102 can drive away with the trailer 104 being towed behind the tow vehicle 102.

FIG. 43 is a flowchart representative of example machine readable instructions and/or example operations 4300 that may be executed and/or instantiated by processor circuitry to perform one or more operations to undock or disconnect the tow vehicle 102 and the second vehicle 104 (the trailer 104). The example process of FIG. 43 is described in connection with the docking system 1900. However, it is understood the example process can be similarly performed in connection with the docking system 200.

The example process assumes the tow vehicle 102 and the trailer 104 are docked and connected, such as provided in the operations of FIG. 42. At block 4302, the docking control system 136 activates the actuator 3806 of the stabilizer leg 120 to extend (e.g., lower) the footpad 3802 onto the ground. This enables the stabilizer leg 120 to at least partially support the trailer 104 in the vertical direction.

If the second docking assembly 1904 includes a compliance mechanism, at block 4304, the docking control system 136 activates the compliance mechanism(s) on the second docking assembly 1904 on the trailer 104. For example, the docking control system 136 may activate the roll compliance mechanism 1400 (FIG. 14) to unlock the roll joint. As another example, the docking control system 136 may activate the compliance mechanism 1800 (FIG. 18) to a mode (e.g., the second mode) that biases or centers the plug 1912 to a neutral or central position. In some examples, activating the actuator 3806 to extend the footpad 3802 simultaneously drives the compliance mechanism(s) on the second docking assembly 1904. This reduces the number of actuators on the trailer side. This reduces weight and control system complexity.

At block 4306, the docking control system 136 activates an actuator (e.g., the actuator 2246, the actuator 1004) to move the first utility connector 1936 away from the second utility connector 1938. At block 4308, the docking control system 136 activates the lock actuator 2246 to move the lock jaws 2234, 2236 to the unlocked position (FIG. 24A), thereby unlocking the receiver 1910 and the plug 1912. In some examples, the lock and the utility (e.g., electrical, fluid) connection movement are activated by the same actuator (as shown in FIGS. 24A and 24B). In other examples, the lock and the utility connection can be operated by separate actuators. At this point, the first and second docking assemblies 1902, 1904 are disconnected.

At block 4310, the driving control system 132 can activate the driving motor(s) 128 and the steering motor(s) 130 to drive the tow vehicle 102 away from the trailer 104. In some examples, at block 4312, the docking control system 136 activates the compliance mechanism 2600 to lock the receiver 1910 (the first mode, as shown in FIG. 26A), which prevents the receiver 1910 from bouncing up and down while the tow vehicle 102 is driving around without the trailer 104.

Figure 44:
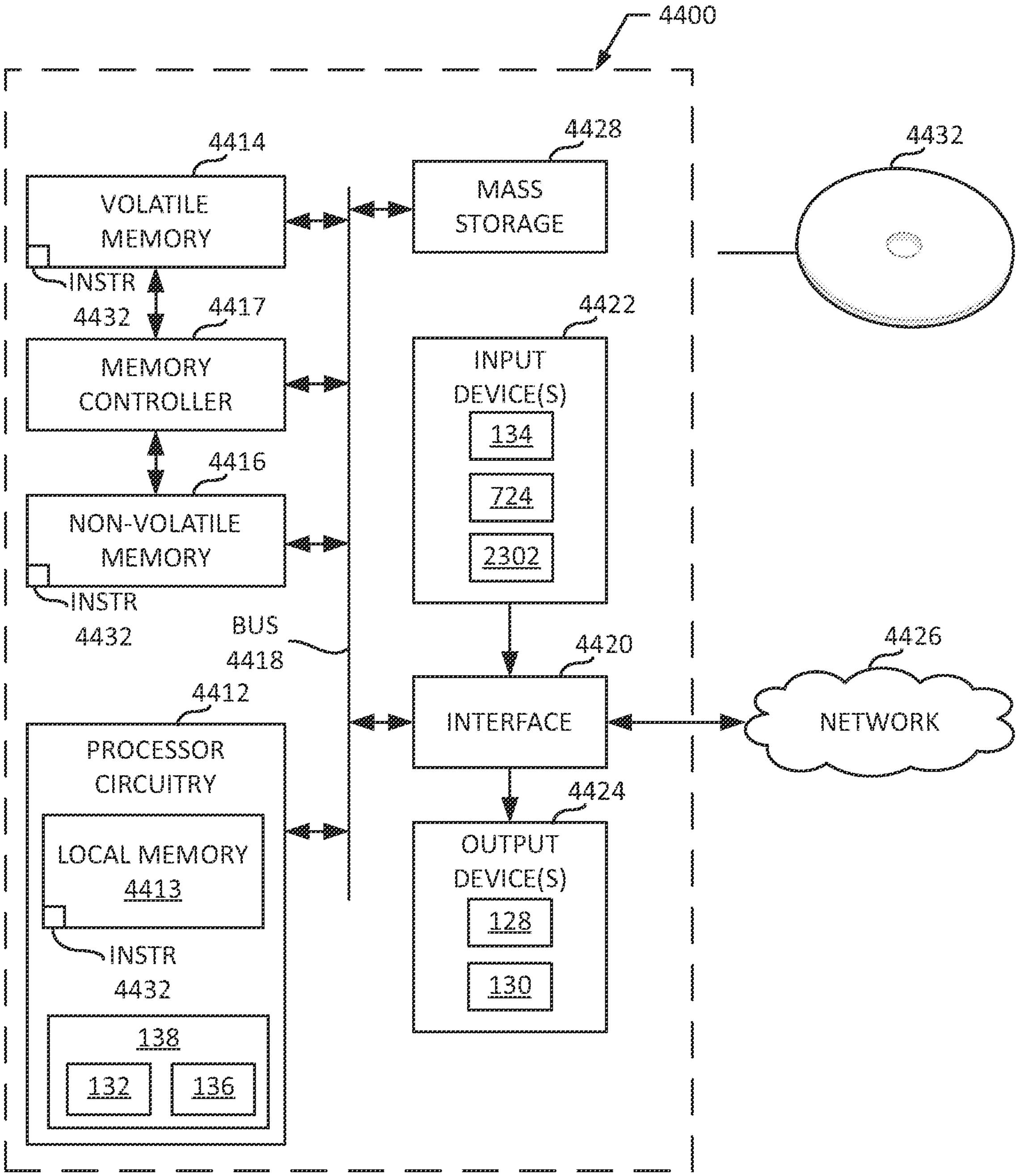
FIG. 44 is a block diagram of an example processing platform including processor circuitry structured to execute the example machine readable instructions and/or the example operations of FIGS. 42 and 43 to implement the control system of FIG. 1.

FIG. 44 is a block diagram of an example processor platform 4400 structured to execute and/or instantiate the machine readable instructions and/or the operations 4200, 4300 of FIGS. 42 and 43, respectively, to implement the control system 138 of FIG. 1. The processor platform 4400 can be, for example, a vehicle electronic control unit (ECU), a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 4400 of the illustrated example includes processor circuitry 4412. The processor circuitry 4412 of the illustrated example is hardware. For example, the processor circuitry 4412 can be implemented by one or more integrated circuits, logic circuits, FPGAs, microprocessors, CPUs, GPUs, DSPs, and/or microcontrollers from any desired family or manufacturer. The processor circuitry 4412 may be implemented by one or more semiconductor based (e.g., silicon based) devices. In this example, the processor circuitry 4412 implements the control system 138.

The processor circuitry 4412 of the illustrated example includes a local memory 4413 (e.g., a cache, registers, etc.). The processor circuitry 4412 of the illustrated example is in communication with a main memory including a volatile memory 4414 and a non-volatile memory 4416 by a bus 4418. The volatile memory 4414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 4416 may be implemented by flash memory and/or any other desired type of memory device. Access to the main memory 4414, 416 of the illustrated example is controlled by a memory controller 4417.

The processor platform 4400 of the illustrated example also includes interface circuitry 4420. The interface circuitry 4420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 4422 are connected to the interface circuitry 4420. The input device(s) 4422 permit(s) a user to enter data and/or commands into the processor circuitry 4412. In some examples, the input device(s) 4422 include the sensor(s) 134 the sensor 724, and/or the sensor 2302. Additionally or alternatively, the input device(s) 4422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 4424 are also connected to the interface circuitry 4420 of the illustrated example. In some examples, the output device(s) 4420 include the driving motor(s) 128, the steering motor(s) 130, and/or any of the actuators (e.g., the actuator 906, the actuator 1004, the actuator 1304, the actuator 1414, the actuator 2246, the actuator 2606, the actuator 3806, etc.) disclosed herein. Additionally or alternatively, the output device(s) 4424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 4420 of the illustrated example, thus, typically includes a graphics driver card, a graphics driver chip, and/or graphics processor circuitry such as a GPU.

The interface circuitry 4420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 4426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 4400 of the illustrated example also includes one or more mass storage devices 4428 to store software and/or data. Examples of such mass storage devices 4428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 4432, which may be implemented by the machine readable instructions of FIGS. 42 and 43, may be stored in the mass storage device 4428, in the volatile memory 4414, in the non-volatile memory 4416, and/or on a removable non-transitory computer readable storage medium such as a CD or DVD.

FIG. 45 is a block diagram of an example implementation of the processor circuitry 4412 of FIG. 44. In this example, the processor circuitry 4412 of FIG. 44 is implemented by a microprocessor 4500. For example, the microprocessor 4500 may be a general purpose microprocessor (e.g., general purpose microprocessor circuitry). The microprocessor 4500 executes some or all of the machine readable instructions of the flowcharts of FIGS. 42 and 43 to effectively instantiate the circuitry of FIG. 1 as logic circuits to perform the operations corresponding to those machine readable instructions. In some such examples, the circuitry of FIG. 1 is instantiated by the hardware circuits of the microprocessor 4500 in combination with the instructions. For example, the microprocessor 4500 may be implemented by multi-core hardware circuitry such as a CPU, a DSP, a GPU, an XPU, etc. Although it may include any number of example cores 4502 (e.g., 1 core), the microprocessor 4500 of this example is a multi-core semiconductor device including N cores. The cores 4502 of the microprocessor 4500 may operate independently or may cooperate to execute machine readable instructions. For example, machine code corresponding to a firmware program, an embedded software program, or a software program may be executed by one of the cores 4502 or may be executed by multiple ones of the cores 4502 at the same or different times. In some examples, the machine code corresponding to the firmware program, the embedded software program, or the software program is split into threads and executed in parallel by two or more of the cores 4502. The software program may correspond to a portion or all of the machine readable instructions and/or operations represented by the flowcharts of FIGS. 42 and 43.

The cores 4502 may communicate by a first example bus 4504. In some examples, the first bus 4504 may be implemented by a communication bus to effectuate communication associated with one(s) of the cores 4502. For example, the first bus 4504 may be implemented by at least one of an Inter-Integrated Circuit (I2C) bus, a Serial Peripheral Interface (SPI) bus, a PCI bus, or a PCIe bus. Additionally or alternatively, the first bus 4504 may be implemented by any other type of computing or electrical bus. The cores 4502 may obtain data, instructions, and/or signals from one or more external devices by example interface circuitry 4506. The cores 4502 may output data, instructions, and/or signals to the one or more external devices by the interface circuitry 4506. Although the cores 4502 of this example include example local memory 4520 (e.g., Level 1 (L1) cache that may be split into an L1 data cache and an L1 instruction cache), the microprocessor 4500 also includes example shared memory 4510 that may be shared by the cores (e.g., Level 2 (L2 cache)) for high-speed access to data and/or instructions. Data and/or instructions may be transferred (e.g., shared) by writing to and/or reading from the shared memory 4510. The local memory 4520 of each of the cores 4502 and the shared memory 4510 may be part of a hierarchy of storage devices including multiple levels of cache memory and the main memory (e.g., the main memory 4414, 4416 of FIG. 44). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 4502 may be referred to as a CPU, DSP, GPU, etc., or any other type of hardware circuitry. Each core 4502 includes control unit circuitry 4514, arithmetic and logic (AL) circuitry (sometimes referred to as an ALU) 4516, a plurality of registers 4518, the local memory 4520, and a second example bus 4522. Other structures may be present. For example, each core 4502 may include vector unit circuitry, single instruction multiple data (SIMD) unit circuitry, load/store unit (LSU) circuitry, branch/jump unit circuitry, floating-point unit (FPU) circuitry, etc. The control unit circuitry 4514 includes semiconductor-based circuits structured to control (e.g., coordinate) data movement within the corresponding core 4502. The AL circuitry 4516 includes semiconductor-based circuits structured to perform one or more mathematic and/or logic operations on the data within the corresponding core 4502. The AL circuitry 4516 of some examples performs integer based operations. In other examples, the AL circuitry 4516 also performs floating point operations. In yet other examples, the AL circuitry 4516 may include first AL circuitry that performs integer based operations and second AL circuitry that performs floating point operations. In some examples, the AL circuitry 4516 may be referred to as an Arithmetic Logic Unit (ALU). The registers 4518 are semiconductor-based structures to store data and/or instructions such as results of one or more of the operations performed by the AL circuitry 4516 of the corresponding core 4502. For example, the registers 4518 may include vector register(s), SIMD register(s), general purpose register(s), flag register(s), segment register(s), machine specific register(s), instruction pointer register(s), control register(s), debug register(s), memory management register(s), machine check register(s), etc. The registers 4518 may be arranged in a bank as shown in FIG. 45. Alternatively, the registers 4518 may be organized in any other arrangement, format, or structure including distributed throughout the core 4502 to shorten access time. The second bus 4522 may be implemented by at least one of an I2C bus, a SPI bus, a PCI bus, or a PCIe bus Each core 4502 and/or, more generally, the microprocessor 4500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 4500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 46:
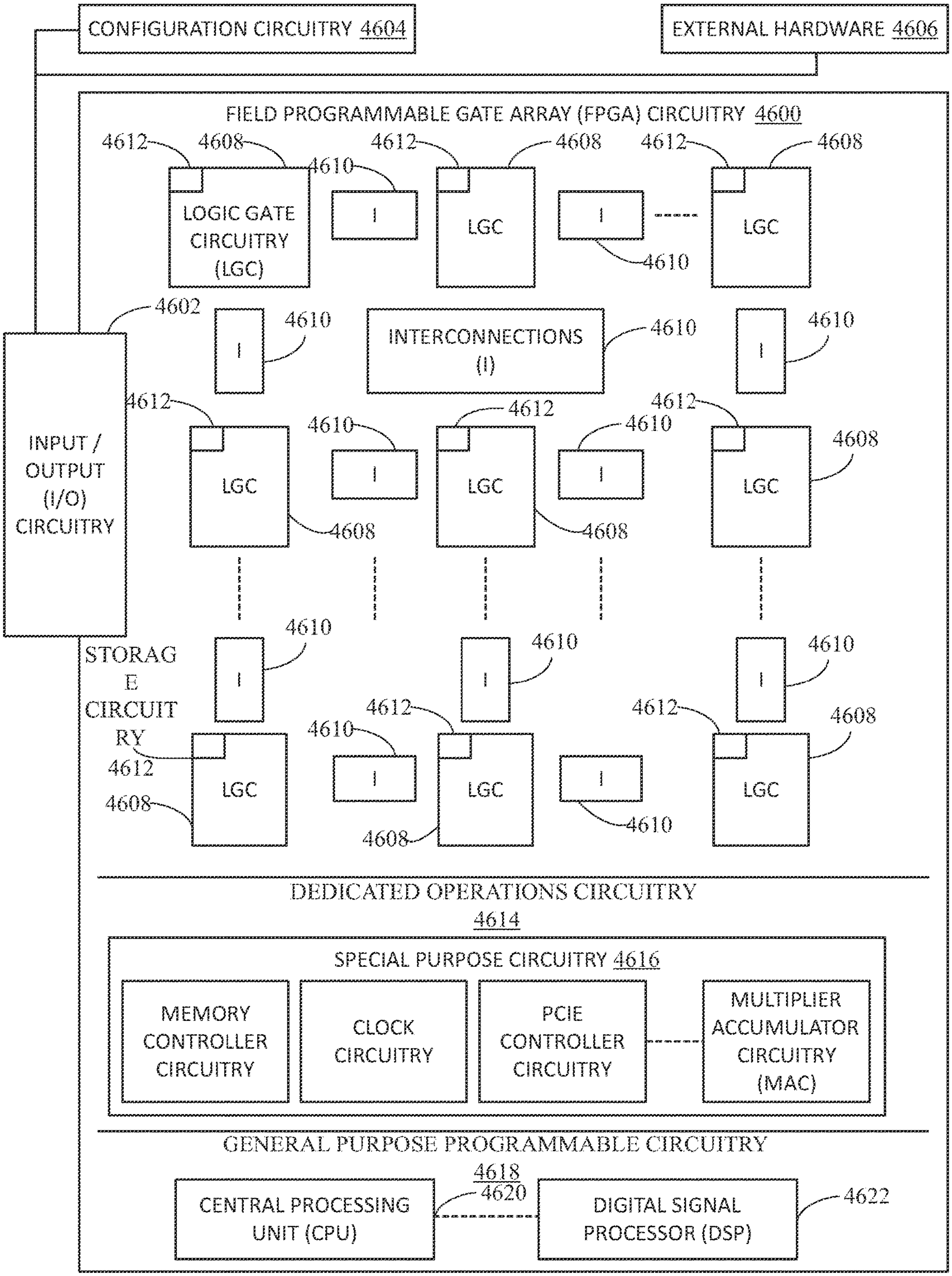
FIG. 46 is a block diagram of another example implementation of the processor circuitry of FIG. 44.

FIG. 46 is a block diagram of another example implementation of the processor circuitry 4412 of FIG. 44. In this example, the processor circuitry 4412 is implemented by FPGA circuitry 4600. For example, the FPGA circuitry 4600 may be implemented by an FPGA. The FPGA circuitry 4600 can be used, for example, to perform operations that could otherwise be performed by the example microprocessor 4500 of FIG. 45 executing corresponding machine readable instructions. However, once configured, the FPGA circuitry 4500 instantiates the machine readable instructions in hardware and, thus, can often execute the operations faster than they could be performed by a general purpose microprocessor executing the corresponding software.

More specifically, in contrast to the microprocessor 4500 of FIG. 45 described above (which is a general purpose device that may be programmed to execute some or all of the machine readable instructions represented by the flowcharts of FIGS. 42 and 43 but whose interconnections and logic circuitry are fixed once fabricated), the FPGA circuitry 4600 of the example of FIG. 6 includes interconnections and logic circuitry that may be configured and/or interconnected in different ways after fabrication to instantiate, for example, some or all of the machine readable instructions represented by the flowcharts of FIGS. 42 and 43. In particular, the FPGA circuitry 4600 may be thought of as an array of logic gates, interconnections, and switches. The switches can be programmed to change how the logic gates are interconnected by the interconnections, effectively forming one or more dedicated logic circuits (unless and until the FPGA circuitry 4600 is reprogrammed). The configured logic circuits enable the logic gates to cooperate in different ways to perform different operations on data received by input circuitry. Those operations may correspond to some or all of the software represented by the flowcharts of FIGS. 42 and 43. As such, the FPGA circuitry 4600 may be structured to effectively instantiate some or all of the machine readable instructions of the flowcharts of FIGS. 42 and 43 as dedicated logic circuits to perform the operations corresponding to those software instructions in a dedicated manner analogous to an ASIC. Therefore, the FPGA circuitry 4600 may perform the operations corresponding to the some or all of the machine readable instructions of FIGS. 42 and 43 faster than the general purpose microprocessor can execute the same.

In the example of FIG. 46, the FPGA circuitry 4600 is structured to be programmed (and/or reprogrammed one or more times) by an end user by a hardware description language (HDL) such as Verilog. The FPGA circuitry 4600 of FIG. 46, includes example input/output (I/O) circuitry 4602 to obtain and/or output data to/from example configuration circuitry 4604 and/or external hardware 4606. For example, the configuration circuitry 4604 may be implemented by interface circuitry that may obtain machine readable instructions to configure the FPGA circuitry 4600, or portion(s) thereof. In some such examples, the configuration circuitry 4604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 4606 may be implemented by external hardware circuitry. For example, the external hardware 4606 may be implemented by the microprocessor 4500 of FIG. 45. The FPGA circuitry 4600 also includes an array of example logic gate circuitry 4608, a plurality of example configurable interconnections 4610, and example storage circuitry 4612. The logic gate circuitry 4608 and the configurable interconnections 4610 are configurable to instantiate one or more operations that may correspond to at least some of the machine readable instructions of FIGS. 42 and 43 and/or other desired operations. The logic gate circuitry 4608 shown in FIG. 46 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 4608 to enable configuration of the electrical structures and/or the logic gates to form circuits to perform desired operations. The logic gate circuitry 4608 may include other electrical structures such as look-up tables (LUTs), registers (e.g., flip-flops or latches), multiplexers, etc.

The configurable interconnections 4610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 4608 to program desired logic circuits.

The storage circuitry 4612 of the illustrated example is structured to store result(s) of the one or more of the operations performed by corresponding logic gates. The storage circuitry 4612 may be implemented by registers or the like. In the illustrated example, the storage circuitry 4612 is distributed amongst the logic gate circuitry 4608 to facilitate access and increase execution speed.

The example FPGA circuitry 4600 of FIG. 46 also includes example Dedicated Operations Circuitry 4614. In this example, the Dedicated Operations Circuitry 4614 includes special purpose circuitry 4616 that may be invoked to implement commonly used functions to avoid the need to program those functions in the field. Examples of such special purpose circuitry 4616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 4600 may also include example general purpose programmable circuitry 4618 such as an example CPU 4620 and/or an example DSP 4622. Other general purpose programmable circuitry 4618 may additionally or alternatively be present such as a GPU, an XPU, etc., that can be programmed to perform other operations.

Although FIGS. 45 and 46 illustrate two example implementations of the processor circuitry 4412 of FIG. 44, many other approaches are contemplated. For example, as mentioned above, modern FPGA circuitry may include an on-board CPU, such as one or more of the example CPU 4620 of FIG. 46. Therefore, the processor circuitry 4412 of FIG. 44 may additionally be implemented by combining the example microprocessor 4500 of FIG. 45 and the example FPGA circuitry 4600 of FIG. 46. In some such hybrid examples, a first portion of the machine readable instructions represented by the flowcharts of FIGS. 42 and 43 may be executed by one or more of the cores 4502 of FIG. 45, a second portion of the machine readable instructions represented by the flowcharts of FIGS. 42 and 43 may be executed by the FPGA circuitry 4600 of FIG. 46, and/or a third portion of the machine readable instructions represented by the flowcharts of FIGS. 42 and 43 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 4412 of FIG. 44 may be in one or more packages. For example, the microprocessor 4500 of FIG. 45 and/or the FPGA circuitry 4600 of FIG. 46 may be in one or more packages. In some examples, an XPU may be implemented by the processor circuitry 4412 of FIG. 44, which may be in one or more packages. For example, the XPU may include a CPU in one package, a DSP in another package, a GPU in yet another package, and an FPGA in still yet another package.

As used herein, unless otherwise stated, the term "above" describes the relationship of two parts relative to a celestial body on which the described parts are located. A first part is above a second part, if the second part has at least one part between the celestial body and the first part. Likewise, as used herein, a first part is "below" a second part when the first part is closer to the celestial body than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

From the foregoing, it will be appreciated that example systems, methods, apparatus, and articles of manufacture have been disclosed that improve docking or connecting of two vehicles for towing or other purposes. The examples disclosed herein utilize self-locating or aligning features to properly align the mating components on the two vehicles. The examples disclosed herein can handle relatively large rotational and positional misalignments between the mating components. This is beneficial for autonomous systems because the precision driving requirements can be significantly relaxed. Further, this is beneficial for use in uneven terrain environments where there are often large misalignments between the mating components. The examples disclosed herein also enable autonomous electrical and/or fluid connections between the vehicles without the need for human interaction. The examples disclosed herein are robust and can withstand hard environments. The examples disclosed herein provide compact designs that have lower mass and lower volume.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system comprising:

a first vehicle;

a first docking assembly coupled to the first vehicle, the first docking assembly including a first interface component that is rotatable about a first degree of freedom relative to the first vehicle, wherein the first docking assembly includes a first mounting interface to be coupled to the first vehicle, and wherein the first interface component includes a receiver, the receiver rotatably coupled to the first mounting interface to enable the receiver to rotate about a pitch axis relative to the first vehicle, the receiver defining an opening;

a second vehicle; and a second docking assembly coupled to the second vehicle, the second docking assembly including a second interface component to mate with the first interface component, the second interface component rotatable about a second degree of freedom relative to the second vehicle and a third degree of freedom relative to the second vehicle, wherein the second docking assembly includes a second mounting interface to be coupled to the second vehicle, and wherein the second interface component includes a plug, the plug to be inserted into the opening of the receiver, the plug rotatably coupled the second mounting interface to enable the plug to rotate about a yaw axis relative to the second vehicle and rotate about a roll axis relative to the second vehicle, wherein the second docking assembly includes a lock pin extending from the plug, the receiver has a slot to receive the lock pin when the plug is inserted into the opening of the receiver, and the first docking assembly includes a lock to engage the lock pin to mechanically lock the first and second docking assemblies.

2. The system of claim 1, wherein the first degree of freedom is a pitch axis, the second degree of freedom is a yaw axis, and the third degree of freedom is a roll axis.

3. The system of claim 1, wherein the first vehicle is a powered vehicle and the second vehicle is a passive vehicle.

4. The system of claim 3, wherein the first vehicle is an autonomous vehicle.

5. The system of claim 4, wherein the second vehicle is a trailer.

6. The system of claim 1, wherein the receiver has only one degree of freedom relative to the first mounting interface, and wherein the plug has only two degrees of freedom relative to the second mounting interface.

7. The system of claim 6, wherein the plug is pyramid-shaped.

8. The system of claim 7, wherein the receiver has a corresponding pyramid shape that matches the plug.

9. A system comprising:

a first vehicle;

a first docking assembly coupled to the first vehicle, the first docking assembly including a first interface component that is rotatable about a first degree of freedom relative to the first vehicle, wherein the first docking assembly includes a first mounting interface to be coupled to the first vehicle, and wherein the first interface component includes a receiver, the receiver rotatably coupled to the first mounting interface to enable the receiver to rotate about a pitch axis relative to the first vehicle, the receiver defining an opening;

a second vehicle; and a second docking assembly coupled to the second vehicle, the second docking assembly including a second interface component to mate with the first interface component, the second interface component rotatable about a second degree of freedom relative to the second vehicle and a third degree of freedom relative to the second vehicle, wherein the second docking assembly including a second mounting interface to be coupled to the second vehicle, and wherein the second interface component includes a plug, the plug to be inserted into the opening of the receiver, the plug rotatably coupled the second mounting interface to enable the plug to rotate about a yaw axis relative to the second vehicle and rotate about a roll axis relative to the second vehicle wherein, the first docking assembly includes a first utility connector coupled to the receiver, the second docking assembly includes a second utility connector coupled to the plug, and the first docking assembly includes an actuator to move the first utility connector into engagement with the second utility connector.

10. The system of claim 9, wherein the first and second utility connectors provide at least one of an electrical connection or a fluid connection.

11. The system of claim 9, wherein the first vehicle is a powered vehicle and the second vehicle is a passive vehicle.

12. A system comprising:

a first vehicle;

a first docking assembly coupled to the first vehicle, the first docking assembly including a first interface component that is rotatable about a first degree of freedom relative to the first vehicle, wherein the first docking assembly includes a first mounting interface to be coupled to the first vehicle, and wherein the first interface component includes a receiver, the receiver rotatably coupled to the first mounting interface to enable the receiver to rotate about a pitch axis relative to the first vehicle, the receiver defining an opening;

a second vehicle; and a second docking assembly coupled to the second vehicle, the second docking assembly including a second interface component to mate with the first interface component, the second interface component rotatable about a second degree of freedom relative to the second vehicle and a third degree of freedom relative to the second vehicle, wherein the second docking assembly including a second mounting interface to be coupled to the second vehicle, and wherein the second interface component includes a plug, the plug to be inserted into the opening of the receiver, the plug rotatably coupled the second mounting interface to enable the plug to rotate about a yaw axis relative to the second vehicle and rotate about a roll axis relative to the second vehicle, wherein the second mounting interface includes:

a coupler, the plug rotatably coupled to the coupler via a first joint to enable the plug to rotate about the yaw axis; and a shaft to be coupled to the second vehicle, the shaft extending through the coupler, the coupler rotatable about the shaft to enable the plug to rotate about the roll axis.

13. The system of claim 12, wherein the first vehicle is an autonomous vehicle and the second vehicle is a trailer.

14. A system comprising:

a first vehicle;

a first docking assembly coupled to the first vehicle, the first docking assembly including a first interface component that is rotatable about a first degree of freedom relative to the first vehicle, wherein the first docking assembly includes a first mounting interface to be coupled to the first vehicle, and wherein the first interface component includes a receiver, the receiver rotatably coupled to the first mounting interface to enable the receiver to rotate about a pitch axis relative to the first vehicle, the receiver defining an opening, wherein the first docking assembly includes a first spring to bias the receiver to a central pitch position;

a second vehicle; and a second docking assembly coupled to the second vehicle, the second docking assembly including a second interface component to mate with the first interface component, the second interface component rotatable about a second degree of freedom relative to the second vehicle and a third degree of freedom relative to the second vehicle, wherein the second docking assembly including a second mounting interface to be coupled to the second vehicle, and wherein the second interface component includes a plug, the plug to be inserted into the opening of the receiver, the plug rotatably coupled the second mounting interface to enable the plug to rotate about a yaw axis relative to the second vehicle and rotate about a roll axis relative to the second vehicle, wherein the second docking assembly including a second spring to bias the plug to a central yaw position and a third spring to bias the plug to a central roll position.

15. The system of claim 14, wherein the first vehicle is a powered vehicle and the second vehicle is a passive vehicle.

16. A system comprising:

a first vehicle;

a first docking assembly coupled to the first vehicle, the first docking assembly including a first interface component that is rotatable about a first degree of freedom relative to the first vehicle, wherein the first docking assembly includes a first mounting interface to be coupled to the first vehicle, and wherein the first interface component includes a receiver, the receiver rotatably coupled to the first mounting interface to enable the receiver to rotate about a pitch axis relative to the first vehicle, the receiver defining an opening, wherein the first docking assembly includes a compliance mechanism operable between:

a first mode in which the receiver is locked from rotating about the pitch axis, a second mode in which the receiver is rotatable about the pitch axis and biased toward a central pitch position, and a third mode in which the receiver is freely rotatable about the pitch axis;

a second vehicle; and a second docking assembly coupled to the second vehicle, the second docking assembly including a second interface component to mate with the first interface component, the second interface component rotatable about a second degree of freedom relative to the second vehicle and a third degree of freedom relative to the second vehicle, wherein the second docking assembly including a second mounting interface to be coupled to the second vehicle, and wherein the second interface component includes a plug, the plug to be inserted into the opening of the receiver, the plug rotatably coupled the second mounting interface to enable the plug to rotate about a yaw axis relative to the second vehicle and rotate about a roll axis relative to the second vehicle.

17. The system of claim 16, wherein the first vehicle is an autonomous vehicle and the second vehicle is a trailer.

* * * * *